US009312609B2

(12) United States Patent
Wild et al.

(10) Patent No.: US 9,312,609 B2
(45) Date of Patent: Apr. 12, 2016

(54) COAXIAL CABLE DEVICE AND METHOD INVOLVING WELD AND MATE CONNECTIVITY

(71) Applicant: John Mezzalingua Associates, LLC, Liverpool, NY (US)

(72) Inventors: Werner Wild, Buttenwiesen (DE); Gerhard Refle, Heretsried (DE); Christopher P. Natoli, Baldwinsville, NY (US); Ian Baker, Baldwinsville, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 141 days.

(21) Appl. No.: 14/137,316

(22) Filed: Dec. 20, 2013

(65) Prior Publication Data

US 2014/0113486 A1 Apr. 24, 2014

Related U.S. Application Data

(63) Continuation-in-part of application No. 14/052,539, filed on Oct. 11, 2013.

(60) Provisional application No. 61/712,496, filed on Oct. 11, 2012.

(51) Int. Cl.

*H02G 15/02* (2006.01)
*H01R 4/18* (2006.01)
*H01R 4/02* (2006.01)
*H01R 13/52* (2006.01)
*H01R 24/56* (2011.01)

(52) U.S. Cl.

CPC ................ *H01R 4/183* (2013.01); *H01R 4/029* (2013.01); *H01R 13/5205* (2013.01); *H01R 24/564* (2013.01); *Y10T 29/49123* (2015.01)

(58) Field of Classification Search

CPC ........ H01R 4/02; H01R 4/0421; H01R 4/029; H01R 9/03
USPC ........... 174/84 R, 84 C, 88 R, 88 C; 439/578, 439/582–585
See application file for complete search history.

(56) References Cited

U.S. PATENT DOCUMENTS 5,154,636 A * 10/1992 Vaccaro et al. ............... 439/583
5,217,391 A * 6/1993 Fisher, Jr. ..................... 439/578

(Continued)

FOREIGN PATENT DOCUMENTS

EP 2 219 267 A1 * 2/2009 ............... H01R 4/02
EP 2219267 A1 1/2011
EP 2219267 B1 1/2011

OTHER PUBLICATIONS

PCT/US2013/064682; International Filing Date: Oct. 11, 2013. International Search Report and Written Opinion. Date of Mailing: Mar. 11, 2014. 13 pages.

*Primary Examiner* — William H Mayo, III
(74) *Attorney, Agent, or Firm* — Barclay Damon, LLP

(57) ABSTRACT

A coaxial cable device and method for establishing weld and mate connectivity across a coaxial cable. The device includes an outer conductor engager and an inner conductor engager wherein the outer conductor engager includes a weld interface for engagement with a first portion of a coaxial cable, and wherein the inner conductor engager includes a mate interface for engagement with a second portion of the cable.

23 Claims, 72 Drawing Sheets

(56) References Cited

U.S. PATENT DOCUMENTS

| | | | | |
|---|---|---|---|---|
| 5,269,701 | A * | 12/1993 | Leibfried, Jr. | 439/578 |
| 5,284,449 | A * | 2/1994 | Vaccaro | 439/583 |
| 5,518,420 | A * | 5/1996 | Pitschi | 439/578 |
| 5,795,188 | A * | 8/1998 | Harwath | 439/583 |
| 5,938,747 | A * | 8/1999 | Young | 710/53 |
| 5,984,723 | A * | 11/1999 | Wild | 439/583 |
| 6,027,373 | A * | 2/2000 | Gray et al. | 439/578 |
| 6,159,046 | A * | 12/2000 | Wong | 439/578 |
| 6,840,803 | B2 * | 1/2005 | Wlos et al. | 439/585 |
| 7,207,838 | B2 * | 4/2007 | Andreescu | 439/583 |
| 7,217,154 | B2 * | 5/2007 | Harwath | 439/578 |
| 7,275,957 | B1 * | 10/2007 | Wlos et al. | 439/583 |
| 7,357,671 | B2 * | 4/2008 | Wild et al. | 439/583 |
| 7,381,089 | B2 * | 6/2008 | Hosler, Sr. | 439/578 |
| 7,384,307 | B1 * | 6/2008 | Wang | 439/578 |
| 7,488,209 | B2 * | 2/2009 | Vaccaro | 439/578 |
| 7,527,512 | B2 * | 5/2009 | Montena | 439/265 |
| 7,637,774 | B1 * | 12/2009 | Vaccaro | 439/578 |
| 7,934,954 | B1 * | 5/2011 | Chawgo et al. | 439/578 |
| 8,453,320 | B2 | 6/2013 | Van Swearingen et al. | |
| 9,017,102 | B2 * | 4/2015 | Natoli | 439/578 |
| 2005/0159044 | A1 * | 7/2005 | Harwath et al. | 439/578 |
| 2009/0233482 | A1 * | 9/2009 | Chawgo et al. | 439/578 |
| 2011/0239451 | A1 * | 10/2011 | Montena et al. | 29/747 |
| 2011/0239455 | A1 * | 10/2011 | Montena et al. | 29/828 |
| 2012/0088407 | A1 * | 4/2012 | Natoli | 439/585 |
| 2012/0125654 | A1 | 5/2012 | Van Swearingen et al. | |
| 2012/0129383 | A1 | 5/2012 | Swearingen | |
| 2012/0129388 | A1 | 5/2012 | Vaccaro et al. | |
| 2012/0129390 | A1 | 5/2012 | Van Swearingen et al. | |
| 2012/0129391 | A1 | 5/2012 | Van Swearingen et al. | |

* cited by examiner

COAXIAL CABLE DEVICE AND METHOD INVOLVING WELD AND MATE CONNECTIVITY

PRIORITY CLAIM

This application is a continuation-in-part of, and claims the benefit and priority of, U.S. patent application Ser. No. 14/052,539, filed on Oct. 11, 2013, which is a non-provisional of, and claims the benefit and priority of, U.S. Provisional Patent Application Ser. No. 61/712,496, filed on Oct. 11, 2012.

INCORPORATION BY REFERENCE

The entire contents of the following applications are hereby incorporated by reference: (a) U.S. patent application Ser. No. 14/052,539, filed on Oct. 11, 2013; (b) U.S. Provisional Patent Application Ser. No. 61/712,496, filed on Oct. 11, 2012; (c) U.S. patent application Ser. No. 13/661,962, filed on Oct. 26, 2012; (d) U.S. patent application Ser. No. 13/661,912, filed on Oct. 26, 2012; (e) U.S. patent application Ser. No. 13/784,499, filed on Mar. 4, 2013; and (f) U.S. patent application Ser. No. 13/869,295, filed on Apr. 24, 2013.

CROSS REFERENCE TO RELATED APPLICATIONS

This application is related to the following commonly-owned patent applications: (a) U.S. patent application Ser. No. 13/661,962, filed on Oct. 26, 2012; (b) U.S. patent application Ser. No. 13/661,912, filed on Oct. 26, 2012; (c) U.S. patent application Ser. No. 13/784,499, filed on Mar. 4, 2013; (d) U.S. patent application Ser. No. 13/869,295, filed on Apr. 24, 2013; and (e) U.S. patent application Ser. No. 14/052,539, filed on Oct. 11, 2013.

BACKGROUND

Coaxial cables are typically connected to interface ports, or corresponding connectors, for the operation of various electronic devices, such as cellular communications towers. Many coaxial cables are installed on cellular towers, outdoors or in harsh environments, subjecting the cables to wind, vibration and other elements. The typical coaxial cable connector has several interconnected, internal parts. Over time, due to the environmental factors and other causes, these internal parts can become loose or lose mechanical contact with each other. As a result, the electronic devices connected to the cables can undergo a decrease or loss in performance.

For example, the loose internal parts can cause undesirable levels of passive intermodulation (PIM) which, in turn, can impair the performance of the electronic devices. PIM can occur when signals at two or more frequencies mix with each other in a non-linear manner to produce spurious signals. The spurious signals can interfere with, or otherwise disrupt, the proper operation of the electronic devices.

Where the coaxial cable is employed on a cellular tower, for example, unacceptably high levels of PIM in terminal sections of the coaxial cable, and resulting interfering RF signals, can disrupt communication between sensitive receiver and transmitter equipment on the tower and lower-powered cellular devices. Disrupted communication can result in dropped calls or severely limited data rates, for example, which can result in dissatisfied customers and customer churn.

Therefore, there is a need to overcome, or otherwise lessen the effects of, the disadvantages and shortcomings described above.

SUMMARY

A first aspect relates generally to a coaxial cable connector comprising: a first weld joint between a center conductor of a coaxial cable and an electrical contact of the coaxial cable connector, wherein the first weld joint is located along an outer surface of the center conductor, and a second weld joint between an outer conductor of the coaxial cable and a portion of a connector body of the coaxial cable connector. A second aspect relates to a coaxial cable connector having a welding component welded to the outer conductor of a coaxial cable. A third aspect relates generally to a method of attaching a coaxial cable connector to a coaxial cable through one or more welds.

In one embodiment, the coaxial cable assembly or coaxial cable device includes a coaxial cable having an inner conductor, an outer conductor, an inner conductor engager, a compressor configured to cooperate with at least part of the inner conductor engager, and an outer conductor engager configured receive at least part of the outer conductor. The outer conductor engager is welded to the received part of the outer conductor.

In one embodiment, the inner conductor engager is configured to receive at least part of the inner conductor. In another embodiment, the coaxial outer conductor has a corrugated shape defining: (a) a plurality of peaks and valleys; and (b) an intermediate section extending from each valley to each peak. The outer conductor engager is welded to one of the intermediate sections. In one embodiment, the intermediate section of the outer conductor extends in a first plane, the outer conductor engager has a conductor engagement surface extending in a second plane which is substantially parallel to the first plane.

In another embodiment, the coaxial cable device has a compression driver. The compression driver defines an opening configured to receive the inner conductor. In one embodiment, the coaxial cable device has a body. In another embodiment, the coaxial cable device has a coupler rotatably coupled to the body.

In one embodiment, the coaxial cable device includes a coaxial cable having an inner conductor and an outer conductor, an inner conductor engager having a side wall, and an outer conductor engager welded to at least part of the outer conductor. The side wall includes: (a) a receiving edge configured to receive at least part of the inner conductor; and (b) at least one additional edge defining at least one opening. The additional edge is welded to the received part of the inner conductor.

In another embodiment, the side wall has a circumference and a length. The opening has a longitudinal axis extending along at least part of the length of the side wall. In another embodiment, the opening has a longitudinal axis extending along part of the circumference of the side wall. In one embodiment, the opening has one or more of the following shapes: a circle, an oval, a square, a rectangle, a triangle, a polygon, a shape comprising part of a polygon and at least one curved line, and a shape comprising a plurality of curved lines. In another embodiment, the additional edge comprises a length which is greater than a circumference of the inner conductor.

In one embodiment, the side wall defines a plurality of additional edges, and each edge defines an opening. Each of the additional edges has a length, width and a surface area.

The additional edges are welded to the received part of the inner conductor. The sum of the lengths of the additional edges is greater than the circumference of the inner conductor.

In one embodiment, the opening provides the inner conductor engager with an asymmetric configuration. In another embodiment, the inner conductor has an inner portion comprised of an inner material type. The inner conductor also has an outer portion comprised of a different, outer material type. After the one or more additional edges are welded to the received part, the outer portion of the inner conductor excludes the inner material type.

In one embodiment, the outer conductor comprises a corrugated shape defining: (a) a plurality of peaks and valleys; and (b) an intermediate section extending from each valley to each peak. The outer conductor engager is welded to one of the intermediate sections.

In one embodiment: (a) at least one of the intermediate sections of the outer conductor extends in a first plane; and (b) the outer conductor engager has a conductor engagement surface extending in second plane which is substantially parallel to the first plane.

In another embodiment, the a coaxial cable device is fabricated or manufactured through a process which involves the following steps:

(a) inserting at least part of an outer conductor of a coaxial cable into an opening defined by an outer conductor receiver, wherein, after the insertion, the outer conductor receiver has a receiver weldable section which is adjacent to a conductor weldable section of the outer conductor;

(b) directing energy toward the receiver weldable section and/or the conductor weldable section, wherein the energy is operable to weldably connect the receiver weldable section to the conductor weldable section; and (c) engaging an inner conductor of the coaxial cable with an inner conductor engager.

In one embodiment, the process includes inserting at least part of the inner conductor into a second opening defined by the inner conductor engager. In another embodiment, the outer conductor has a corrugated shape. The corrugated shape defines: (a) a plurality of peaks and valleys; and (b) an intermediate section extending from each valley to each peak. The conductor weldable section has at least part of one of the intermediate sections.

In another embodiment: (a) at least one of the intermediate sections of the outer conductor extends in a first plane; and (b) the receiver weldable section extends in second plane which is substantially parallel to the first plane. In one embodiment, the process includes: (a) inserting at least part of the inner conductor engager within a body; and (b) attaching a rotatable coupler to the body.

In one embodiment, the coaxial cable assembly or device has a coaxial cable including an inner conductor and an outer conductor. The inner conductor has a surface which is deformable to define a recessed space. The device also has an inner conductor engager which is engaged with the inner conductor. Part of the inner conductor engager is deformed to fit within the recessed space. Also, the device has an outer conductor engager welded to the outer conductor.

In one embodiment, the outer conductor engager is configured to receive a portion of the outer conductor, and the outer conductor engager is welded to the received portion of the outer conductor. In another embodiment, the coaxial cable device has a jacket surrounding the outer conductor. The outer conductor engager has: (a) a conductor engagement portion engaged with the outer conductor; and (b) a jacket engagement portion engaged with the jacket. In yet another embodiment, the coaxial cable has a jacket surrounding the outer conductor. The coaxial cable device has a jacket engager engaged with the jacket, and the jacket engager mates with the outer conductor engager. In still another embodiment, the coaxial cable device has a strain relief device. The outer conductor engager has a strain relief engagement portion engaged with the strain relief device.

In another embodiment, the outer conductor engager has: (a) an inner seal holder which holds an outer conduct seal; and (b) an outer seal holder which holds a strain relief device seal. In yet another embodiment, a portion of the outer conductor has an inner surface and an outer surface opposite of the inner surface. The coaxial cable device has an outer conductor support configured to engage the inner surface while the outer conductor engager is engaged with the outer surface. In one embodiment, the inner conductor engager is crimped to the inner conductor.

In another embodiment, the inner conductor has a first wall which partially defines the recessed space. The part of the inner conductor engager has a second wall. The first and second walls are engaged with each other through an engagement, such as a crimped engagement, a frictional engagement, a mating engagement or an interlocked engagement.

In one embodiment, the coaxial cable assembly or device includes: (a) a coaxial cable having an inner conductor and an outer conductor; (b) an inner conductor engager crimped to the inner conductor; and (c) an outer conductor engager welded to the outer conductor.

In one embodiment, the coaxial cable device is manufactured through a process involving the following steps: (a) supporting a coaxial cable which has an inner conductor and an outer conductor; (b) welding an outer conductor engager to the outer conductor; (c) supporting an inner conductor engager, wherein the inner conductor engager is configured to receive a portion of the inner conductor; (d) inserting the portion of the inner conductor into the inner conductor engager; and (e) applying a force to the inner conductor engager when the portion is inserted within the inner conductor engager, wherein the force causes the inner conductor engager and the portion to deform.

In one embodiment, the process includes engaging the outer conductor engager with the jacket. In another embodiment, the process includes engaging a jacket engager engaged with the jacket, wherein the jacket engager mates with the outer conductor engager. In yet another embodiment, the process includes engaging the strain relief device with a strain relief device engagement portion of the outer conductor engager.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

Part I

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms “a”, “an” and “the” include plural referents, unless the context clearly dictates otherwise.

Figure 1:
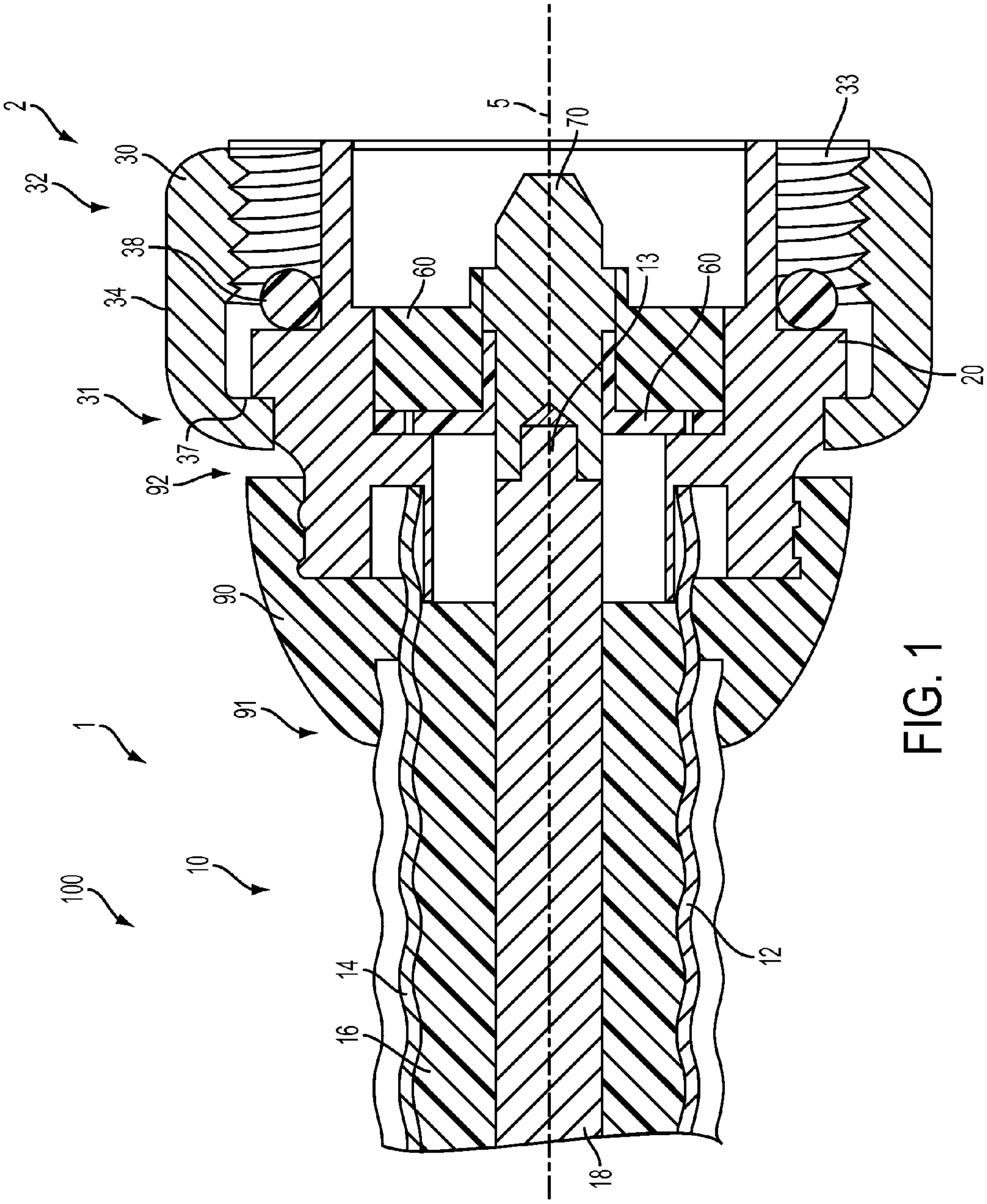
FIG. 1 depicts a cross-sectional view of a first embodiment of a coaxial cable connector.

Referring to the drawings, FIG. 1 depicts an embodiment of a coaxial cable connector 100. Embodiments of connector 100 may be a coaxial cable connector configured to operably attach to a coaxial cable, such as a 50 Ohm coaxial cable. Connector 100 may be a straight connector, a right angle connector, an angled connector, an elbow connector, or any complimentary connector that may receive a center conductor 18 of a coaxial cable 10. Further embodiments of connector 100 may receive a center conductor 18 of a coaxial cable 10, wherein the coaxial cable 10 may include an annular corrugated, spiral or helical corrugated, or smoothwall outer conductor 14. Two connectors, such as connector 100, 300 may be utilized to create a jumper that may be packaged and sold to a consumer. A jumper may be a coaxial cable 10 having a connector, such as connector 100, 300, operably affixed at one end of the cable 10 where the cable 10 has been prepared, and another connector, such as connector 100, 300, operably affixed at the other prepared end of the cable 10. For example, embodiments of a jumper may include a first connector including components/features described in association with connector 100, 300, and a second connector that may also include the components/features as described in association with connector 100, wherein the first connector is operably affixed to a first end of a coaxial cable 10, and the second connector is operably affixed to a second end of the coaxial cable 10. Embodiments of a jumper may include other components, such as one or more signal boosters, molded repeaters, and the like.

Figure 2B:
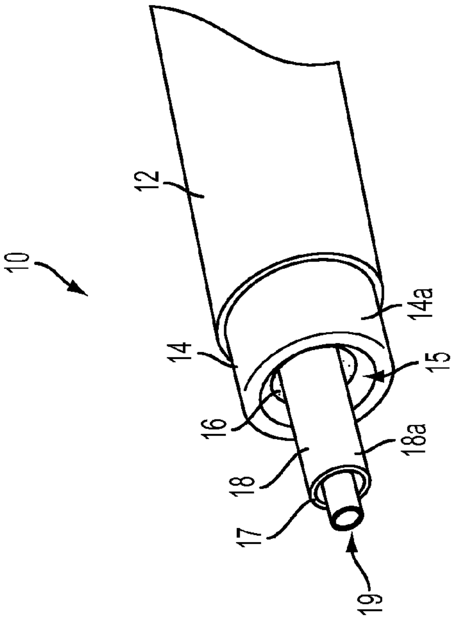
FIG. 2B depicts a perspective view of a second embodiment of a coaxial cable.
Figure 2A:
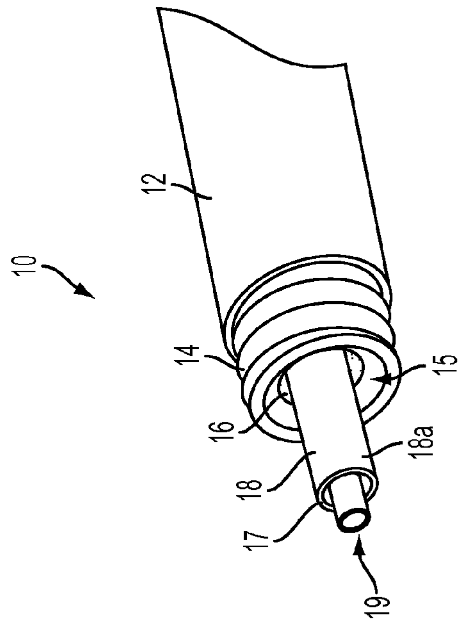
FIG. 2A depicts a perspective view of a first embodiment of a coaxial cable.
Figure 2C:
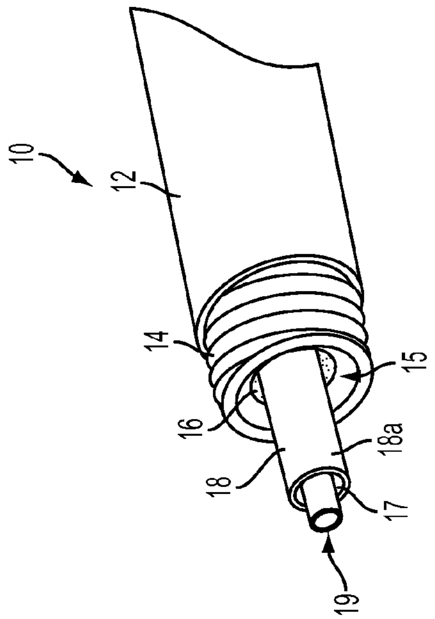
FIG. 2C depicts a perspective view of a third embodiment of a coaxial cable.

Referring to FIGS. 2A-2C, embodiments of a coaxial cable 10 may be securely attached to a coaxial cable connector, such as through a welded engagement. The coaxial cable 10 may include a center conductor 18, such as a strand of conductive metallic material, surrounded by an interior dielectric 16; the interior dielectric 16 may possibly be surrounded by an outer conductor 14; the outer conductor 14 is surrounded by a protective outer jacket 12, wherein the protective outer jacket 12 has dielectric properties and serves as an insulator. Embodiments of the center conductor 18, or inner conductor 18, may include a milled end 19. The milled end 19 of the center conductor 18 may include a shoulder 17, such as an annular lip configured to engage a surface of an electrical component of a coaxial cable connector, such as electrical contact 70. Embodiments of the center conductor 18 may have exposed aluminum in addition to a copper clad external surface, or be made from aluminum with a copper top surface. In other words, embodiments of the center conductor 18 may be prepared in a manner such that the center conductor 18 includes a concentric protrusion, or substantially generally concentric protrusion for centering the center conductor 18 with the electrical contact 70. The outer conductor 14 may extend a grounding path providing an electromagnetic shield about the center conductor 18 of the coaxial cable 10. The outer conductor 14 may be a semi-rigid or rigid outer conductor of the coaxial cable 10 formed of conductive metallic material, such as aluminum or copper, and may be smooth, corrugated or otherwise grooved. For instance, the outer conductor 14 may be annularly ribbed, as shown in FIG. 2A, smooth walled, as shown in FIG. 2B, or spiral or helical corrugated, as shown in FIG. 2C. The coaxial cable 10 may be prepared by removing a portion of the protective outer jacket 12 so that a length of the outer conductor 14 may be exposed, and then coring out a portion of the dielectric 16 to create a cavity 15 or space between the outer conductor 14 and jacket 12, and the center conductor 18. For instance, the cable 10 may be prepared in a manner that the jacket 12 and the dielectric 16 inside the cable 10 are removed by 1.5 corrugations respectively, such that the outer conductor 14 extends approximately 10-15 mm from beyond the dielectric 16 and jacket 12. In some embodiments, the dielectric 16 is not removed or cored out and extends approximately as far as the outer conductor 14. Moreover, embodiments of the protective outer jacket 12 can physically protect the various components of the coaxial cable 10 from damage that may result from exposure to dirt or moisture, and from corrosion. Moreover, the protective outer jacket 12 may serve in some measure to secure the various components of the coaxial cable 10 in a contained cable design that protects the cable 10 from damage related to movement during installation in the field. The outer conductor 14 can be comprised of conductive materials suitable for carrying electromagnetic signals and/or providing an electrical ground connection or electrical path connection. Various embodiments of the outer conductor layer 14 may be employed to screen unwanted noise. The dielectric 16 may be comprised of materials suitable for electrical insulation. The protective outer jacket 12 may also be comprised of materials suitable for electrical insulation. It should be noted that the various materials of which all the various components of the coaxial cable 10 should have some degree of elasticity allowing the cable 10 to flex or bend in accordance with traditional broadband communications standards, installation methods and/or equipment. It should further be recognized that the radial thickness of the coaxial cable 10, protective outer jacket 12, outer conductor 14, interior dielectric 16, and/or center conductor 18 may vary based upon generally recognized parameters corresponding to broadband communication standards and/or equipment.

Referring back to FIG. 1, embodiments of connector 100 may include a coupling interface 30, a sealing member 90, an electrical contact 70, a connector body 20, a first insulator body 50, and a second insulator body 60.

Embodiments of connector 100 may include a coupling interface 30. Embodiments of coupling interface 30 may include a first end 31, a second end 32, an inner surface 33, and an outer surface 34. Embodiments of the coupling interface 30 may be operably attached to the connector body 20, wherein the coupling interface 30 may be rotatable about the connector body 20. Furthermore, embodiments of the coupling interface 30 may include an internal lip 37. The internal lip 37 may engage a portion of the connector body 20, such as a lip or annular edge, which can hinder or prevent axial movement of the coupling interface 30 with respect to the connector body 20. Embodiments of the coupling interface 30 may be configured to physically mate or threadably engage a port, such an equipment port on a cell tower or other broadband equipment, or another coaxial cable connector. The coupling interface 30 may include a threaded inner surface 33 proximate or otherwise near the second end 32. Embodiments of the coupling interface 30 may be a nut, a coupler member, a coupling, and the like. The coupling interface 30 may be comprised of conductive material, such as aluminum, brass, copper, or any suitable metal. However, embodiments of the coupling interface 30 may be comprised of both conductive materials and insulator materials. Manufacture of the coupling interface 30 may include casting, extruding, cutting, turning, tapping, drilling, injection molding, blow molding, or other fabrication methods that may provide efficient production of the component. Those in the art should appreciate that various embodiments of the coupling interface 30 may also comprise various inner or outer surface features, such as annular grooves, detents, tapers, recesses, and the like, and may include one or more structural components having insulating properties located within the coupling interface 30.

Referring still to FIG. 1, embodiments of connector 100 may include a sealing member 90 disposed onto the connector 100. Embodiments of the sealing member 90 may sealingly engage portions of the cable 10 and connector body 20 while operably assembled to provide an environmental seal for the connector 100 and/or to provide strain relief. Embodiments of the sealing member 90 may be a seal, a cover, a mould, a boot, a sealing boot, a strain relief member, and the like. Embodiments of the sealing member 90 may be overmolded over the connector 100. The sealing member 90 may be assembled onto the connector 100 after the center conductor 18 and the outer conductor 14 have been welded to the electrical contact 70 and the outer housing 20, respectively. For instance, the sealing member 90 may be placed onto the cable 10 a distance away from the exposed outer conductor 14 during the installation of the connector 100, and then the sealing member 90 may be slid towards the coupling interface 30 to cover the cable 10 and the connector 100 at a desired location (e.g. where the welds are located or to the rear of the first end 31 of the coupling interface 30). The sealing member 90 may provide a seal for the connector interface region to prevent the ingress of moisture and/or other environmental elements which may degrade or otherwise harm/damage the cable connection (e.g. welded connection) with the connector 100. The sealing member 90 may also provide strain relief. Moreover, the sealing member 90 may have a generally tubular body that is elastically deformable by nature of its material characteristics and design. In most embodiments, the sealing member 90 may be a one-piece element made of a compression molded, elastomer material having suitable chemical resistance and material stability (i.e., elasticity) over a temperature range between about −40° C. to +40° C. For example, the sealing member 90 may be made of silicone rubber. Alternatively, the material may be propylene, a typical O-ring material. The thickness and length of the sealing member 90 may vary according to the desired elasticity and sealing properties needed.

Figure 3:
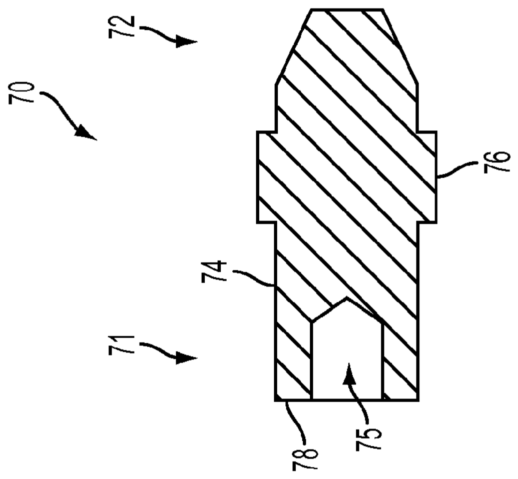
FIG. 3 depicts a cross-sectional view of a first embodiment of an electrical contact.

Referring to FIG. 1, and with additional reference to FIG. 3, embodiments of connector 100 may include an electrical contact 70. Embodiments of electrical contact 70 may include a first end 71, a second end 72, and an exterior surface 74. Electrical contact 70 may be a conductive element that may extend or carry an electrical current and/or signal from a first point to a second point. Contact 70 may be a terminal, a pin, a conductor, an electrical contact, a curved contact, a bended contact, an angled contact, and the like, and may be configured to be inserted into a conductive receptacle or socket of a corresponding port or connector. Embodiments of the electrical contact 70 should be formed of conductive materials. Moreover, embodiments of electrical contact 70 may include a receptacle 75 proximate or otherwise near the first end 71. The receptacle 75 may be an opening, cavity, socket, receptacle portion, inlet, and the like, that may receive the center conductor 18, in particular, the milled end 19 of the center conductor 18. Embodiments of the receptacle 75 of the electrical contact 70 may taper to a reduced diameter to match the shape/formation of the milled end 19 of the center conductor 18; the receptacle 75 may include a cross-section other than a taper, and may have a cross-section that corresponds to the cross-section of the milled end 19 of the center conductor 18. Additionally, embodiments of the electrical contact 70 may include an annular protrusion 76 defining an edge that may abut or engage a portion 56 of the first insulator 50.

Furthermore, embodiments of the electrical contact 70 may include a face 78 proximate the first end 71 of the electrical contact 70. Embodiments of the face 78 may be configured to engage the shoulder 17 of the center conductor 18. Embodiments of face 78 of the electrical contact 70 may be a surface of the electrical contact 70 that is generally perpendicular to a central, longitudinal axis 5 of the connector 100. However, face 78 can be ramped or otherwise non-perpendicular to the central axis 5. The face 78 of the electrical contact 70 may also be defined as a mating edge or surface of the electrical contact 70 that is configured to physically engage the shoulder 17 of the milled end 19 of the center conductor 18 in a final position of the connector 100. For instance, the receptacle 75 may accept/receive the milled end 19 of the incoming center conductor 18 of the coaxial cable 10 as coaxial cable 10 is further inserted into the connector body 20, wherein the milled end 19 of the center conductor 18 may be advanced into the receptacle 75 of the electrical contact 70; those having skill in the art should understand that the electrical contact 70 may be advanced onto the milled end 19 of the center conductor 18.

Figure 7:
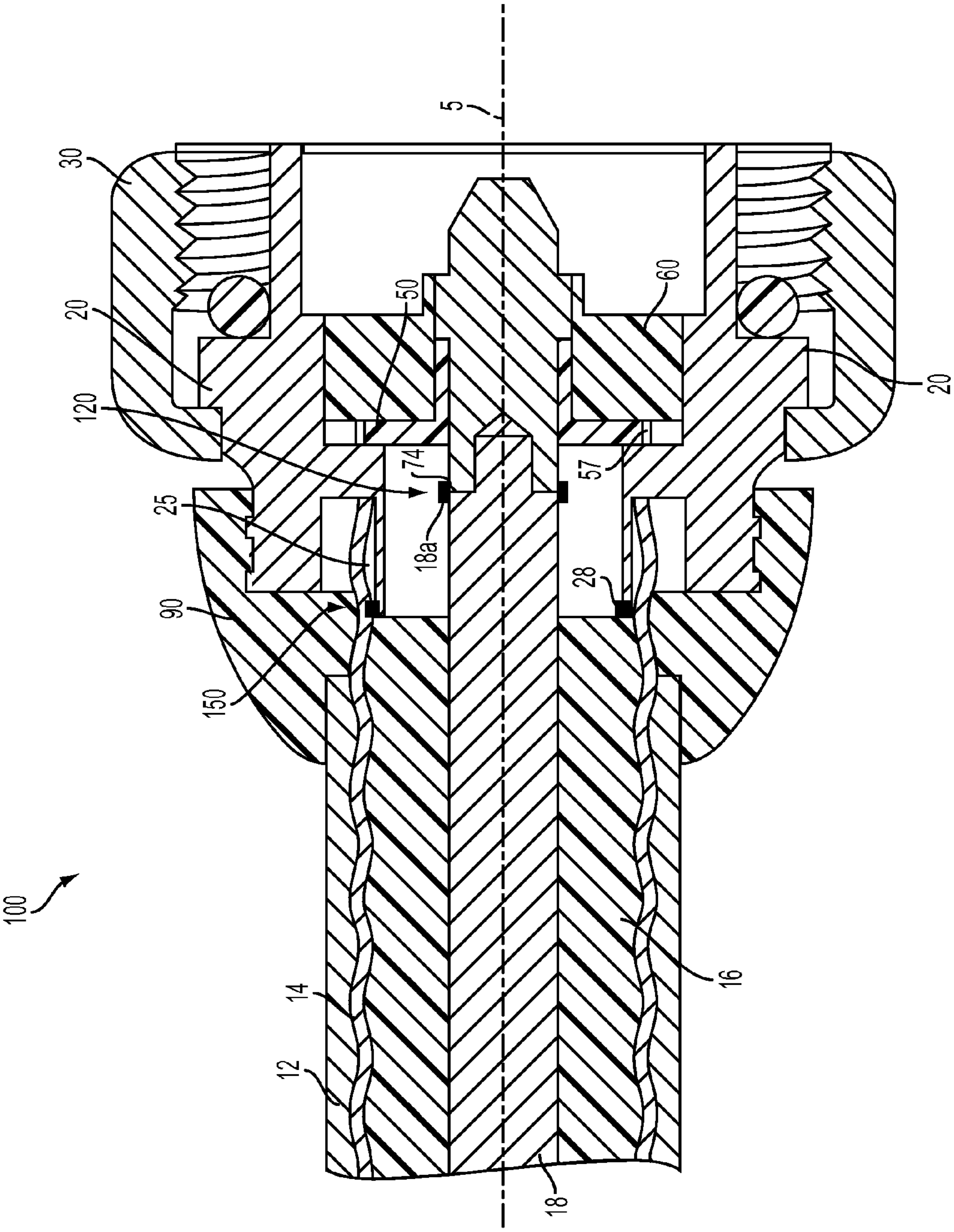
FIG. 7 depicts a cross-sectional view of the first embodiment of the coaxial cable connector having a first and second weld.

Moreover, the electrical contact 70 may be welded to the center conductor 18 at a first weld 120, as shown in FIG. 7. Embodiments of the first weld 120 may be a weld or weld joint at a location along the exterior surface 74 of the electrical contact 70 and the exterior surface 18*a* of the center conductor 18*a*, where the shoulder 17 of the center conductor 18 mates, contacts, or resides proximate the face 78 of the electrical contact 70. Embodiments of the first weld joint 120 may be along an outer surface 18*a* of the center conductor 18, wherein the outer surface 18*a* is parallel or substantially or approximately parallel to the central axis 5. The first weld 120 may mechanically and electrically join the electrical contact 70 and the center conductor 18 through a welding process, thereby establishing a continuous electrical path between the center conductor 18 and the electrical contact 70. The first weld 120 may be annular, such that the weld encircles or extends completely around the circumference of the center conductor 18; however, in some examples, the first weld 120 may not extend completely annularly around the circumference of the center conductor 18 while still providing a continuous electrical path for a central signal from the center conductor 18 through the electrical contact 70. The first weld 120 may be created by laser beam welding having either a continuous or pulsed laser beam. Those having skill in the art should appreciate that although embodiments of the first weld 120 is described as being created through a laser welding process, other welding processes and techniques may be used to weld, coalesce, or join two metal cable and connector components, and other energy sources may be used, such as gas, gas flame, electron beam, friction, ultrasound, and the like.

Figure 4:
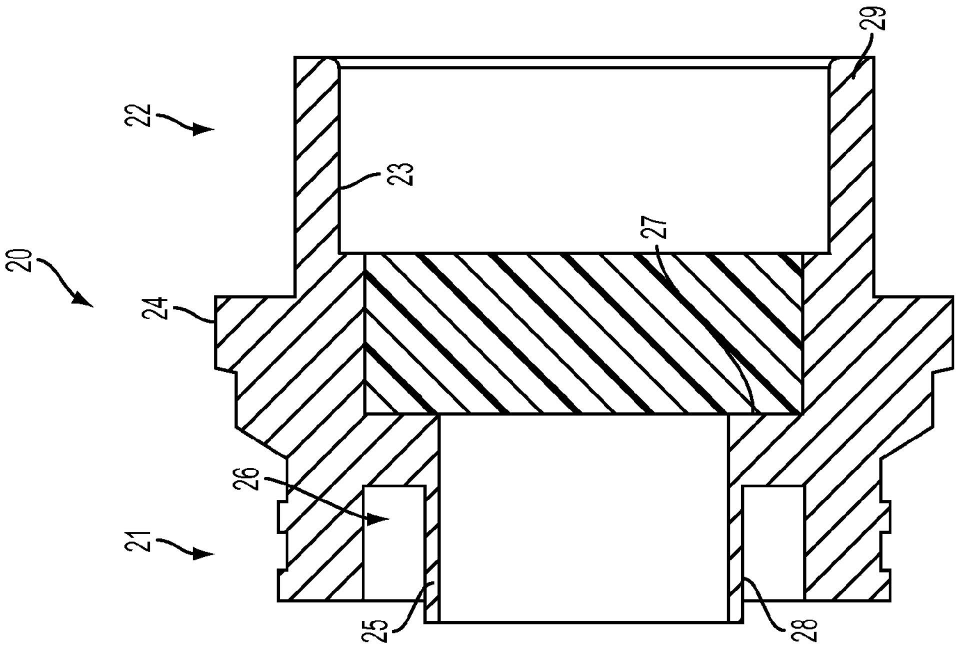
FIG. 4 depicts a cross-sectional view of a first embodiment of a connector body.

With continued reference to FIG. 1, and with additional reference to FIG. 4, embodiments of connector 100 may include a connector body 20. Embodiments of the connector body 20 may include a first end 21, a second end 22, an inner surface 23, and an outer surface 24. Proximate or otherwise near the first end 21, the connector body 20 may include a connector body ferrule portion 25, wherein the connector body ferrule portion 25 may be surrounded by an opening or radial cavity 26. Embodiments of the connector body ferrule portion 25 may be structurally integral with the connector body 20, and may have an inner diameter that is less than an inner diameter of the connector body 20 proximate the second end 22. The connector body ferrule portion 25 may be generally annular, and may include a welding surface 28. Embodiments of the welding surface 28 of the connector body ferrule portion 25 may be an outer surface of the connector body ferrule portion 25 that is configured to weldingly engage the outer conductor 14 at a second weld 150, as shown in FIG. 7. Embodiments of the welding surface 28 may be parallel or substantially or approximately parallel to the central axis 5. The connector body ferrule portion 25 may be disposed within the cavity 15 of the cable 10, wherein the cavity 15 may be defined as a radial space between an inner surface of the outer conductor 14 and the outer surface of the center conductor 18 where a portion of dielectric 16 has been removed. Embodiments of the connector body ferrule portion 25 may be disposed within the cavity 15 of the cable until it makes contact with the dielectric 16 within the cable 10.

The outer diameter of the connector body ferrule portion 25 may be sized and dimensioned to fit within/underneath the outer conductor 14, such that when the connector body 20 is attached or placed into a position for attachment to the cable 10, the connector body ferrule portion 25 physically contacts, or resides proximate, the inner surface of the outer conductor 14. Embodiments of the second weld 150 may be a weld or weld joint at a location where the outer conductor 14 physically contacts the welding surface 28 of the connector body ferrule portion 25. In one embodiment, the second weld 150 may occur approximately 8 mm-17 mm from a forward, exposed end of the outer conductor 14. Furthermore, embodiments of the second weld 150 may occur at a valley of a corrugation of the outer conductor 14 (if the outer conductor 14 is corrugated or otherwise grooved). The second weld 150 may mechanically and electrically join the connector body 20 and the outer conductor 14 through a welding process, thereby establishing a continuous electrical path between the outer conductor 14 and the connector body 20. The second weld 150 may be annular, such that the weld encircles or extends completely around the circumference of the outer conductor 14; however, in some examples, the second weld 150 may not extend completely annularly around the circumference of the outer conductor 14 while still providing a continuous electrical ground path from the outer conductor 14 through the connector body 20. The second weld 150 may be created by laser beam welding having either a continuous or pulsed laser beam. Those having skill in the art should appreciate that although embodiments of the second weld 150 is described as being created through a laser welding process, other welding processes and techniques may be used to weld, coalesce, or join two metal cable and connector components, and other energy sources may be used, such as gas, gas flame, electron beam, friction, ultrasound, and the like.

Embodiments of the connector body 20 may be a generally annular member having a generally axial opening therethrough. An annular lip 27 may define a change in an inner diameter of the connector body 20; the lip 27 may define an increase in the inner diameter of the connector body 20 with respect to the connector body ferrule portion 25. Embodiments of a first insulator body 50 and a second insulator body 60 may be configured to be disposed within the general opening of the connector body 20, and may engage the annular lip 27 to hinder further axial movement of the first and second insulator bodies 50, 60 in a direction towards the cable 10. Moreover, embodiments of the connector body 20 may include an annular protrusion 24 that may include one or more edges configured to cooperate with a lip, surface, or edge of the coupler interface 30. Embodiments of the connector body 20 may be comprised of conductive material, such as aluminum, brass, copper, or any suitable metal. However, embodiments of the connector body 20 may be comprised of both conductive materials and insulator materials. Manufacture of the connector body 20 may include casting, extruding, cutting, turning, tapping, drilling, injection molding, blow molding, or other fabrication methods that may provide efficient production of the component. Those in the art should appreciate that various embodiments of the connector body 20 may also comprise various inner or outer surface features, such as annular grooves, detents, tapers, recesses, and the like.

Figure 5:
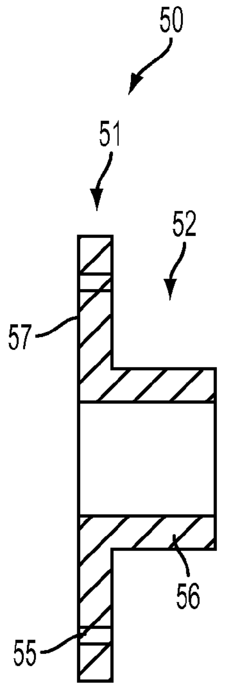
FIG. 5 depicts a cross-sectional view of an embodiment of a first insulator body.

Referring still to FIG. 1, and with additional reference to FIG. 5, embodiments of connector 100 may include a first insulator body 50. Embodiments of the first insulator body 50 may include a first end 51, a second end 52, a disk portion 57 and ferrule portion 56. Embodiments of the first insulator body 50 may be an insulator, an insulating disk, a bead, and the like. Embodiments of the first insulator 50 may be disposed within the connector body 20. For instance, embodiment of the first insulator body 50 may be inserted, snapped into, or press-fit within the general axial opening of the connector body 20 and around the electrical contact 70, entering from the second end 22 of the connector body 20. The first end 51 of the first insulator body 50 may contact the annular lip 27 of the connector body 20, in particular, the disk portion 57 may be configured to physically contact or reside proximate the annular lip 27 of the connector body 20, and may also peripherally contact the inner surface of the connector body 20. Embodiments of the disk portion of the first insulator body 50 may be slotted. For example, the disk portion may include one or more openings 55. Embodiments of the openings 55 may be slots, holes, openings, tunnels, bores and the like. Moreover, embodiments of the first insulator body 50 may include a ferrule portion 56 that is structurally integral with the disk portion 57, so as have a "L" shaped cross-section. Embodiments of the disk portion 57 and the ferrule portion 56 may be configured to surround the electrical contact 70 to electrically isolate and/or seal the electrical contact, or central signal, from the connector body 20, or the electrical ground path. Furthermore embodiments of the first insulator body 50 may be made of non-conductive, insulator materials, such as a plastic. Manufacture of the first insulator body 50 may include casting, extruding, cutting, turning, drilling, compression molding, injection molding, spraying, or other fabrication methods that may provide efficient production of the component.

Figure 6:
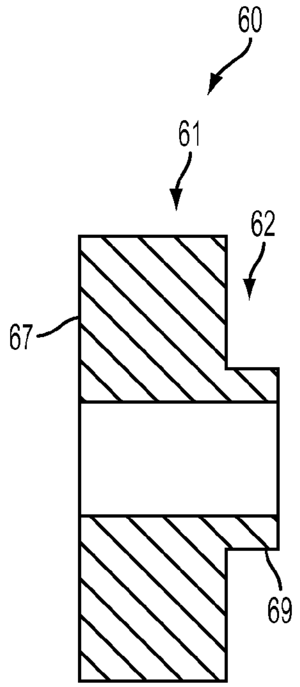
FIG. 6 depicts a cross-sectional view of an embodiment of a second insulator body.

Referring again to FIG. 1, with additional reference to FIG. 6, embodiments of connector 100 may include a second insulator body 60. Embodiments of the second insulator body 60 may include a first end 61, a second end 62, a mating surface 69, and an annular recessed portion 69 proximate the second end 62. The second insulator body 60 may be configured to surround the ferrule portion 56, or a portion of the ferrule portion 56 of the first insulator body 50. For instance, embodiments of the second insulator body 60 may be disposed within the connector body 20, and around at least a portion of the first insulator body 50. In some embodiments, when the second insulator 60 is inserted within the connector body 20 and into engagement with the first insulator body 50, the non-slotted second insulator body 60 may stabilize the slotted disk portion 57 of the first insulator body 50 so that the center conductor 18 can also be stabilized within the connector 100 in an axial direction. Furthermore, embodiments of the second insulator body 60 may also provide an electrical seal between the electrical contact 70, or central signal, from the connector body 20, or the electrical ground path.

Figure 8A:
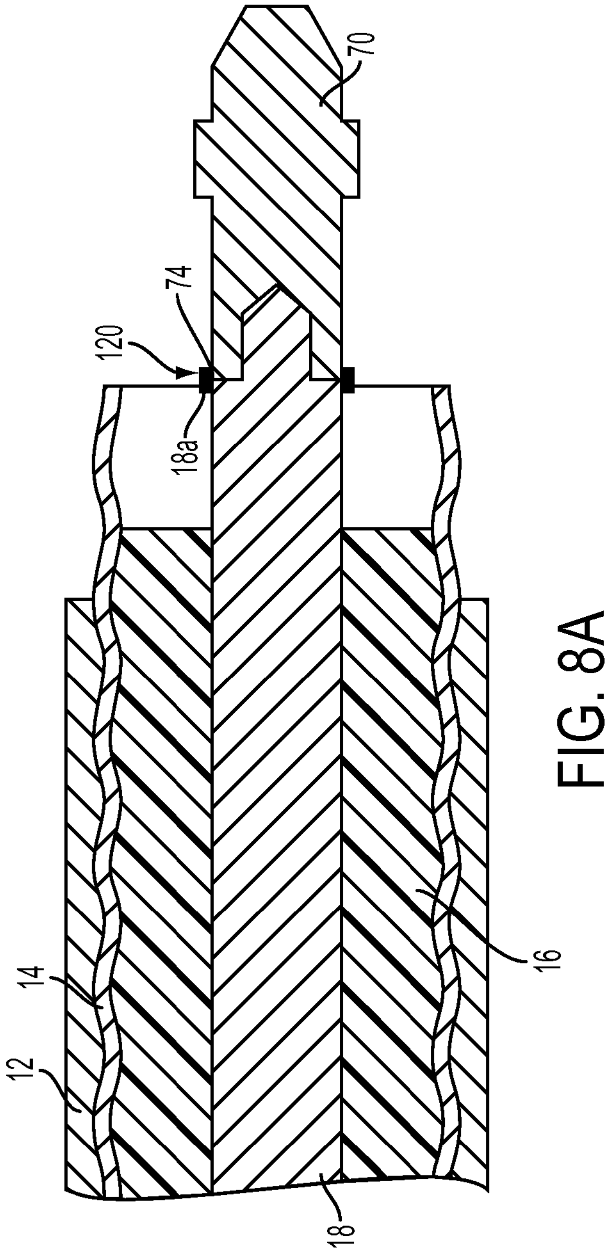
FIG. 8A depicts a cross-sectional view of the first embodiment of the electrical contact welded to a center conductor of a coaxial cable.
Figure 8B:
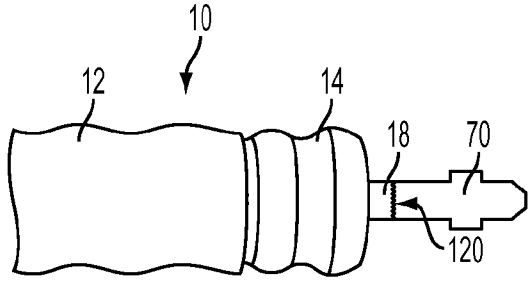
FIG. 8B depicts a top view of the first embodiment of the electrical contact welded to a center conductor of a coaxial cable.

With continued reference to the drawings, the manner in which the connector 100 is assembled and/or installed will now be described. FIG. 7 depicts an embodiment of connector 100 in an assembled, welded position. The connector 100 is securably affixed to the cable 10 through one or more welds, such as the first weld 120 and the second weld 150. To arrive at the assembled, welded position, an installer can attach the connector 100 to the cable 10. For example, an installer may first prepare the cable 10 in a manner that the jacket 12 and the dielectric 16 inside the cable 10 are removed by approximately 1.5 corrugations of the outer conductor 14, which can range between 10 mm-17 mm in length from the end of the outer conductor 14. In some embodiments, the number of corrugations may be larger, and in the case of a smoothwall outer conductor, the length of removed portion of jacket 12 and dielectric may also be between approximately 10 mm-17 mm. Once the jacket 12 is removed and the dielectric 16 is cored out to create cavity 15, the electrical contact 70 (i.e. the inner conductor of the connector) may be attached to the center conductor 18 by placing the receptacle 75 of the electrical contact 70 over the milled end 19 of the center conductor 18 until the face 78 of the electrical contact makes contact or resides proximate the shoulder 17 of the center conductor 18. While the electrical contact is in place, an installer may weld the center conductor 18 to the electrical contact 70, using a laser or other energy source and/technique, to create a first weld 120. The first weld 120 can be along an exterior or outer surface **18*a* of the center conductor 18 and along an exterior or outer surface 74 of the electrical contact 70, at a point or axial location where the two components meet, as shown in FIGS. 8A and 8B. In embodiments where the material of the center conductor 18 is copper or copper plated brass, the first weld joint 120 may be performed between the copper clad of the center conductor 18 and the electrical contact 70 of the connector 100. In embodiments where the material of the center conductor 18 is aluminum, the first weld joint 120 may be performed between the core of the center conductor 18 and the electrical contact 70**.

Figure 9:
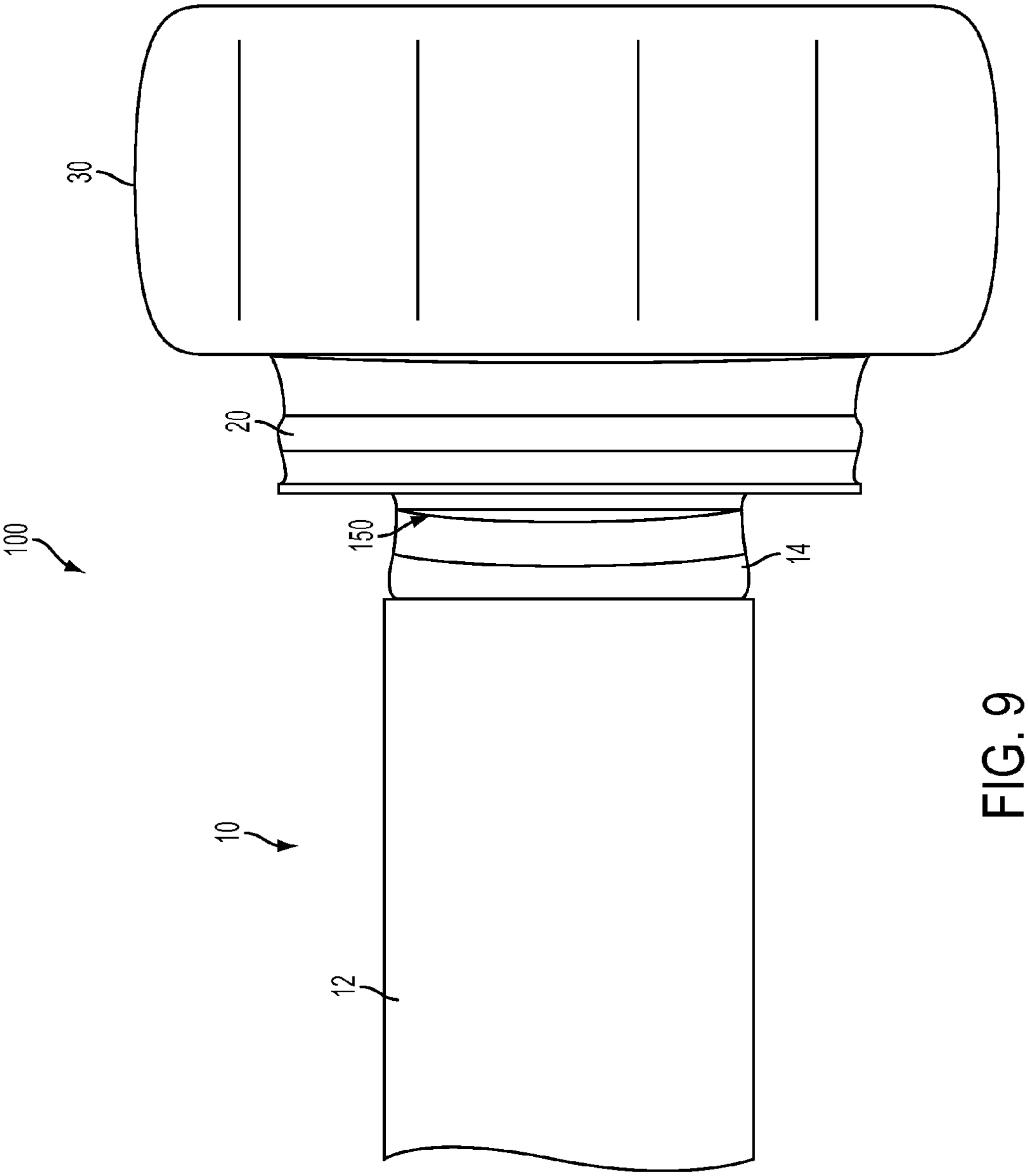
FIG. 9 depicts a top view of the first embodiment of the connector body welded to an outer conductor of the coaxial cable connector.

After the electrical contact 70 of the connector 100 is welded to the center conductor 18, the connector body 20 (and potentially the coupling interface 30 rotatably attached to the connector body 20) may be securably attached to the outer conductor 14 through a second weld 150. An installer may place the connector body ferrule portion 25 of the connector body 20 within the outer conductor 14 to a position where the outer conductor 14 can be welded to the connector body ferrule portion 25. For instance, the connector body ferrule portion 25 may be disposed within the outer conductor 14 of the cable a distance such that the welding surface 28 of the connector body ferrule portion 25 contacts the outer conductor 14 at one or more axial locations along the welding surface 28. In other words, at least a portion of the connector body 20 may be underneath at least one corrugation valley of an outer conductor 14. While the connector body 20 is in position within the outer conductor 14 as described above, an installer may weld the outer conductor 14 to the connector body 20, using a laser or other energy source and/technique, to create a second weld 150, as shown in FIG. 7 and FIG. 9. The second weld joint 150 can be created by applying a laser beam to the outer conductor 14 (or connector body ferrule portion 25) and using a melting material of the outer conductor 14 of the cable 10 (or connector body ferrule portion 25) as a filler material to weld the outer conductor 14 to the connector body 20, or a particular embodiment, the connector body ferrule portion 25 of the connector body 20.

Furthermore, after one or both the first weld 120 and second weld 150 have been created so as to weldingly secure the center conductor 18 and the outer conductor 14 to the connector 100, a sealing member, such as sealing member 90, may be advanced along the cable 10 or connector 100 to cover any exposed portion of the connector 100 or cable 10. For example, embodiments of the seal member 90 may be rolled or otherwise advanced away from the prepared end of the cable 10 to expose a portion of the outer conductor 14 to allow access of the laser beam to weld the outer conductor 14 to the connector body 20, and then the sealing member 90 may be rolled or otherwise advanced over the exposed outer conductor 14 to seal, cover, protect, shelter, etc. the outer conductor 14 and the second weld 150. Embodiments of the sealing member 90 may also seal, cover, protect, etc. portions of the cable jacket 12, portions of the outer conductor 14, and portions of the connector 100, such as the connector body 20. Additionally, an installer may insert the first insulator body 50 and the second insulator body 60 within the connector body 20, as described above.

Figure 11:
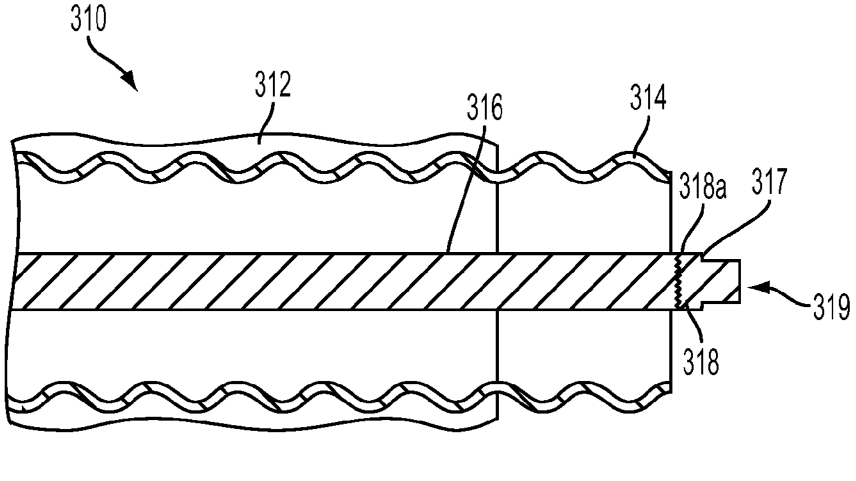
FIG. 11 depicts a cross-sectional view of a fourth embodiment of a coaxial cable.
Figure 10:
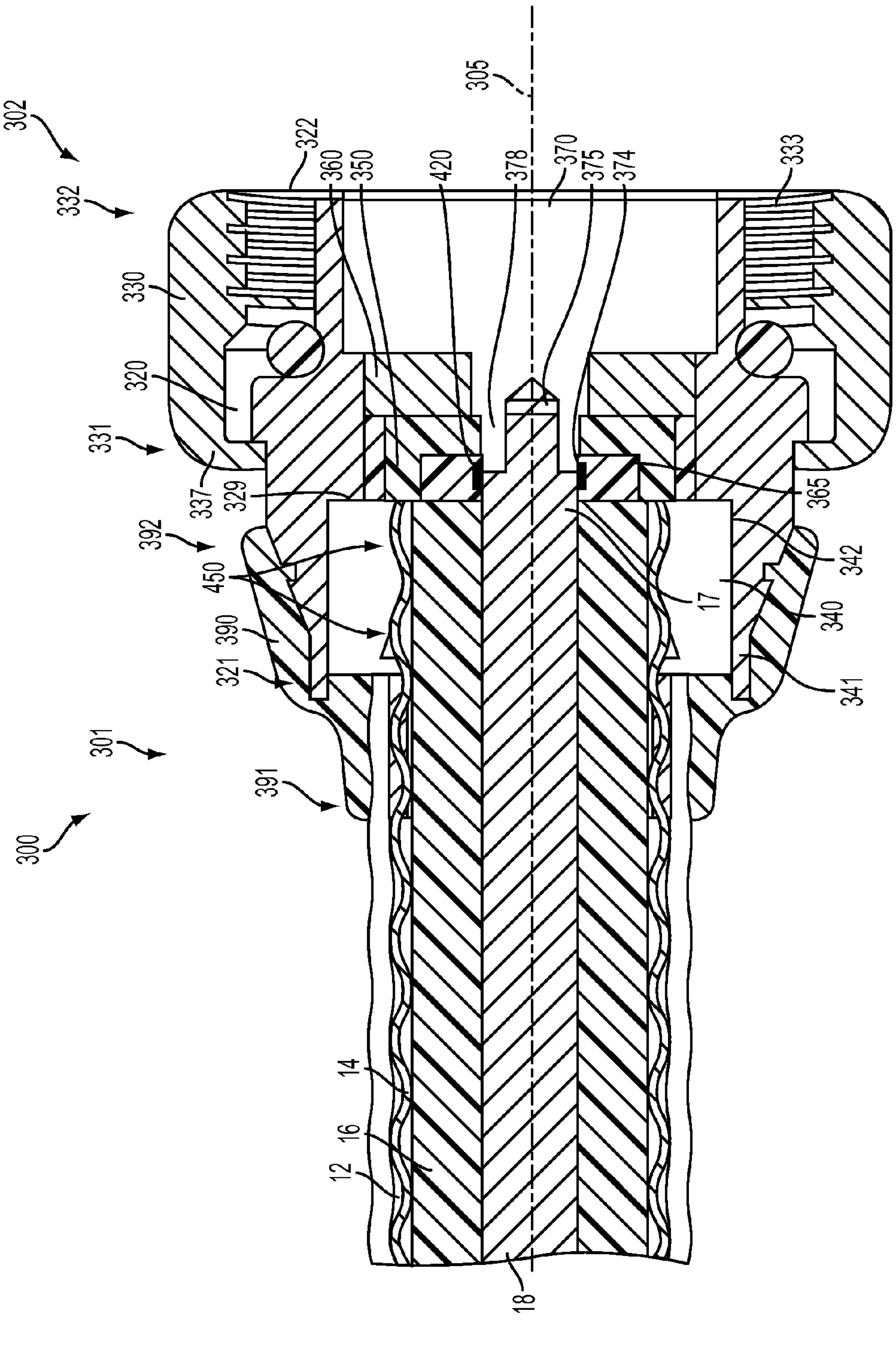
FIG. 10 depicts a cross-sectional view of a second embodiment of a coaxial cable connector.

Referring still to the drawings, FIG. 10 depicts an embodiment of connector 300. Embodiments of connector 300 may be a coaxial cable connector configured to operably attach to a coaxial cable, such as a 50 Ohm coaxial cable. Connector 300 may be a straight connector, a right angle connector, an angled connector, an elbow connector, or any complimentary connector that may receive a center conductor 318 of a coaxial cable 310. Further embodiments of connector 300 may receive a center conductor 318 of a coaxial cable 310, wherein the coaxial cable 310 may include an annular corrugated, spiral or helical corrugated, or smoothwall outer conductor 314. Embodiments of cable 310, as shown in FIG. 11, may share the same or substantially the same structural and/or functional aspects of cable 10. However, embodiments of cable 310 may include a dielectric layer 316 that is not cored out to create a cavity, such as cavity 15. Those skilled in the art should appreciate that a portion of the dielectric 316 may be cored out to create a cavity or radial opening between the outer conductor 314 and the center conductor 318 in some embodiments.

Embodiments of connector 300 may share the same or substantially the same structural and functional aspects of connector 100. For instance, embodiments of connector 300 may include a coupling interface 330, a connector body 320, one or more insulator bodies 350, 355, 360, and a sealing member 390. However, embodiments of connector 300 may include a welding component 340 to facilitate the welding of the outer conductor 14 to the connector 300.

Embodiments of connector 300 may include a coupling interface 300; embodiments of coupling interface 330 may share the same or substantially the same structural and/or functional aspects as coupling interface 390. Embodiments of coupling interface 330 may include a first end 331, a second end 332, an inner surface 333, and an outer surface 334. Embodiments of the coupling interface 330 may be operably attached to the connector body 320, wherein the coupling interface 330 may be rotatable about the connector body 320. Furthermore, embodiments of the coupling interface 330 may include an internal lip 337. The internal lip 337 may engage a portion of the connector body 320, such as a lip or annular edge, which can hinder or prevent axial movement of the coupling interface 330 with respect to the connector body 320. Embodiments of the coupling interface 330 may be configured to physically mate or threadably engage a port, such an equipment port on a cell tower or other broadband equipment, or another coaxial cable connector. The coupling interface 330 may include a threaded inner surface 333 proximate or otherwise near the second end 332. Embodiments of the coupling interface 330 may be a nut, a coupler member, a coupling, and the like. The coupling interface 330 may be comprised of conductive material, such as aluminum, brass, copper, or any suitable metal. However, embodiments of the coupling interface 330 may be comprised of both conductive materials and insulator materials. Manufacture of the coupling interface 330 may include casting, extruding, cutting, turning, tapping, drilling, injection molding, blow molding, or other fabrication methods that may provide efficient production of the component. Those in the art should appreciate that various embodiments of the coupling interface 330 may also comprise various inner or outer surface features, such as annular grooves, detents, tapers, recesses, and the like, and may include one or more structural components having insulating properties located within the coupling interface 330.

Referring still to FIG. 10, embodiments of connector 300 may include a sealing member 390 disposed onto the connector 300; embodiments of the sealing member 390 may share the same or substantially the same structural and/or functional aspects of sealing member 90. Embodiments of the sealing member 390 may sealingly engage portions of the cable 10 and connector body 320 while operably assembled to provide an environmental seal for the connector 300 and/or to provide strain relief. Embodiments of the sealing member 390 may be a seal, a cover, a mould, a boot, a sealing boot, a strain relief member, and the like. Embodiments of the sealing member 390 may be overmolded over the connector 300. The sealing member 390 may be assembled onto the connector 300 after the center conductor 318 and the outer conductor 314 have been welded to the electrical contact 370 and the welding component 340, respectively. For instance, the sealing member 390 may be placed onto the cable 310 a distance away from the exposed outer conductor 314 during the installation of the connector 300, and then the sealing member 390 may be slid towards the coupling interface 330 to cover a portion of the cable 310 and the connector 300 at a desired location (e.g. where the welds are located or to the rear of the first end 331 of the coupling interface 330). The sealing member 390 may provide a seal for the connector interface region to prevent the ingress of moisture and/or other environmental elements which may degrade or otherwise harm/damage the cable connection (e.g. welded connection) with the connector 300. The sealing member 390 may also provide strain relief. Moreover, the sealing member 390 may have a generally tubular body that is elastically deformable by nature of its material characteristics and design. In most embodiments, the sealing member 390 may be a one-piece element made of a compression molded, elastomer material having suitable chemical resistance and material stability (i.e., elasticity) over a temperature range between about −40° C. to +40° C. For example, the sealing member 390 may be made of silicone rubber. Alternatively, the material may be propylene, a typical O-ring material. The thickness and length of the sealing member 90 may vary according to the desired elasticity and sealing properties needed.

Figure 12:
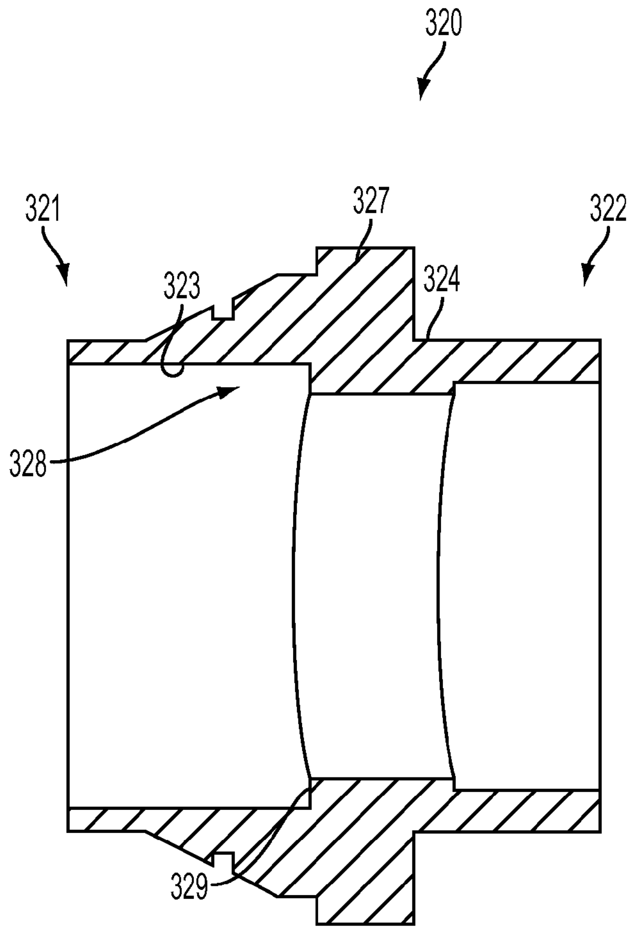
FIG. 12 depicts a cross-sectional view of a second embodiment of a connector body.

With continued reference to FIG. 10, with additional reference to FIG. 12, embodiments of the connector 300 may include a connector body 320. Embodiments of connector body 320 may share the same or substantially the same structural and/or functional aspects of connector body 20, described in association with connector 100. For instance, embodiments of connector body 320 may include a first end 321, a second end 322, an inner surface 323, an outer surface 324, and a generally axial opening therethrough. However, instead of a connector body ferrule portion, embodiments of connector body 320 may include an internal opening 328 or recess configured to receive a welding component 340. Embodiments of the opening 328 may be located proximate or otherwise near the first end 321 of the connector body 320. Embodiments of the opening 328 may be defined as a space, opening, void, recess, etc. between an internal edge 329 and the first end 321 of the connector body 320. The size of the opening 328 may depend on the axial distance from the first end 321 to the internal edge 329, as well as the internal diameter of the connector body 320 from the first end 321 to the internal edge 329. The opening 328 may be sized and dimensioned to accommodate the welding component 340. For instance, the welding component 340 may disposed within the connector body 320. In one embodiment, the welding component 340 may be press-fit within the opening 328 of the connector body 320. Moreover, embodiments of a first insulator body 350 and a second insulator body 360 may be configured to be disposed within the general opening of the connector body 320, and may engage a portion of the welding component 340, cable 310, and/or connector body 320 in an assembled position to hinder further axial movement of the first and second insulator bodies 350, 360 in a direction towards the cable 310. Moreover, embodiments of the connector body 320 may include an annular protrusion 327 that may include one or more edges configured to cooperate with a lip, surface, or edge of the coupler interface 330. Embodiments of the connector body 320 may be comprised of conductive material, such as aluminum, brass, copper, or any suitable metal. However, embodiments of the connector body 320 may be comprised of both conductive materials and insulator materials. Manufacture of the connector body 320 may include casting, extruding, cutting, turning, tapping, drilling, injection molding, blow molding, or other fabrication methods that may provide efficient production of the component. Those in the art should appreciate that various embodiments of the connector body 320 may also comprise various inner or outer surface features, such as annular grooves, detents, tapers, recesses, and the like.

Embodiments of the connector 300 may include an electrical contact 370; embodiments of electrical contact 370 may share the same or substantially the same structural and functional aspects of electrical contact 70. Embodiments of electrical contact 370 may include a first end 371, a second end 372, and an exterior surface 374. Electrical contact 370 may be a conductive element that may extend or carry an electrical current and/or signal from a first point to a second point. Contact 370 may be a terminal, a pin, a conductor, an electrical contact, a curved contact, a bended contact, an angled contact, and the like, and may be configured to be inserted into a conductive receptacle or socket of a corresponding port or connector. Embodiments of the electrical contact 370 should be formed of conductive materials. Moreover, embodiments of electrical contact 370 may include a receptacle 375 proximate or otherwise near the first end 371. The receptacle 375 may be an opening, cavity, socket, receptacle portion, inlet, and the like, that may receive the center conductor 318, in particular, the milled end 319 of the center conductor 318. Embodiments of the receptacle 375 of the electrical contact 370 may taper to a reduced diameter to match the shape/formation of the milled end 319 of the center conductor 318; the receptacle 375 may include a cross-section other than a taper, and may have a cross-section that corresponds to the cross-section of the milled end 319 of the center conductor 318.

Furthermore, embodiments of the electrical contact 370 may include a face 378 proximate the first end 371 of the electrical contact 370. Embodiments of the face 378 may be configured to engage the shoulder 317 of the center conductor 318. Embodiments of face 378 of the electrical contact 370 may be a surface of the electrical contact 370 that is generally perpendicular to a central axis 305 of the connector 300. However, face 378 can be ramped or otherwise non-perpendicular to the central axis 305. The face 378 of the electrical contact 370 may also be defined as a mating edge or surface of the electrical contact 370 that is configured to physically engage the shoulder 317 of the milled end 319 of the center conductor 318 in a final position of the connector 300. For instance, the receptacle 375 may accept/receive the milled end 319 of the incoming center conductor 318 of the coaxial cable 310 as coaxial cable 310 is further inserted into the connector body 320, wherein the milled end 319 of the center conductor 318 may be advanced into the receptacle 375 of the electrical contact 370; those having skill in the art should understand that the electrical contact 370 may be advanced onto the milled end 319 of the center conductor 318.

Figure 13:
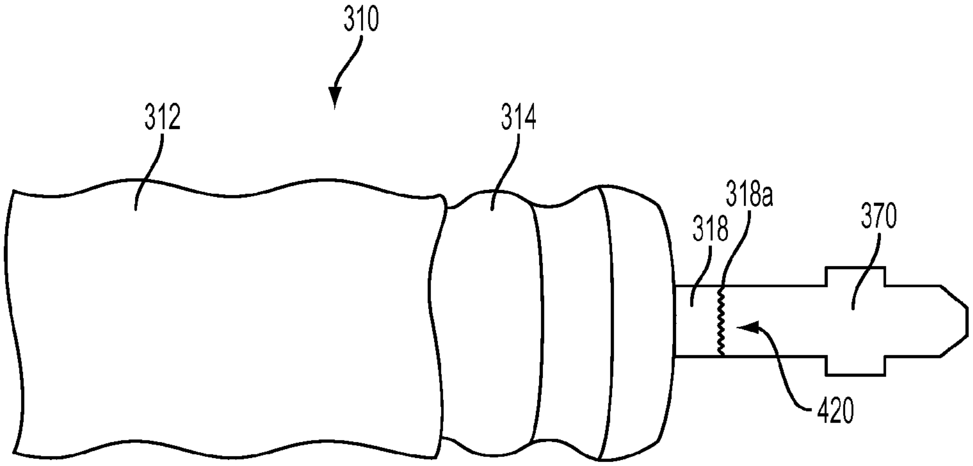
FIG. 13 depicts a top view of a second embodiment of the electrical contact welded to a center conductor of a coaxial cable.

Moreover, the electrical contact 370 may be welded to the center conductor 318 at a first weld 420, as shown in FIG. 13. Embodiments of the first weld 420 may be a weld or weld joint at a location along the exterior surface 374 of the electrical contact 370 and the exterior surface 318*a* of the center conductor 318, where the shoulder 317 of the center conductor 318 mates, contacts, or resides proximate the face 378 of the electrical contact 370. Embodiments of the first weld joint 420 may be along an outer surface 318*a* of the center conductor 318, wherein the outer surface 318*a* is parallel or substantially or approximately parallel to the central axis 305. The first weld 420 may mechanically and electrically join the electrical contact 370 and the center conductor 318 through a welding process, thereby establishing a continuous electrical path between the center conductor 318 and the electrical contact 370. The first weld 420 may be annular, such that the weld encircles or extends completely around the circumference of the center conductor 318; however, in some examples, the first weld 420 may not extend completely annularly around the circumference of the center conductor 318 while still providing a continuous electrical path for a central signal from the center conductor 318 through the electrical contact 370. The first weld 420 may be created by laser beam welding having either a continuous or pulsed laser beam. Those having skill in the art should appreciate that although embodiments of the first weld 420 is described as being created through a laser welding process, other welding processes and techniques may be used to weld, coalesce, or join two metal cable and connector components, and other energy sources may be used, such as gas, gas flame, electron beam, friction, ultrasound, and the like.

Figure 14A:
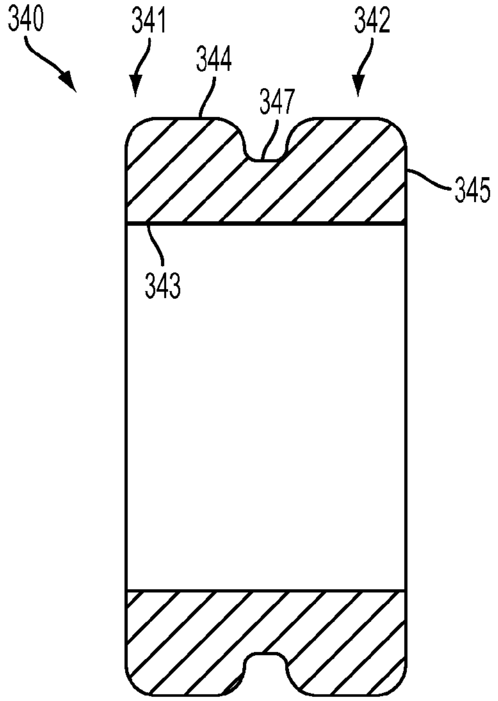
FIG. 14A depicts a cross-sectional view of one embodiment of a welding component.

Referring still to FIG. 10, and now with additional reference to FIG. 14A, embodiments of connector 300 may include a welding component 340. Embodiments of welding component 340 may be a welding ring, a ring, an annular member, a collar, a sleeve, and the like, or may be a metal component that can be welded to the outer conductor 314 and be disposed within the connector body 320 to extend an electrical ground path through the connector 300. For instance, the welding component 340 may be press-fit within the opening 328 of the connector body 320, wherein the welding component 340 makes physical and/or electrical contact with one or more surfaces of the connector body 320. Embodiments of the welding component 340 may be comprised of a single, unitary metallic component, or may be comprised of more than one metallic component capable of electrically conducting a ground path from the outer conductor 314 to the connector body 320. Moreover, embodiments of the welding component 340 may include a first end 341, a second end 342, an inner surface 343, an outer surface 344, and a generally axial opening therethrough. The outer surface 344 of the welding component 340 may be configured to engage, physically contact, etc. the inner surface 323 of the connector body 320. Embodiments of the welding component 340 may include a mating surface 345 at the second end 242 configured to engage, physically contact, etc. the internal edge 329 of the connector body 320. Additionally, embodiments of the welding component 340 may include an annular groove 347 somewhere along the outer surface 344. Embodiments of the welding component 340 may be comprised of conductive material, such as aluminum, brass, copper, or any suitable metal. However, embodiments of the welding components 340 may be comprised of both conductive materials and insulator materials. Manufacture of the welding component 340 may include casting, extruding, cutting, turning, tapping, drilling, injection molding, blow molding, or other fabrication methods that may provide efficient production of the component.

Figure 14B:
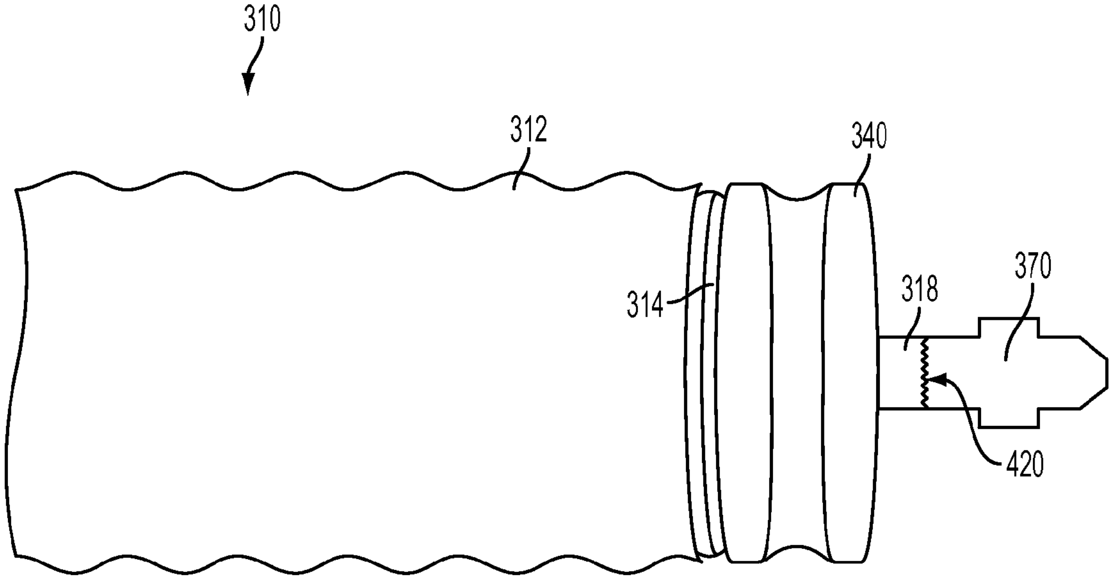
FIG. 14B depicts a top view of an embodiment of a welding component welded to an outer conductor of a coaxial cable.
Figure 14C:
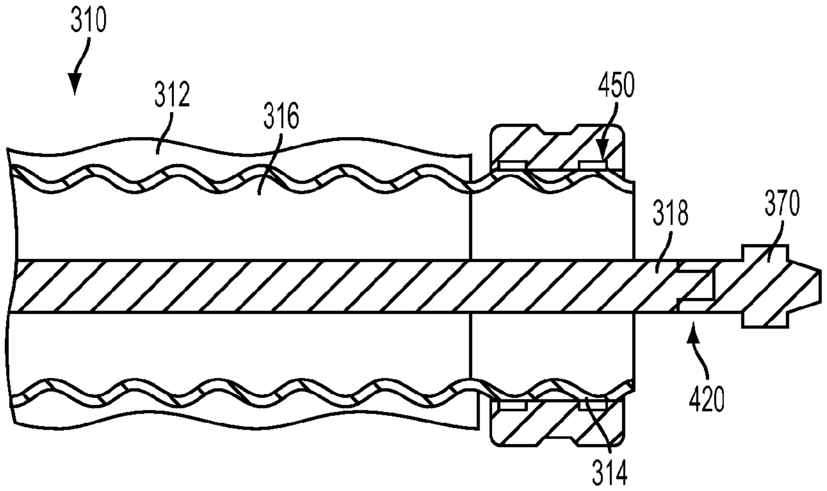
FIG. 14C depicts a cross-sectional view of an embodiment of the welding component welded to the outer conductor of the coaxial cable.

Furthermore, the welding component 340 may be welded to the outer conductor 314 at a second weld 420. For instance, the internal surface 343 may be configured to weldingly engage the outer conductor 314 at a second weld 450, as shown in FIG. 14C. Embodiments of the inner surface 343, or a welding surface of the welding component 340, may be parallel or substantially or approximately parallel to the central axis 305. Furthermore, embodiments of the second weld 450 may occur at a peak of a corrugation of the outer conductor 314 (if the outer conductor 314 is corrugated or otherwise grooved). The second weld 450 may mechanically and electrically join the welding component 340 and the outer conductor 314 through a welding process, thereby establishing a continuous electrical path between the outer conductor 314 and the welding component 340; the welding component 340 can be in physical and electrical contact with the connector body 320 once the body 320 is installed onto the cable 310. The second weld 450 may be annular, such that the weld encircles or extends completely around the circumference of the outer conductor 314; however, in some examples, the second weld 450 may not extend completely annularly around the circumference of the outer conductor 314 while still providing a continuous electrical ground path from the outer conductor 314 through the welding component 340 and through the connector body 320. The second weld 450 may be created by laser beam welding having either a continuous or pulsed laser beam. Those having skill in the art should appreciate that although embodiments of the second weld 450 is described as being created through a laser welding process, other welding processes and techniques may be used to weld, coalesce, or join two metal cable and connector components, and other energy sources may be used, such as gas, gas flame, electron beam, friction, ultrasound, and the like.

The connector body 320 may then be advanced over the welding component 340 and the outer conductor 314 to operably attach to the cable 310. For example, the connector body 320 may be advanced onto the cable 310 until the first end 320 of the connector body 320 resides proximate the cable jacket 312. Embodiments of the insulator bodies 350, 360 may also be disposed within the connector body 320.

With continued reference to the drawings, the manner in which the connector 300 is assembled and/or installed will now be described. FIG. 10 depicts an embodiment of connector 300 in an assembled, welded position. The connector 300 is securably affixed to the cable 310 through one or more welds, such as the first weld 420 and the second weld 450. To arrive at the assembled, welded position, an installer can attach the connector 300 to the cable 310 after the first and second weld joints 420, 450 have been created. For example, an installer may first prepare the cable 310 in a manner that the jacket 12 (and potentially the dielectric 316 inside the cable 310) is removed by approximately 1.5 corrugations of the outer conductor 314, which can range between 10 mm-17 mm in length from the end of the outer conductor 314. In some embodiments, the number of corrugations may be larger, and in the case of a smoothwall outer conductor, the length of removed portion of jacket 312 may also be between approximately 10 mm-17 mm. Once the jacket 312 is removed, the electrical contact 370 (i.e. the inner conductor of the connector) may be attached to the center conductor 318 by placing the receptacle 375 of the electrical contact 370 over the milled end 319 of the center conductor 318 until the face 378 of the electrical contact makes contact or resides proximate the shoulder 317 of the center conductor 318. While the electrical contact is in place, an installer may weld the center conductor 318 to the electrical contact 370, using a laser or other energy source and/technique, to create a first weld 420. The first weld 420 can be along an exterior or outer surface 318*a* of the center conductor 318 and along an exterior or outer surface 374 of the electrical contact 370, at a point or axial location where the two components meet, as shown in FIG. 13. In embodiments where the material of the center conductor 318 is copper or copper plated brass, the first weld joint 420 may be performed between the copper clad of the center conductor 318 and the electrical contact 370 of the connector 300. In embodiments where the material of the center conductor 318 is aluminum, the first weld joint 420 may be performed between the core of the center conductor 318 and the electrical contact 370.

After the electrical contact 370 of the connector 300 is welded to the center conductor 318, the welding component may be securably attached to the outer conductor 314 through a second weld joint 450. Prior to attaching or placing the connector body 320 on the cable 10, the welding component 340 may be laser welded onto the outer conductor 314, as shown in FIGS. 14B and 14C. An installer may then place, advance, attach the connector body 320 onto or over the welding component 340 and the outer conductor 314. The second weld joint 450 can be created by applying a laser beam to the outer conductor 314 (or welding component 340), and using a melting material of the outer conductor 314 of the cable 310 (or welding component 340) as a filler material to weld the outer conductor 314 to the welding component 340.

Furthermore, after one or both the first weld 420 and second weld 450 have been created so as to weldingly secure the center conductor 318 and the outer conductor 314 to the electrical contact 370 and the welding component 340, and the connector 300 has been attached to the cable 310, a sealing member, such as sealing member 390, may be advanced along the cable 310 or connector 300 to cover any exposed portion of the connector 300 or cable 310. For example, embodiments of the seal member 390 may be rolled or otherwise advanced away from the prepared end of the cable 310 to expose a portion of the outer conductor 314 to allow the welding component 340 to be positioned over the outer conductor 314, and then the sealing member 390 may be rolled or otherwise advanced over the exposed outer conductor 314 to seal, cover, protect, shelter, etc. the outer conductor 314 and the second weld 450. Embodiments of the sealing member 390 may also seal, cover, protect, etc. portions of the cable jacket 312, portions of the outer conductor 314, and portions of the connector 300, such as the connector body 320. Additionally, an installer may insert the first insulator body 350 and the second insulator body 360 within the connector body 320, as described above.

Figure 15:
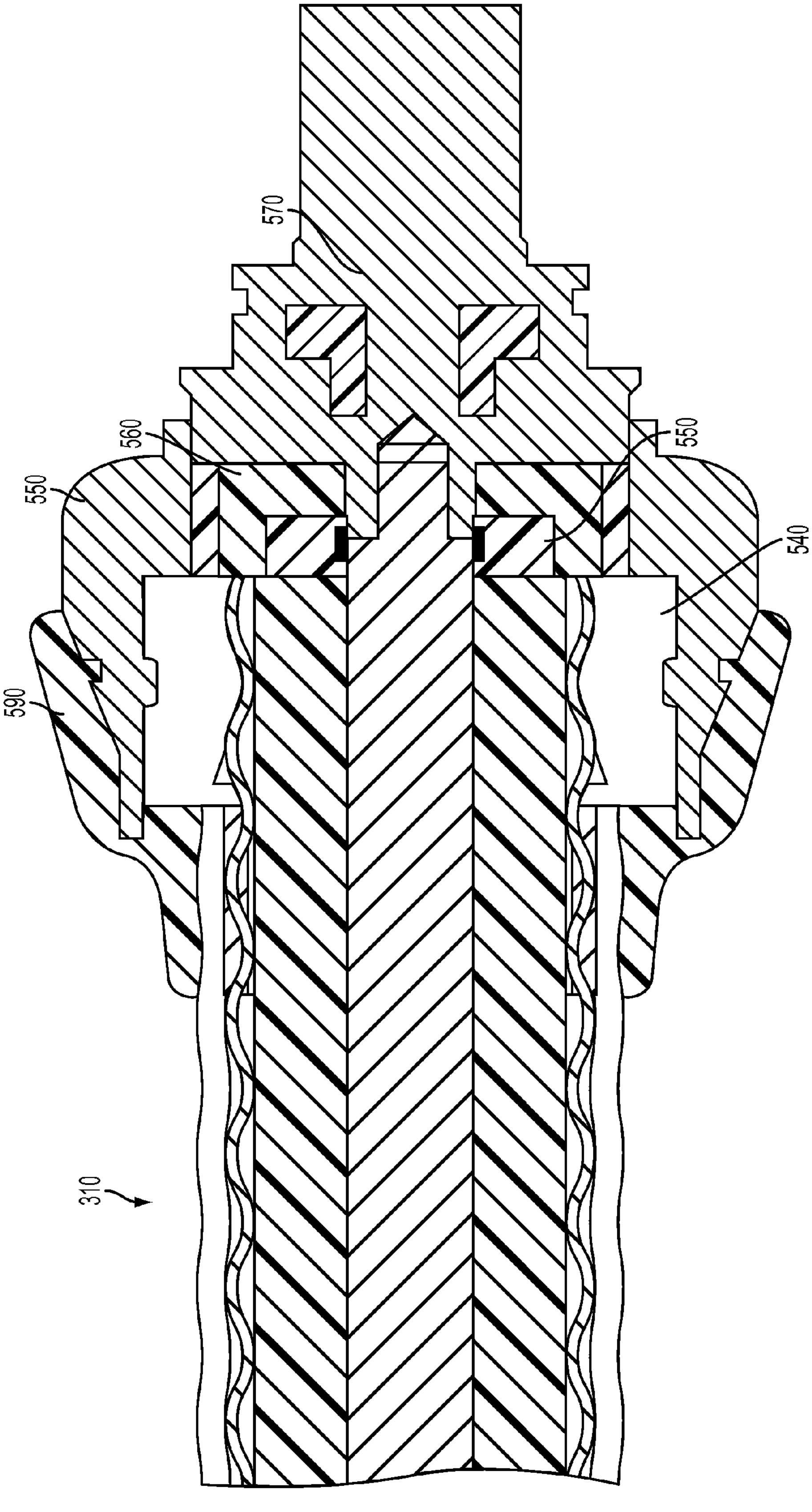
FIG. 15 depicts a cross-sectional view of a third embodiment of a coaxial cable connector.

Referring still to the drawings. FIG. 15 depicts an embodiment of connector 500. Embodiments of connector 500 may share the same or substantially the same structural and/or functional aspects of connector 300, as described above. For instance, embodiments of connector 500 may weldingly engage a coaxial cable, such as cable 310, and may include a sealing member 590, an electrical component 570, a welding component 540, one or more insulator bodies 550, 560, and a connector body 550. Embodiments of connector 500 may also be weldingly connected in a similar fashion as described in association with connector 300. However, embodiments of connector 500 may include an extended connector body 550 configured to accommodate a different union interface. Embodiments of connector body 550 of connector 500 may also include an opening 528 to accommodate the welding component 540 to extend a continuous electrical ground path from the outer conductor 314 through the connector 500. Those having skill in the art should appreciate that various designs and versions of a connector body and/or coupling interface may be used while still including one or more weld joints as described herein.

With reference to FIGS. 1-15, an embodiment of a method of attaching a coaxial cable connector to a coaxial cable may include the steps of welding an electrical contact 70, 370 570 of the coaxial cable connector 100, 300, 500 to a center conductor 18, 318 of the coaxial cable 10, 310 along an exterior surface 18*a*, 318*a* of the center conductor 18, 318, disposing a portion of a connector body 20, 320, 520 of the coaxial cable connector 100, 300, 500 into a cavity 15 of the coaxial cable 10, 310 between an outer conductor 14, 314 and the center conductor 18, 318, and welding the portion of the connector body 20, 320, 520 to the outer conductor 14, 314 of the coaxial cable 10, 310 along one or more axial locations on the portion of the connector body 20, 320, 520. A further embodiment of a method of attaching a coaxial cable connector 100, 300, 500 to a coaxial cable 10, 310 may include the steps of welding an electrical contact 70, 370, 570 of the coaxial cable connector 100, 300, 500 to a center conductor 18, 318 of the coaxial cable 10, 310 along an exterior surface 18*a*, 318*a* of the center conductor 18, 318, welding a welding component 340, 540 to the outer conductor 314, and disposing the connector body 20, 320, 520 over the welding component 240 and the outer conductor 14, 314.

Part II

Figure 16:
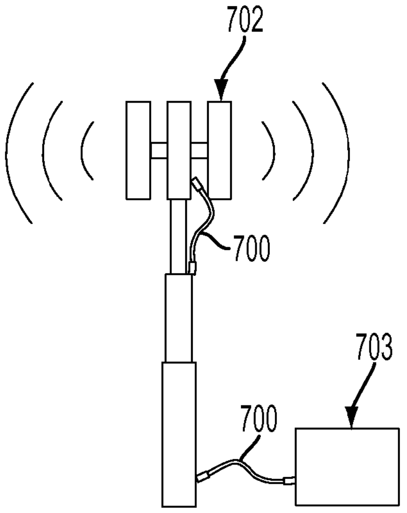
FIG. 16 is a schematic diagram illustrating one embodiment of coaxial cable devices coupled to a cellular tower and cellular base station.
Figure 17:
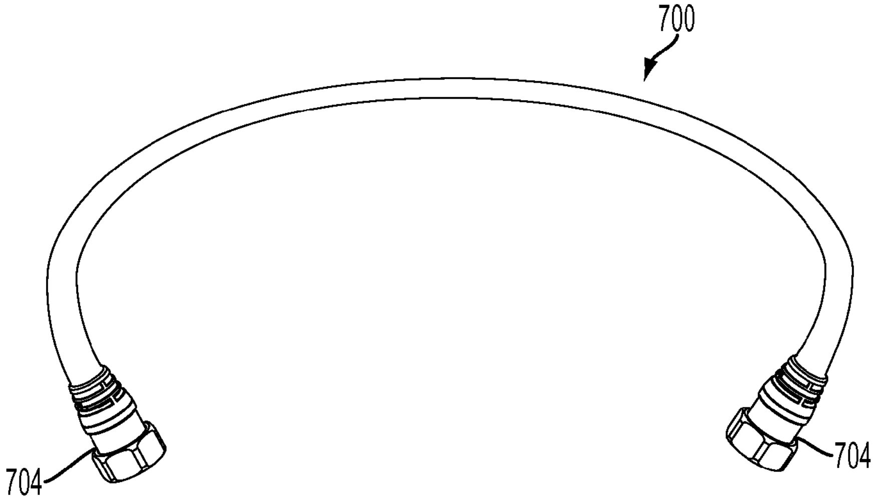
FIG. 17 is an isometric view of one embodiment of the coaxial cable device.
Figure 18:
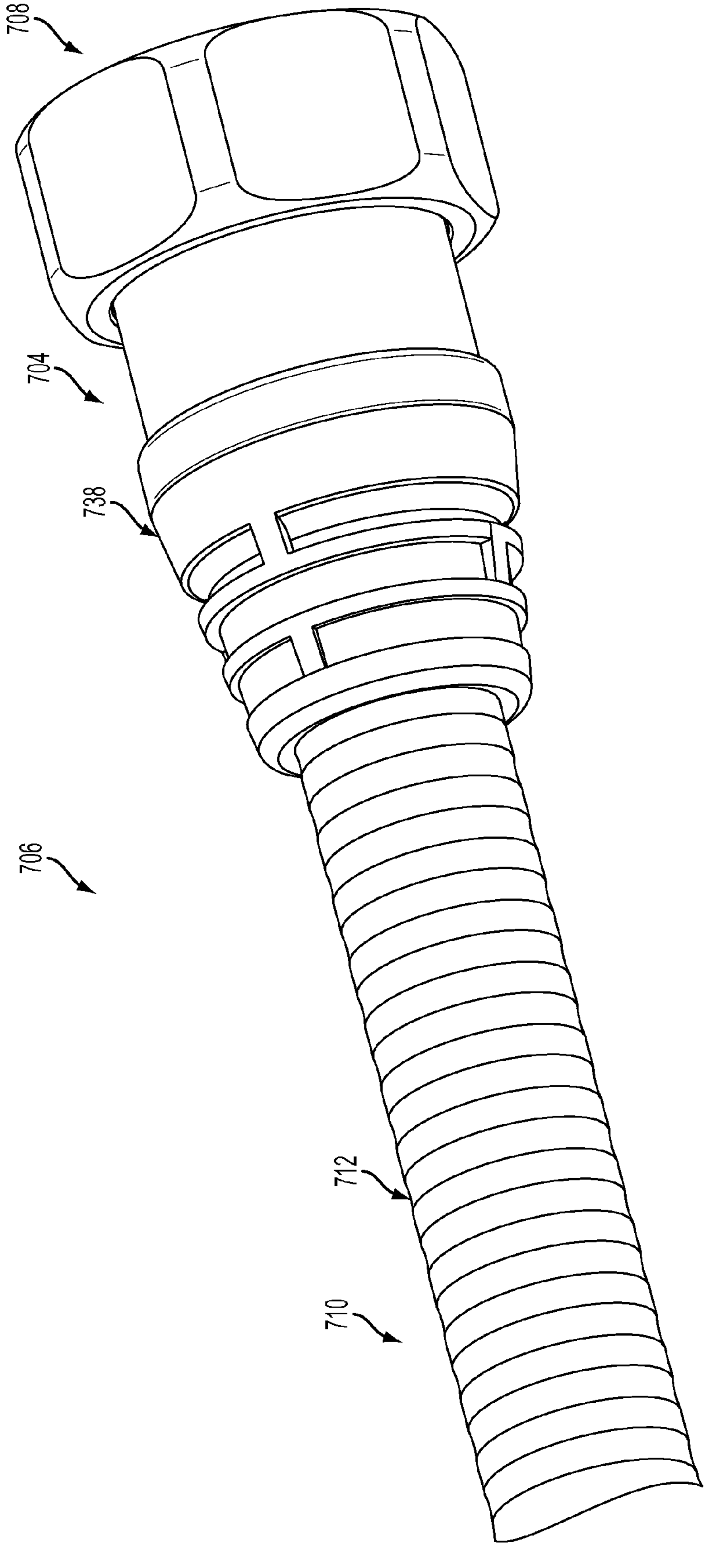
FIG. 18 is a top isometric view of one embodiment of the coaxial cable device.

Referring to FIGS. 16-58, additional embodiments of coaxial cable coaxial cable units, coaxial cable assemblies or coaxial cable devices are illustrated. Depending upon the embodiment, the coaxial cable device can include or exclude a segment of a coaxial cable. In one embodiment illustrated in FIG. 16, the coaxial cable devices 700 can be mounted to, or installed in, different types of electronic devices, including, but not limited to, a cellular communication tower 702 or a cellular communication base station 703. Referring to FIG. 17, the coaxial cable device 700, in one embodiment, includes a cable jumper having both of its ends terminated by connectors 704.

In another embodiment illustrated in FIG. 18-23, the coaxial cable unit or coaxial cable device 706 has: (a) a front or forward end 708 with a connector 704; and (b) a back or rearward end 710 which is bare without a connector. The coaxial cable device 706, in one embodiment, includes a coaxial cable 712 attached to the connector 704. The coaxial cable 712 includes: (a) an inner wire, central conductor or inner conductor 714; (b) an insulating layer, dielectric or insulator 716 which surrounds the inner conductor 714; (c) a tube or outer conductor 718 which surrounds the insulator 716; and (d) a cover, sleeve or jacket 720 which surrounds the outer conductor 718. In one embodiment illustrated in FIGS. 54-58, the inner conductor 714 has a central region or core 722 including a material such as aluminum. The inner conductor 714 also has an outer region or outer layer 725 including a different, more conductive material, such as copper. Depending upon the embodiment, the outer conductor 718 may have a uniform or non-uniform shape. In the embodiment shown, the outer conductor 718 has a wavy, ridged or corrugated shape defining a continuous series of peaks and valleys.

With continued reference to FIGS. 18-23, the connector 704 of the cable device 706, in one embodiment, includes: (a) a connector structure, connector housing or connector body 724; (b) an outer conductor receiver or outer conductor engager 726 which is positioned within the rearward section 728 of the connector body 724; (c) a tubular plug or jacket seal 730 which receives the jacket 720 and is partially nested between the jacket 720 and outer conductor engager 726; (d) a compressor 732 housed within the connector body 724; (e) an inner conductor engager 734 moveably or slidably positioned within the compressor 732; (f) a compression driver 733 configured to drive the inner conductor engager 734 into the compressor 732; (g) a fastener or coupler 736 which is rotatably coupled to the forward section 739 of the connector body 724; (h) a plurality of annular or ring-shaped fluid seals or liquid seals 740 and 741; and (i) a rearward seal, strain relief device, cover or boot 738 which receives, and covers, part of the jacket 720, the jacket seal 730, and the rearward section 728 of the connector body 724.

In one embodiment illustrated in FIGS. 41-44, the connector body 724 has a generally cylindrical, tubular or barrel shape, including a body exterior wall 742 and a body interior wall 743. The body exterior wall 742 has: (a) boot mating region 744, including a circumferential notch 746 and defining a circumferential groove 748; (b) a coupler seal wall 750 defining a seal groove 752 shaped to receive seal 740; (c) a circumferential coupler retaining wall 754 which moveably interfaces with the circumferential coupler lip or coupler retaining wall 746 of the coupler 736; and (d) a collar section 756 around which the seal 741 fits. The body interior wall 743 has: (a) a circumferential step 760 shaped to mate with the circumferential step 762 of the outer conductor engager 726; and (b) a circumferential compressor stop 764 configured to engage the circumferential notch 766 of the compressor 732. The connector body 724, in one embodiment, is constructed of a conductive material, such as a metal suitable for grounding purposes.

In one embodiment illustrated in FIGS. 28-31, the outer conductor engager 726 has an exterior wall 768 and an interior wall 770. The exterior wall 768 has: (a) the circumferential step 762 and valley wall 766 configured to mate with the connector body 724 as described above; and (b) a circumferential slot wall 769 defining a groove shaped to receive an annular or ring-shaped seal, such as an O-ring. The interior wall 770 has: (a) a circumferential seal stop or seal engager 771 configured to engage the seal 730; and (b) an outer conductor engagement wall 772 which contacts the outer conductor 718. The outer conductor engager 726, in one embodiment, is constructed of a conductive material, such as a metal suitable for grounding purposes. When engaged with the outer conductor 718 and connector body 724, the outer conductor engager 726 is operable to have an electrical grounding function.

Figure 45:
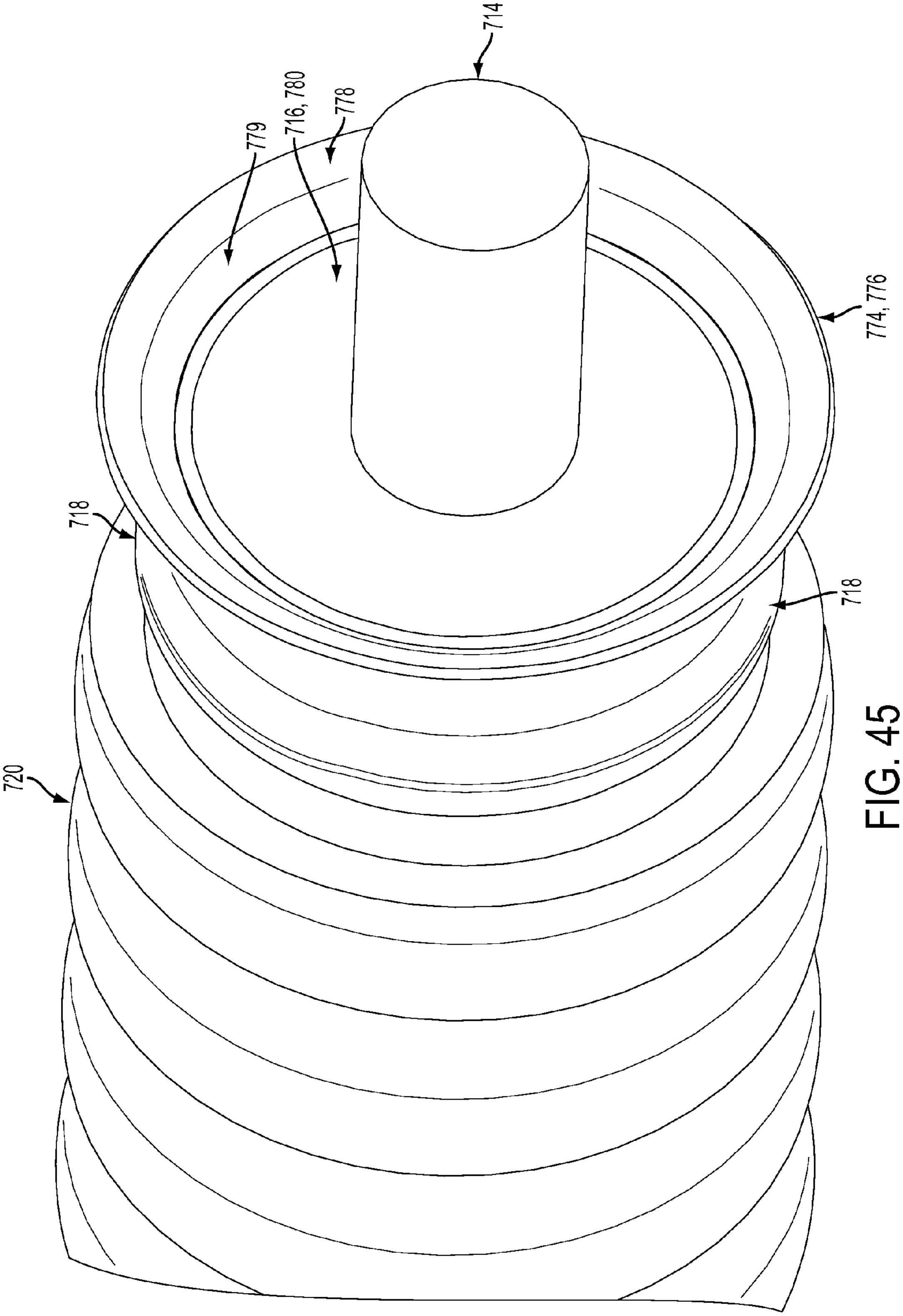
FIG. 45 is a front, isometric view of one embodiment of the cable of the coaxial cable device, illustrating the shape of the outer conduct before folding or hemming.

Referring to FIGS. 45-46 and 50-53, in one embodiment, the outer conductor engager 726 is welded to the outer conductor 718. In the first manufacturing step, as illustrated in FIG. 45, a bare end of the coaxial cable is prepared. This involves cutting away a portion of the jacket 720, outer conductor 718, and insulator 716 as illustrated. As a result, inner conductor 714 extends outward furthest, and the edge 776 of the outer conductor 718 extends along a cut peak 774, resulting in an outwardly flared-section 778. Also, the face 780 of the insulator 716 is inset relative to the edge 776.

Figure 46:
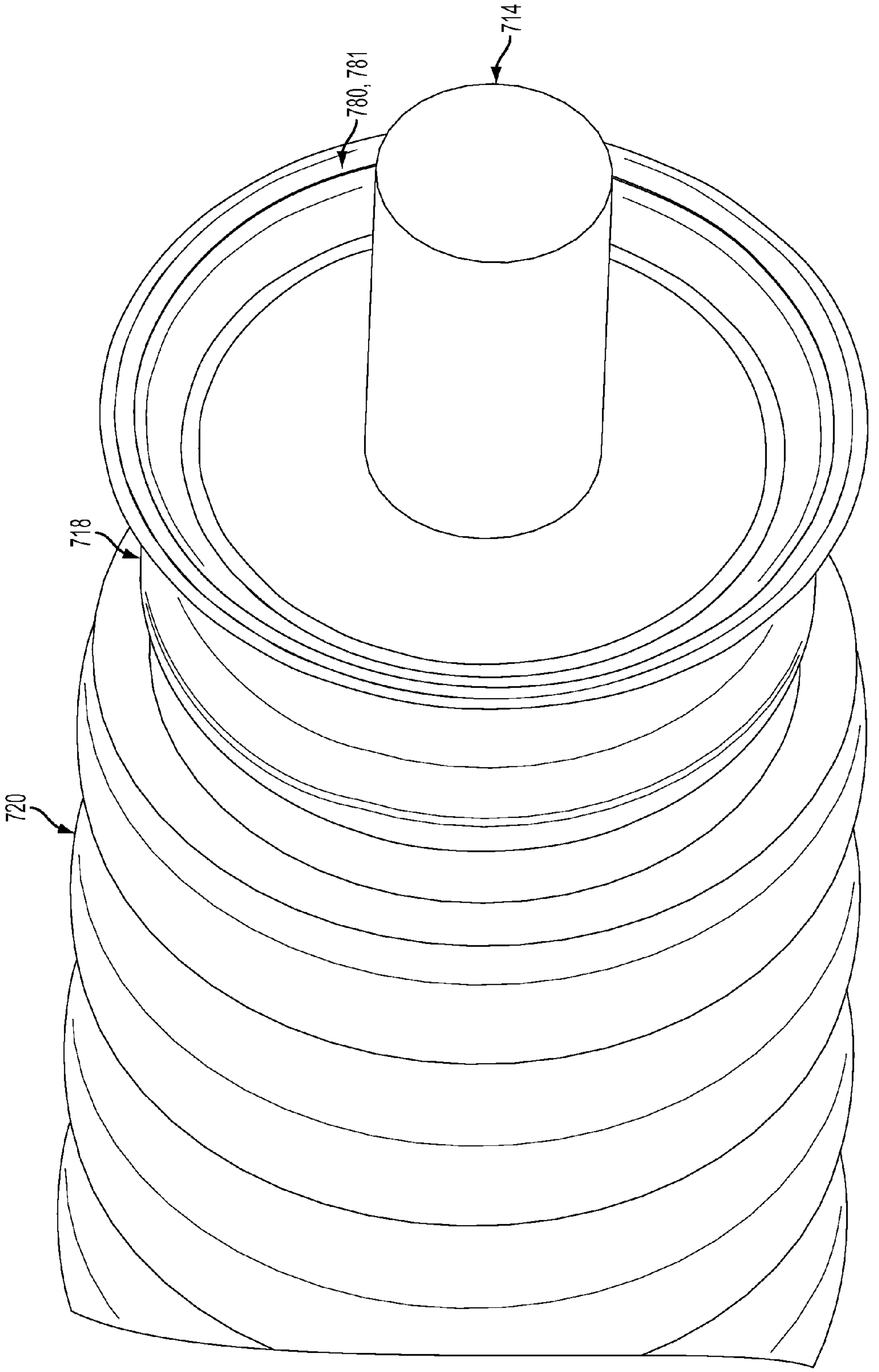
FIG. 46 is a front, isometric view of the cable of FIG. 45, illustrating the shape of the outer conduct after folding or hemming.
Figure 47:
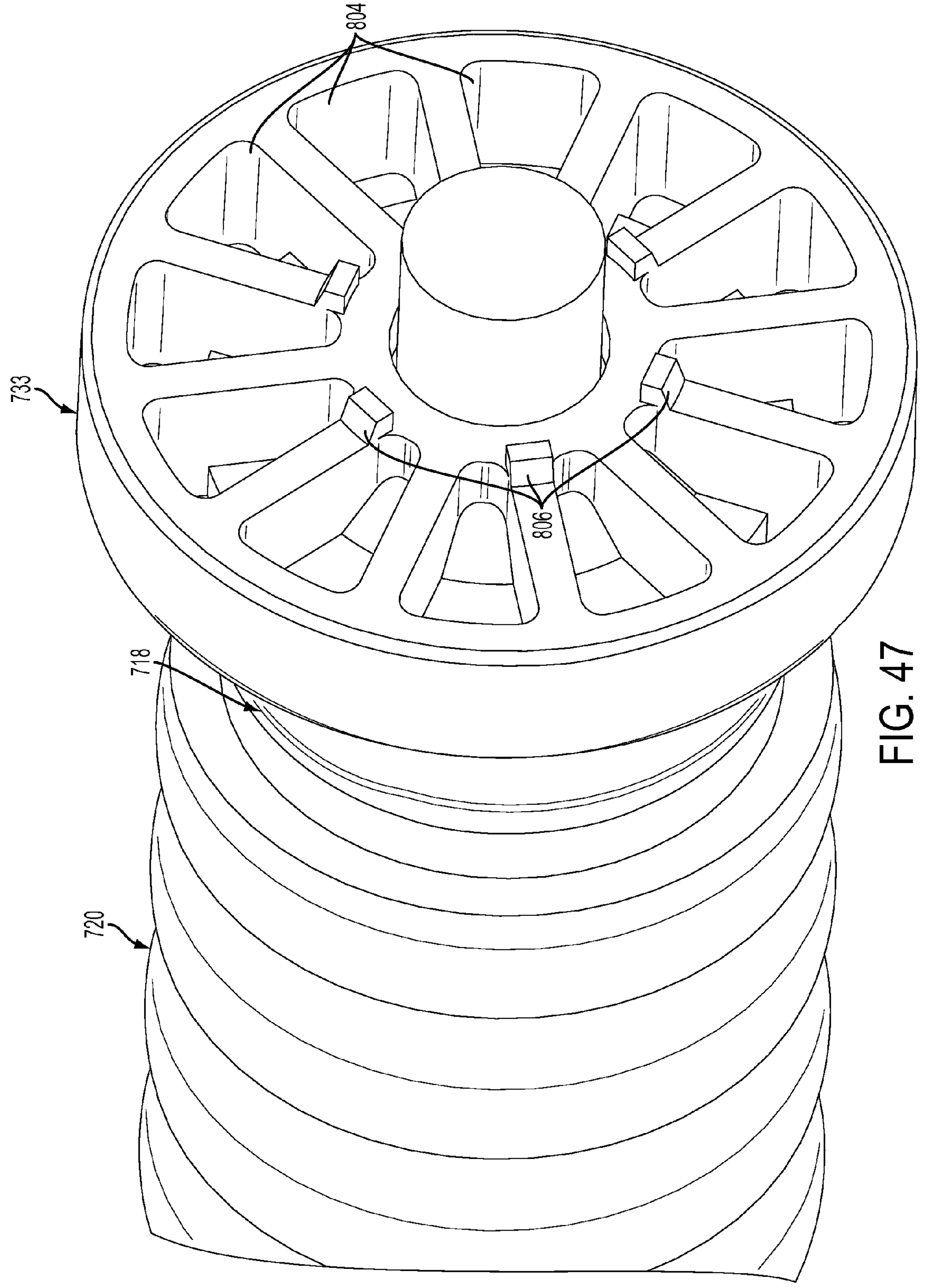
FIG. 47 is a front, isometric view of one embodiment of the cable shown connected to the compression driver of the coaxial cable device.
Figure 48:
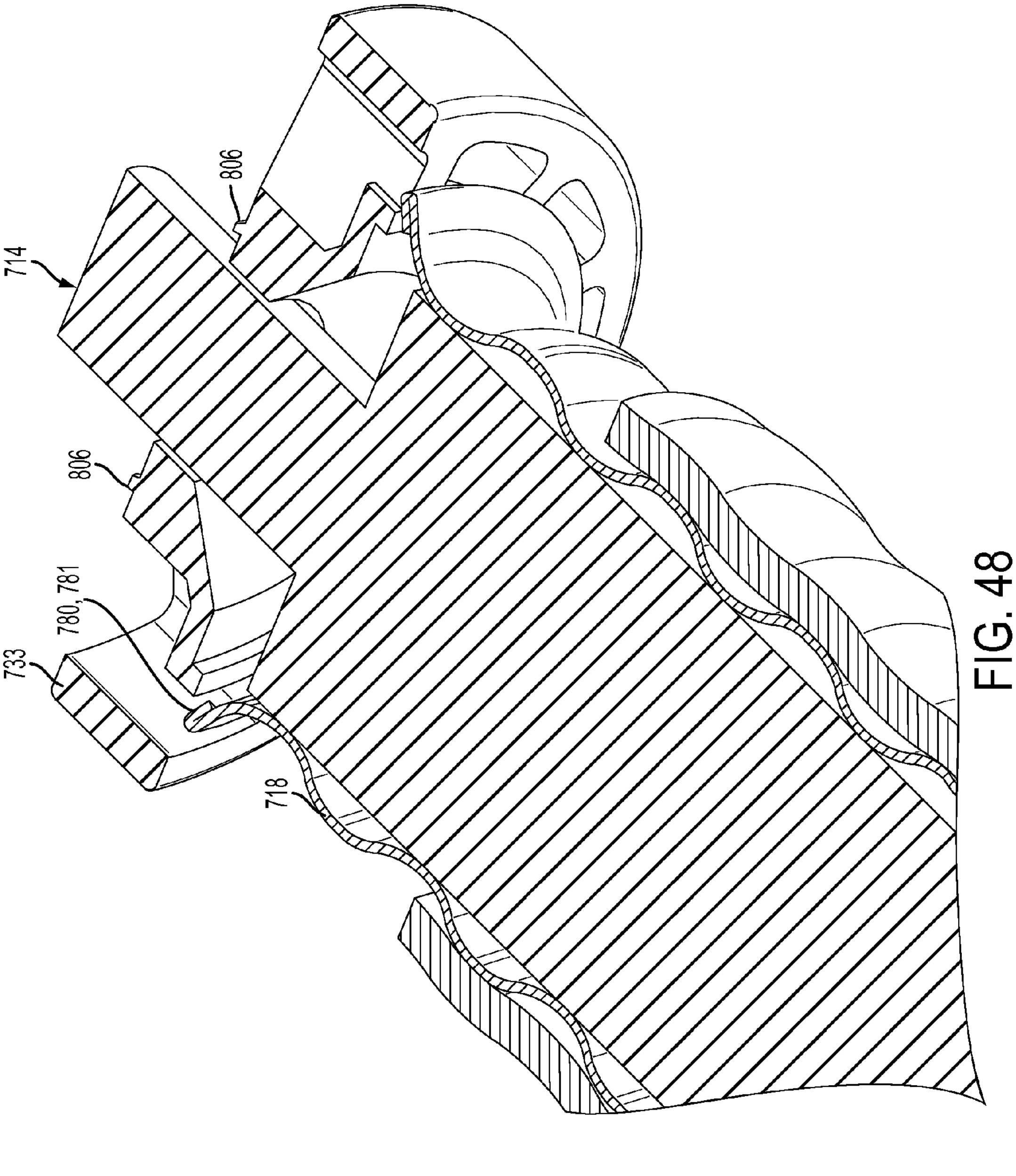
FIG. 48 is a top, isometric, cross-sectional view of one embodiment of the cable shown connected to the compression driver of the coaxial cable device.
Figure 49:
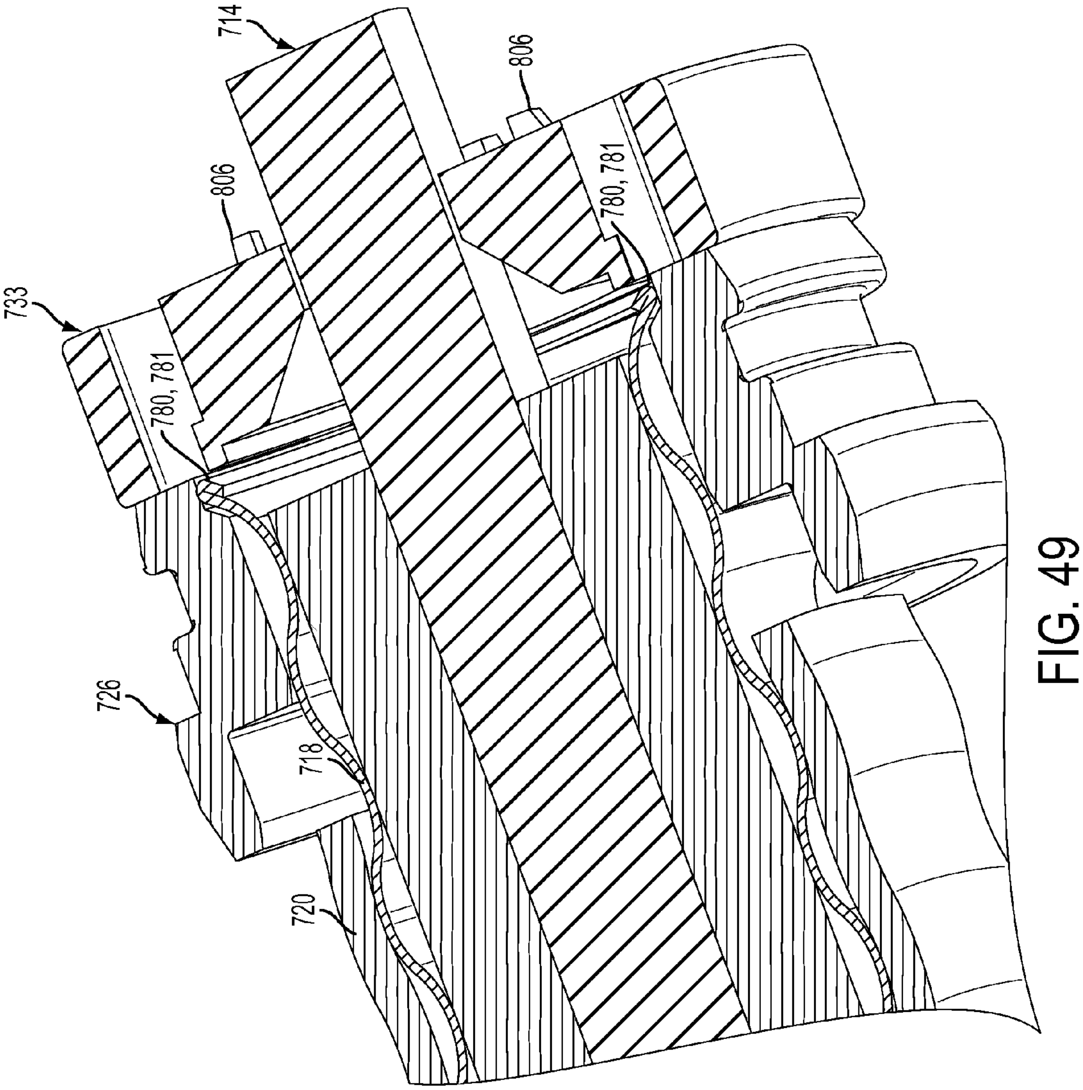
FIG. 49 is a top, isometric, cross-sectional view of one embodiment of the cable shown connected to the outer conductor engager and compression driver of the coaxial cable device.

After the first manufacturing step, a suitable die or tool is used to bend or fold the edge 776 inward toward the center conductor 714. In one embodiment, the edge 776 is folded back onto itself until it contacts the interior surface 779 of the flared-section 778. The result, illustrated in FIG. 46, is a partially or fully closed hem section 780. The hem section 780 is, in one embodiment, an outer conductor weld zone, outer conductor weld area or outer conductor weld interface 781.

Figure 50:
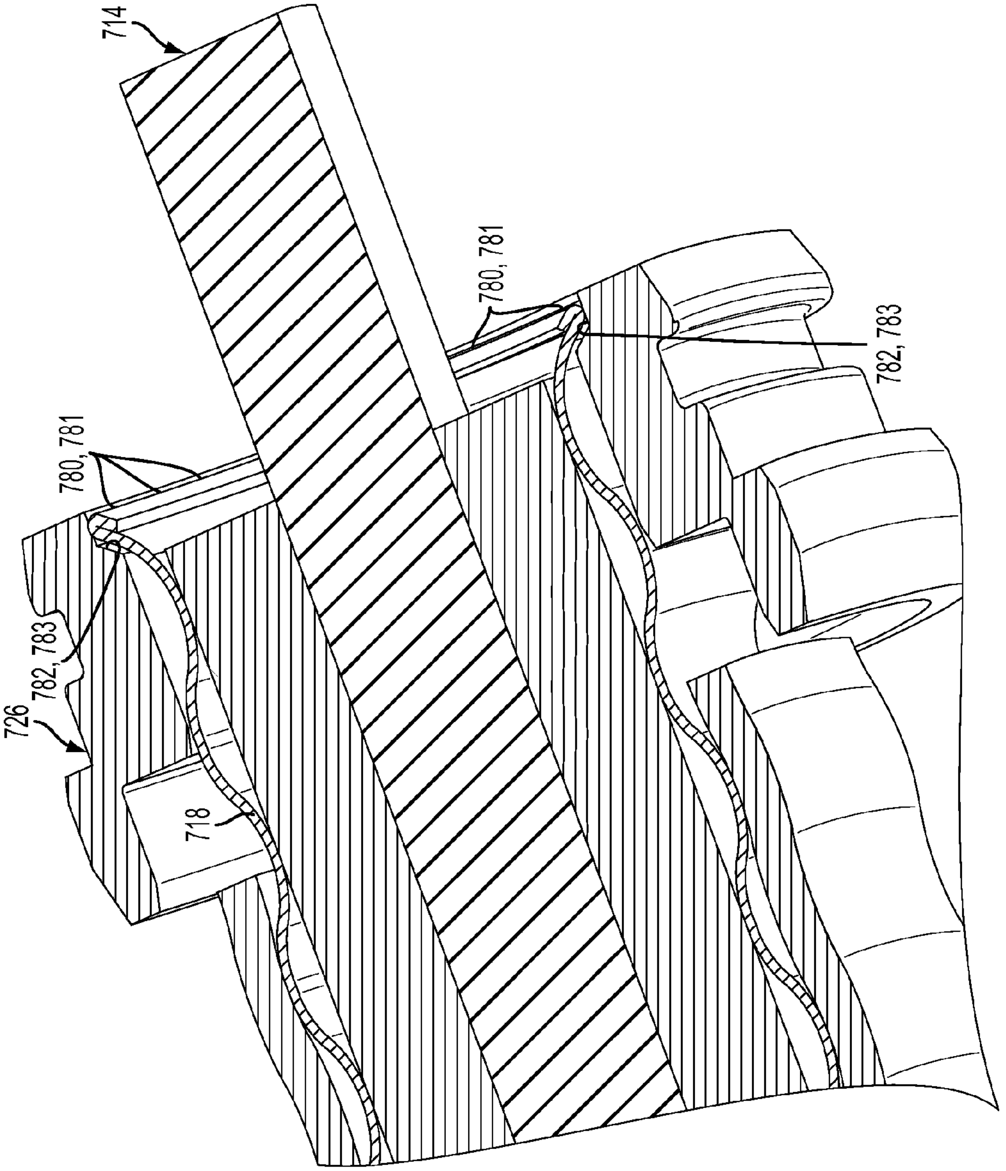
FIG. 50 is a top, isometric, cross-sectional view of one embodiment of the cable shown connected to the outer conductor, illustrating the weld interfaces and hem of the outer conductor engager.
Figure 51:
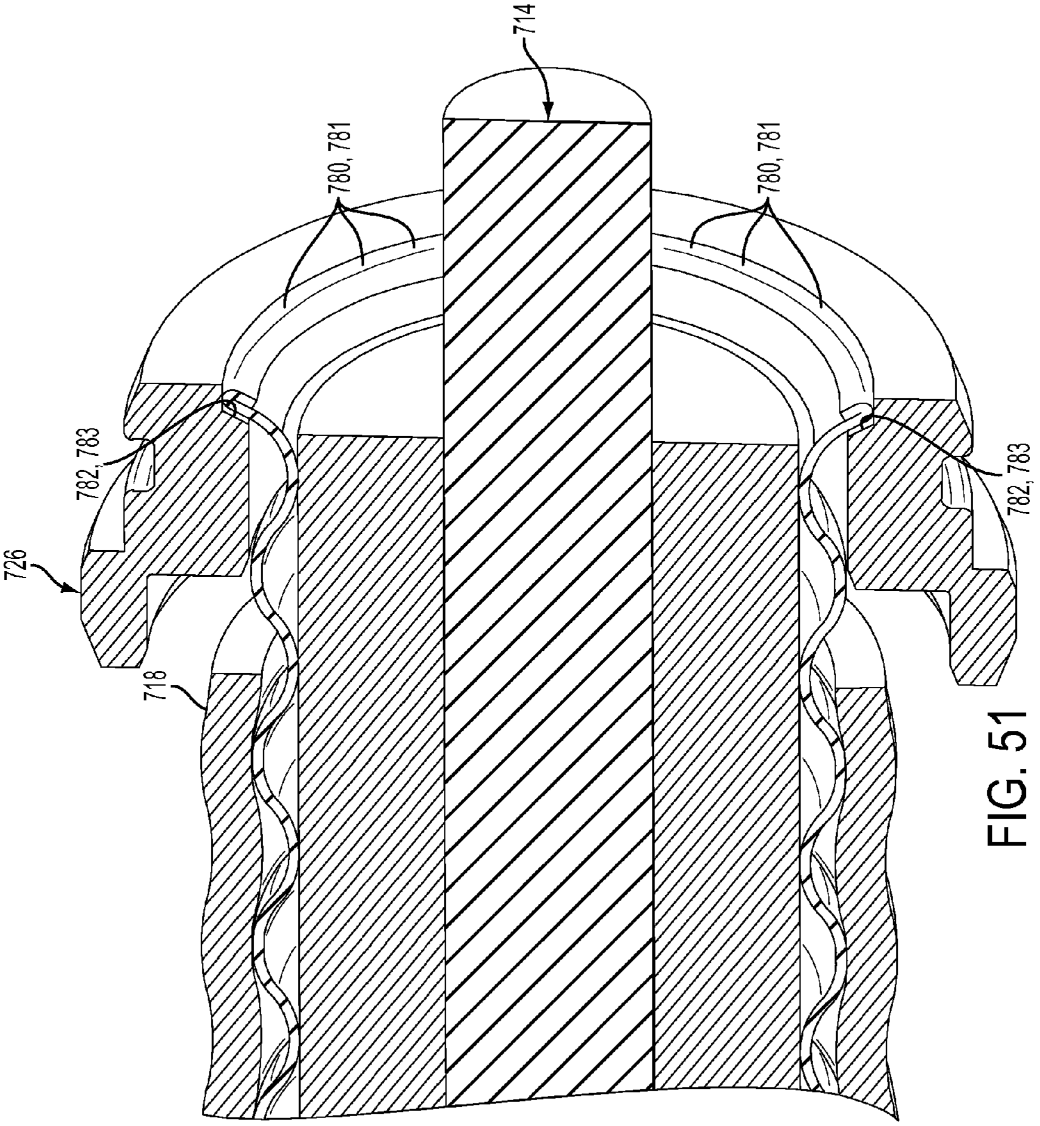
FIG. 51 is a side, isometric, cross-sectional view of one embodiment of the cable shown connected to the outer conductor, illustrating the weld interfaces and hem of the outer conductor engager.
Figure 52:
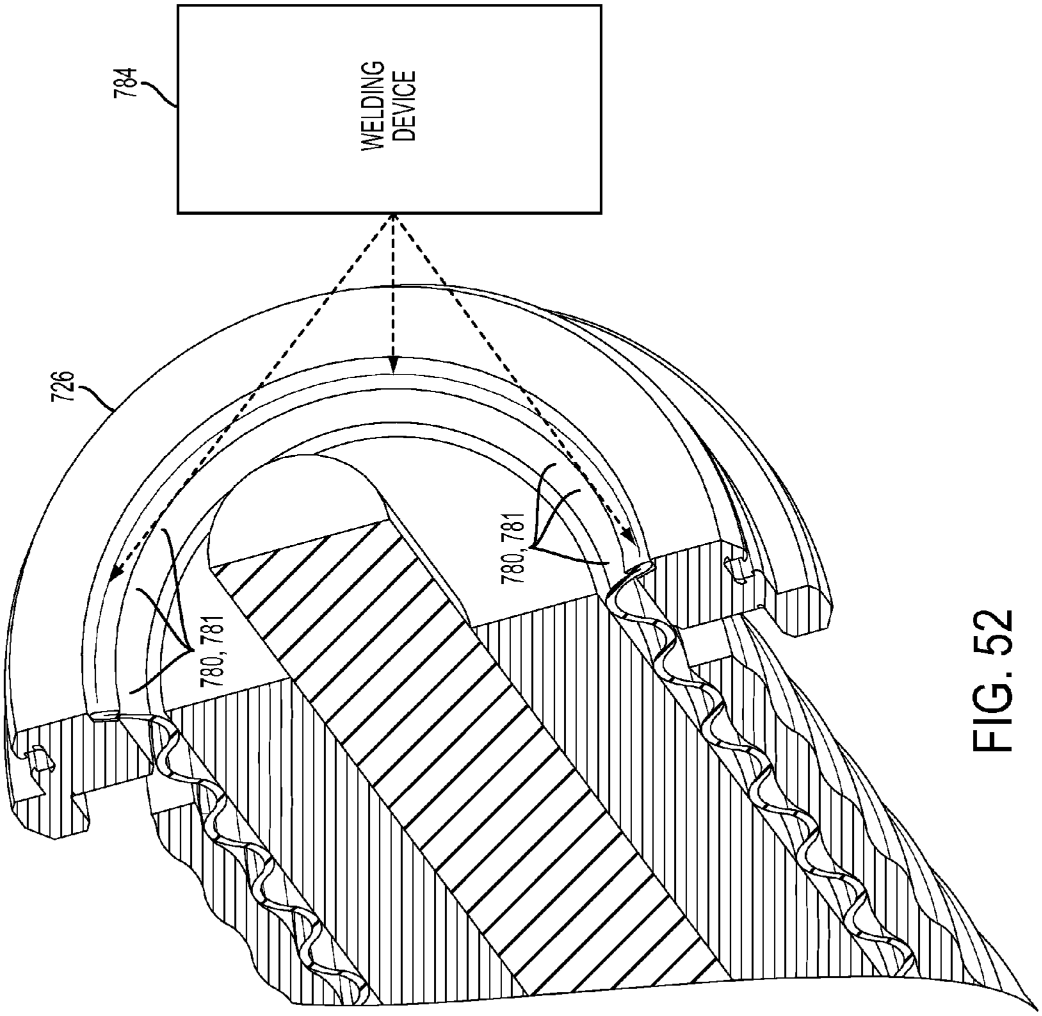
FIG. 52 is a front, side, isometric, cross-sectional view of one embodiment of the cable shown connected to the outer conductor, illustrating the weld interfaces, the hem of the outer conductor engager and the weld energy streams.
Figure 53:
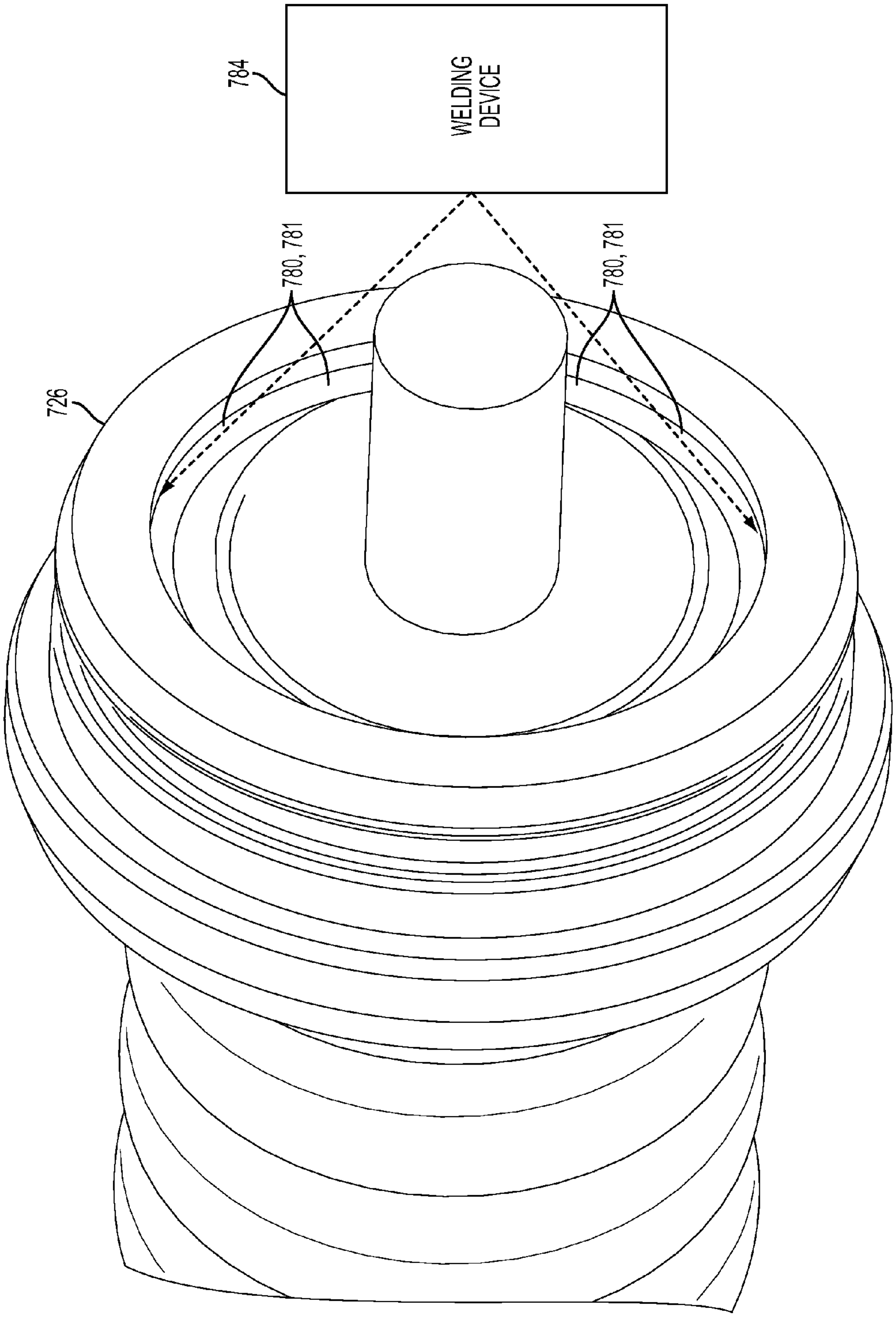
FIG. 53 is a side, isometric, cross-sectional view of one embodiment of the cable shown connected to the outer conductor, illustrating the weld interfaces, the hem of the outer conductor engager and the weld energy streams.

As illustrated in FIGS. 50-51, the outer conductor engagement wall 772 has a slanted, angled or ramped section 782. The ramped section 782 is located adjacent to, and is engaged with, the hem section 780. The ramped section 782 is, in one embodiment, an outer conductor engager weld zone, outer conductor engager weld area or outer conductor engager weld interface 783.

As illustrated in FIGS. 50-53, a welding device 784 is operated to direct focused energy toward the hem section 780. Consequently, the hem section 780 is welded to, or with, the ramped section 782. Depending upon the embodiment, one or both of the sections 780 and 782 can fully or partially liquefy and intermix during the welding process. In one embodiment, the welding device 784 implements laser beam welding to aim a laser beam at the hem section 780 and gradually move the laser beam around the perimeter of the hem section 780. It should be understood, however, that any suitable type of welding device or energy director can be operated to: (a) weld or fuse the sections 780 and 782 together; (b) weld or fuse the hem section 780 to the ramped section 782; or (c) connect the hem section 780 to the ramped section 782 by adding a metallic, meltable filler or flux which functions to hold the sections 780 and 782 together. It should also be understood that any suitable type of welding energy can be used, including, but not limited to, laser, electric arc, electron beam, ultrasound and gas flame. After cooling, the outer conductor engager 726 is weldably connected to the outer conductor 718.

Referring to FIGS. 19-23 and 38-40, the compressor 732 includes an exterior compressor wall 786, which has the circumferential notch 766 described above. The interior compressor wall 788 of the compressor 732 has a compression chamber 790 and a throat section 792. The compression chamber 790 and throat section 792 are shaped to mate with, and conform to the geometry of, the inner conductor engager 734 as described below. In one embodiment, the compressor 732 is an insulator, constructed of polymer, functioning to maintain an insulation barrier between the inner conductor engager 734 and the connector body 724. This barrier reduces the likelihood of an electrical short caused by an undesired electrical connection between the inner conductor 714 and the outer conductor 718.

Referring to FIGS. 19-25 and 32-34, the compression driver 733 is generally disk-shaped and has: (a) a rearward driver face 794 which is oriented toward the insulator face 780; (b) a forward driver face 796 which is oriented toward the inner conductor engager 734; and (c) a driver body 798 between the faces 794 and 796. The driver body 798 has a central conical wall 800 defining a central opening 802.

The driver body 798 also defines an array of equidistant reflection reduction slots 804. The reflection reduction slots 804 enable electrical signals to pass through the connector 704. This reduces the amount of signal reflection within the connector 704 which, in turn, results in a suitable, or more desirable, return loss. In one embodiment, the coaxial cable 712 has a designated impedance factor which represents the opposition to signal flow within the coaxial cable. The designated impedance factor depends on the internal geometry, dimensions and material types of the cable. In one embodiment, the connector 704 has an impedance factor which is the same as, of substantially similar to, the designated impedance factor of the cable 712. This impedance compatibility reduces internal signal reflections at connections between components. The reflection reduction slots 804 and other cavities and passageways of the connector 704 assist in the reduction of such signal reflection.

Figure 33:
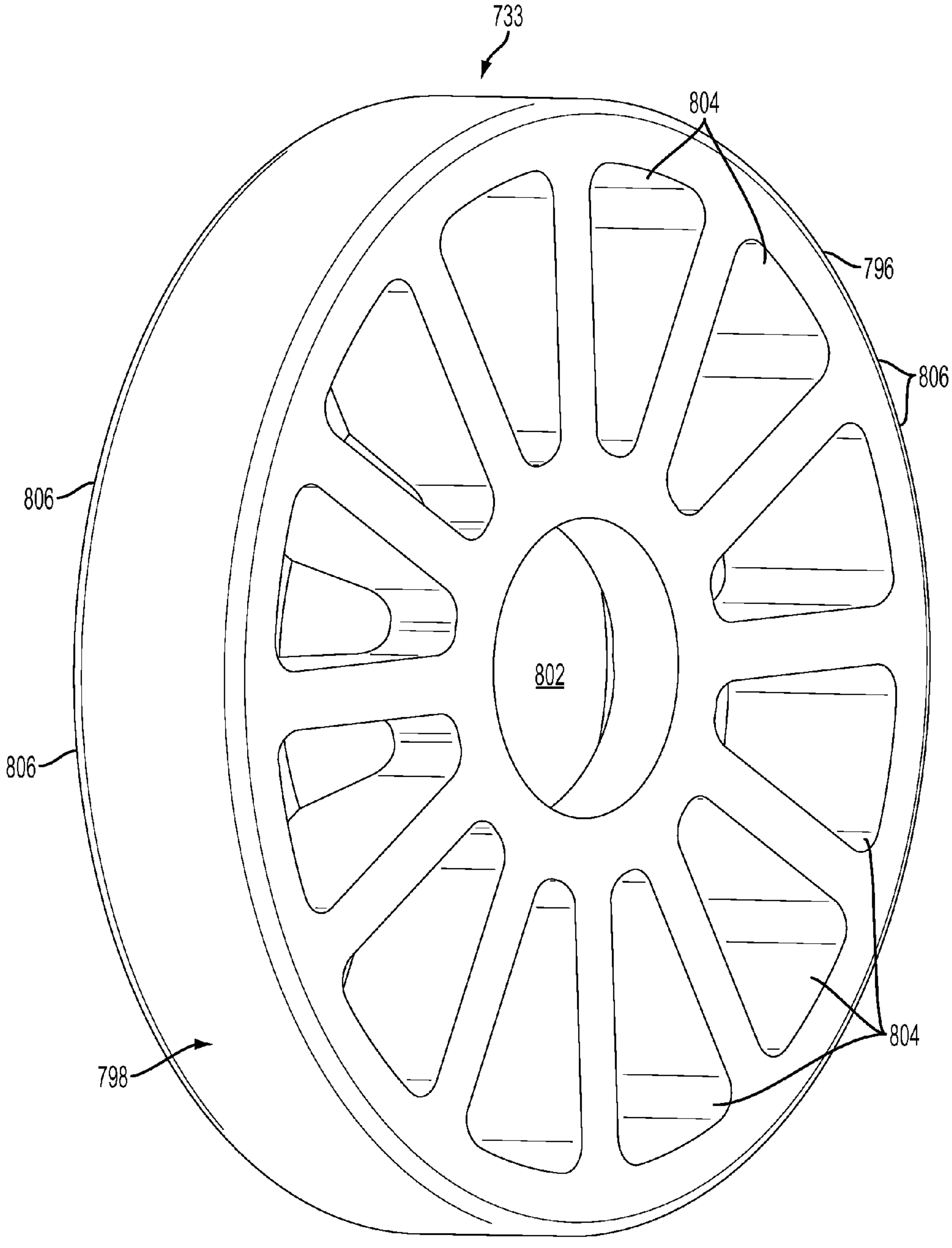
FIG. 33 is a front isometric view of the compression driver of FIG. 32.
Figure 34:
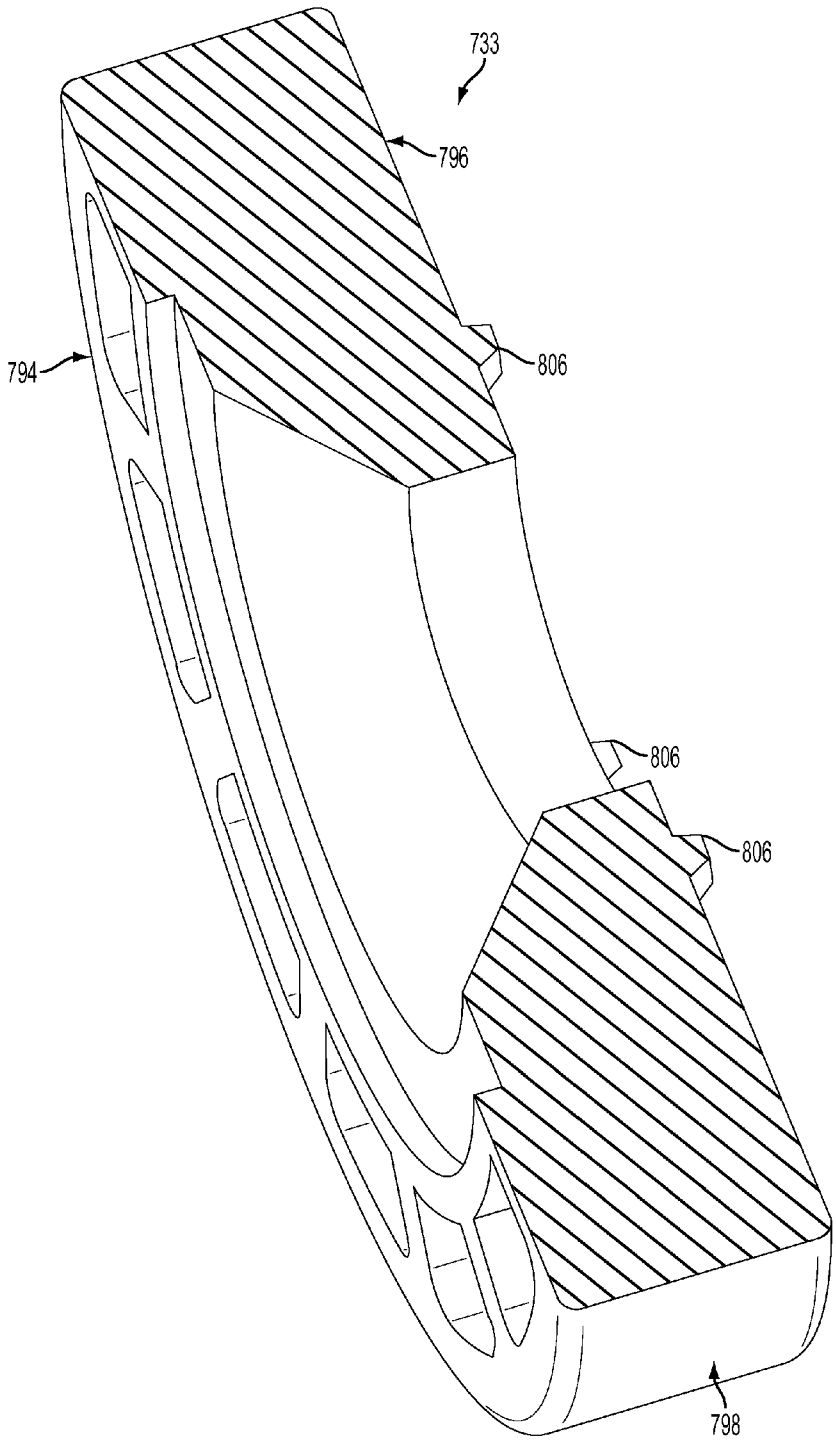
FIG. 34 is a top, isometric, cross-sectional view of the compression driver of FIG. 32.
Figure 35:
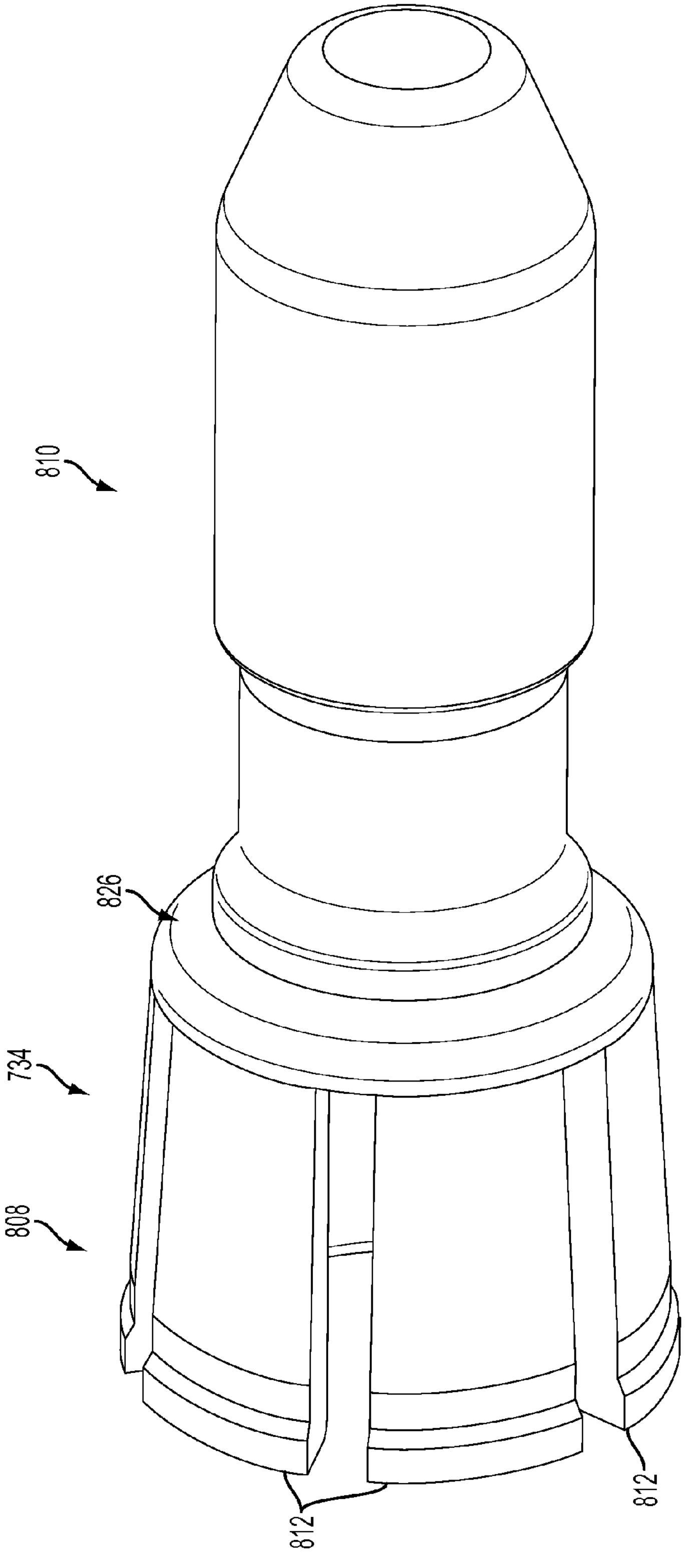
FIG. 35 is a side isometric view of one embodiment of the inner conductor engager of the coaxial cable device.
Figure 36:
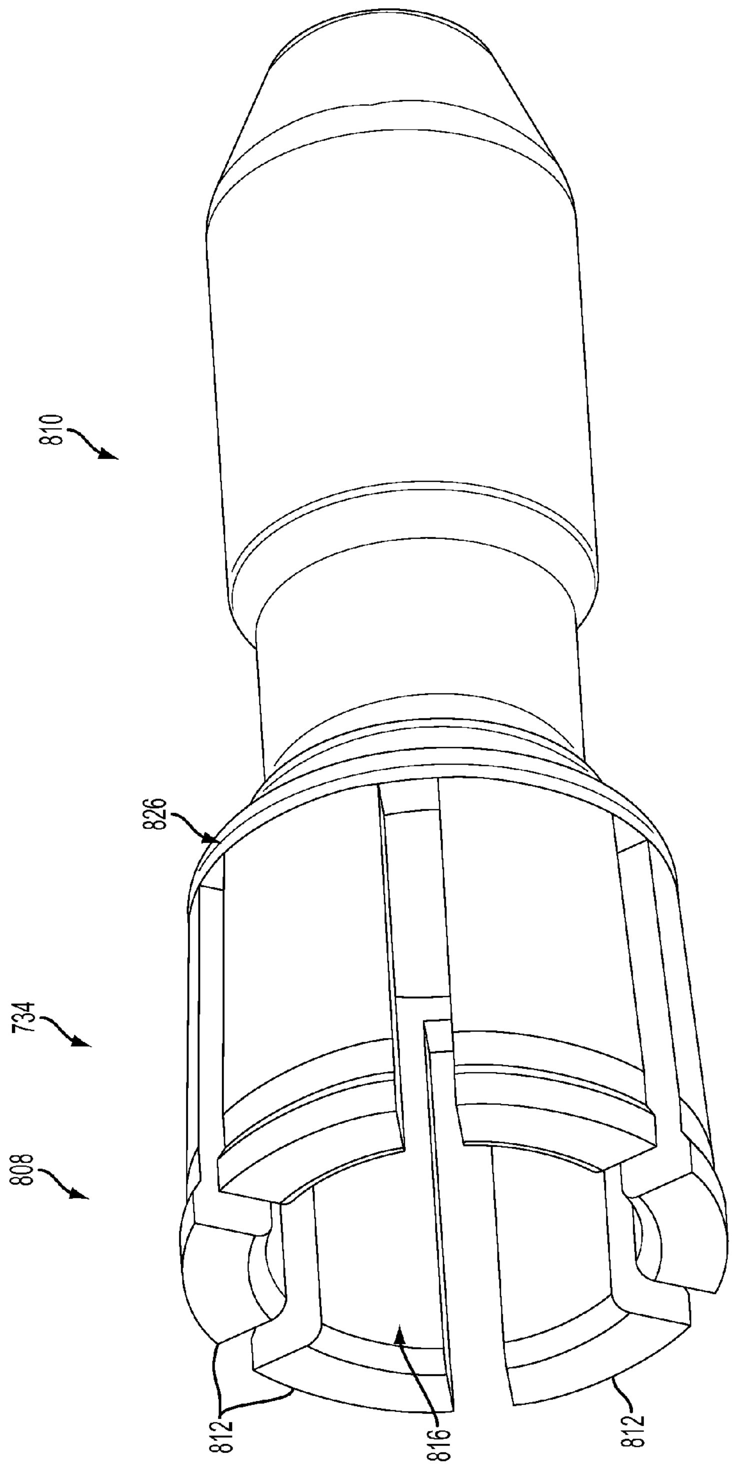
FIG. 36 is a rear isometric view of the inner conductor engager of FIG. 35.
Figure 37:
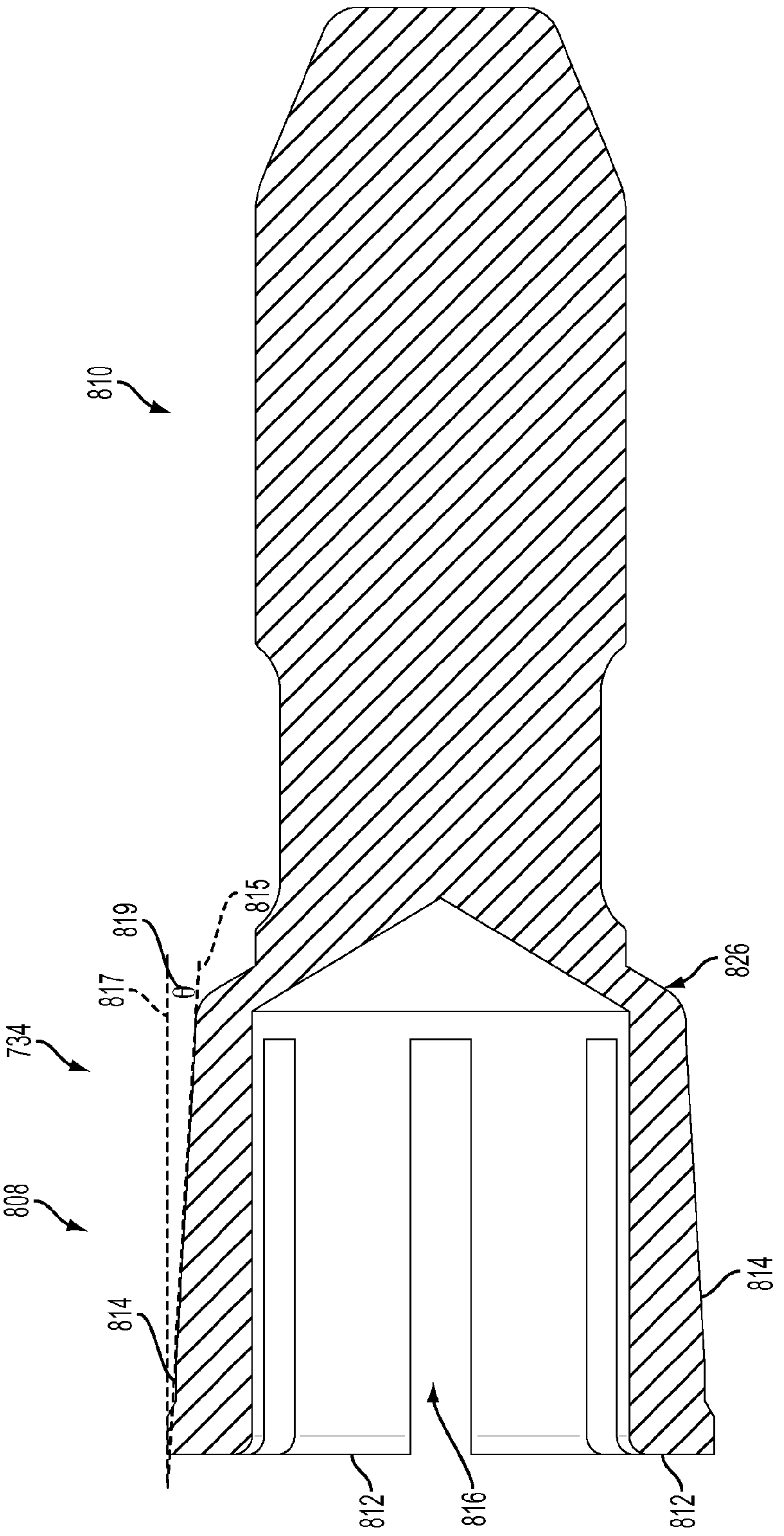
FIG. 37 is a side, cross-sectional view of the inner conductor engager of FIG. 35.
Figure 38:
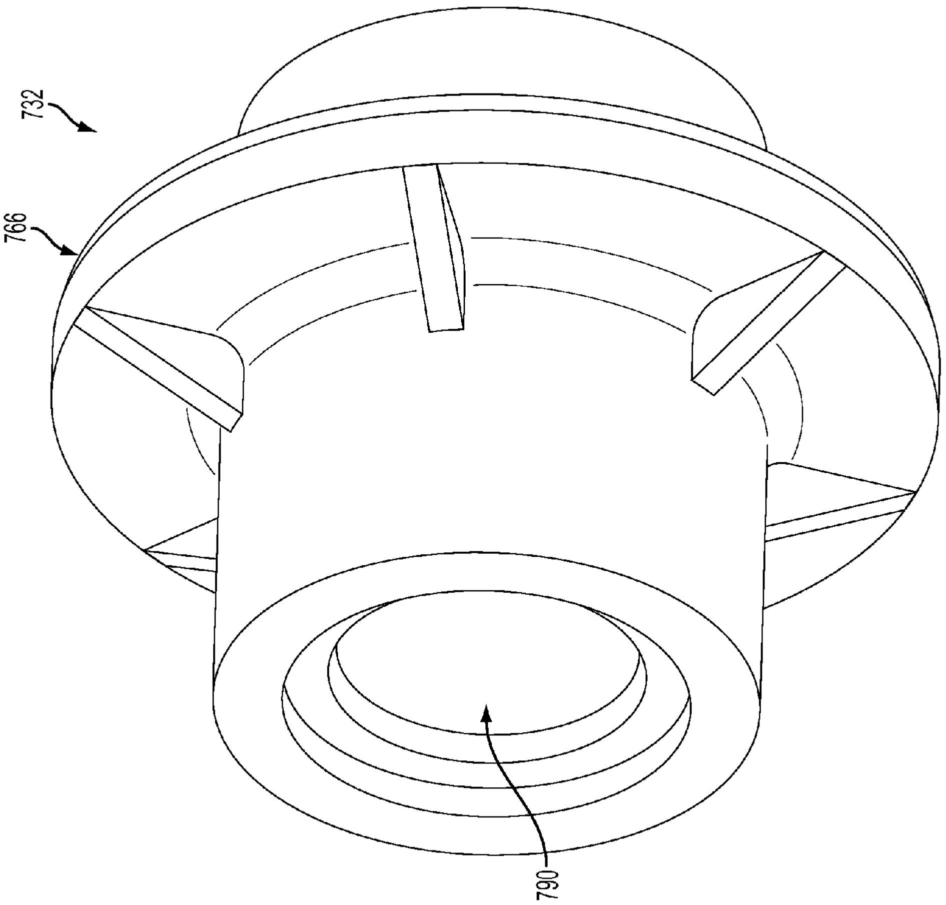
FIG. 38 is a rear isometric view of one embodiment of the compressor of the coaxial cable device.
Figure 39:
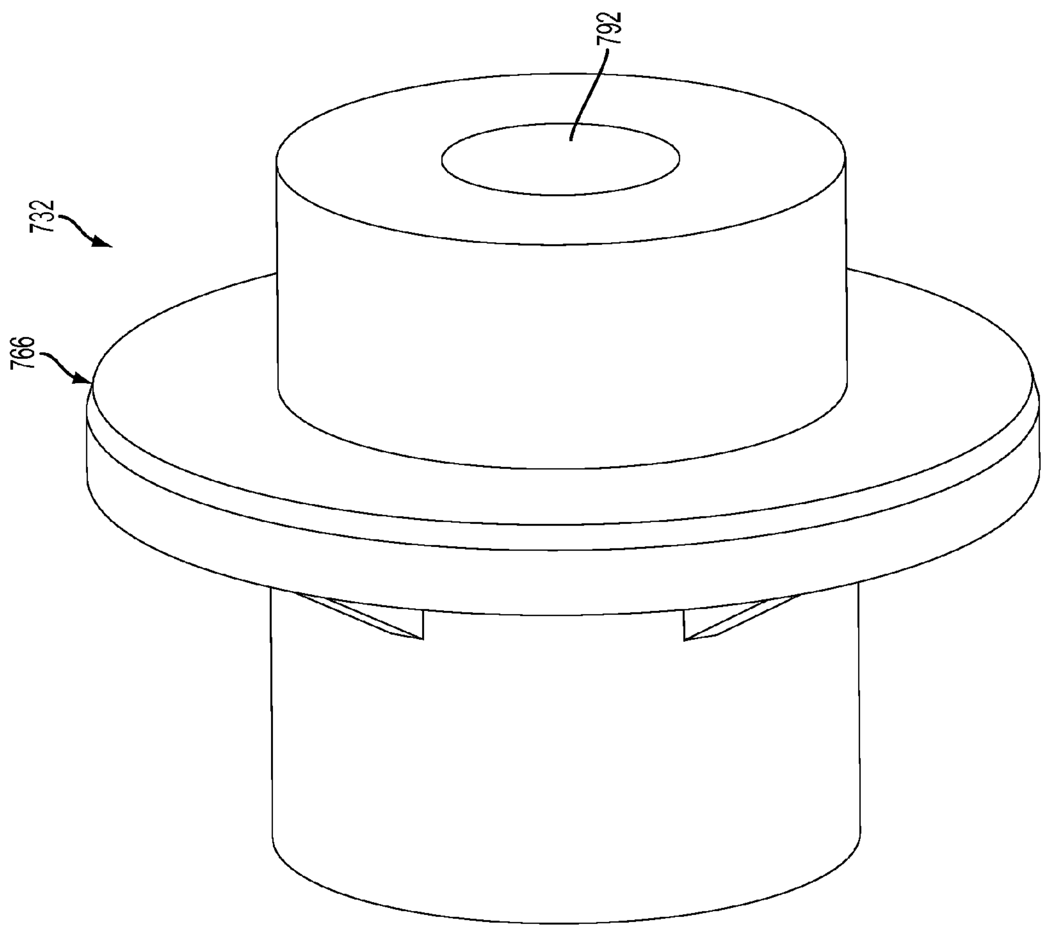
FIG. 39 is a front, side isometric view of the compressor of FIG. 38.

With continued reference to FIGS. 19-25 and 32-34, the opening 802 of the compression driver 733 is large enough to receive the inner conductor 714 but, in the illustrated embodiment, opening 802 is sized to block entry of the inner conductor engager 734. As illustrated in FIGS. 33-34, the forward face 796 has a plurality of equidistant notches or alignment guides 806. The alignment guides 806 facilitate the alignment of the compression driver 733 with the inner conductor engager 734 as described below.

Referring to FIGS. 19-25 and 35-37, the inner conductor receiver or inner conductor engager 734 includes a mouth section 808 and a neck section 810. The mouth section 808 has a ramped or tapered shape, and the mouth section 808 has a plurality of flexible grasps or jaws 812. The exterior wall 814 of each jaw 812 extends along an axis 815 which intersects with a horizontal or longitudinal axis 817, resulting in angle 819 at the vertex. It should be understood that the jaws 812 extend along their respective axes 814 when the inner conductor engager 734 is in its predisposed state. In this predisposed state, the mouth section 808 defines a space or cavity 816 sized to receive the inner conductor 714.

Figure 24:
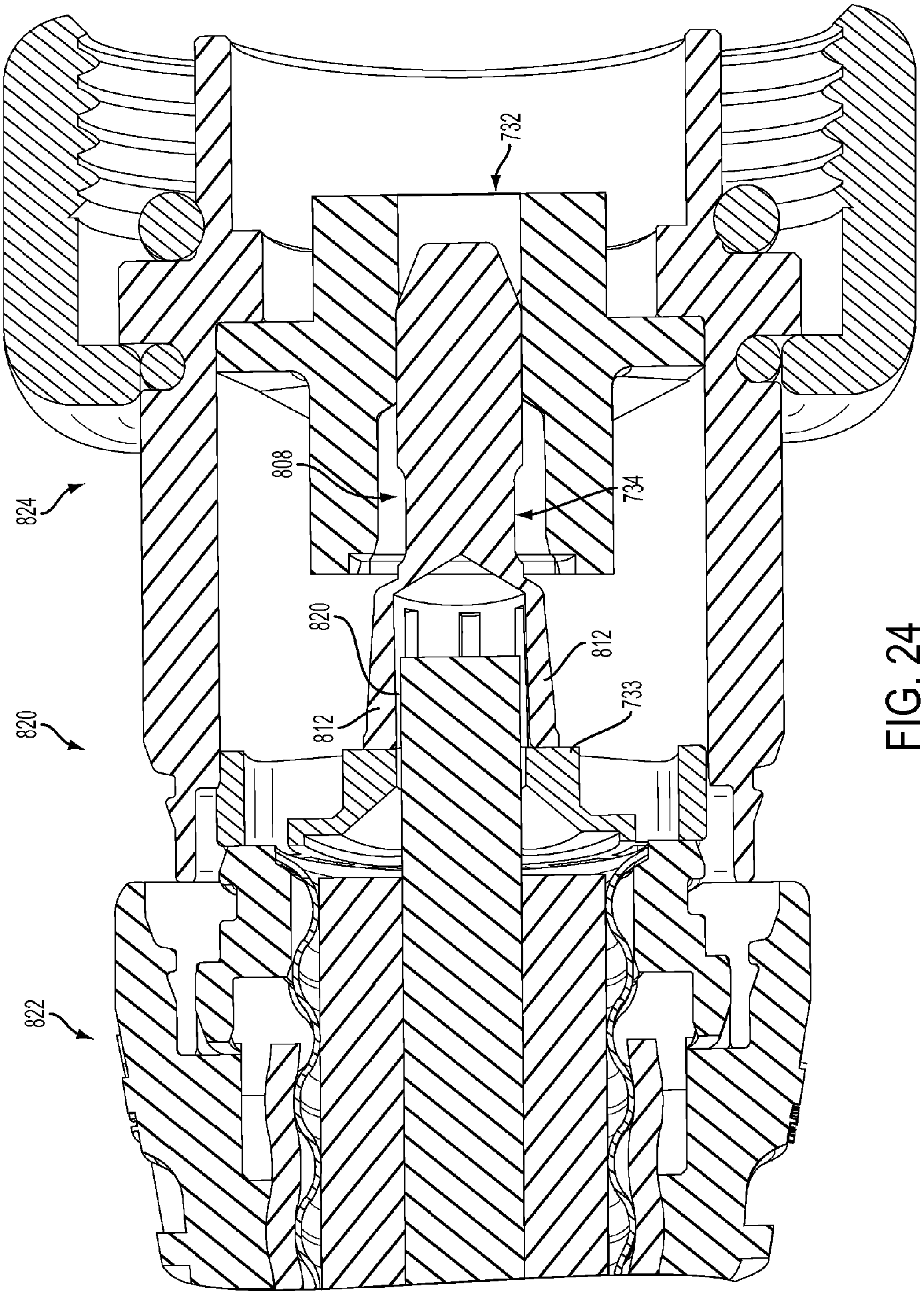
FIG. 24 is an enlarged, side cross-sectional view of one embodiment of the coaxial cable device, illustrating the arrangement before compression of the inner conductor.

As illustrated in FIG. 24, the cavity 818 is great enough to provide a gap 820 between the inner conductor 714 and the jaws 812. During installation, as illustrated in FIG. 24, the left assembly 822 is moved toward the right assembly 824. During the movement, the guides 806 of the compression driver 733 align the inner conductor engager 734 for engagement. Then the compression driver 733 pushes or drives the inner conductor engager 734 into the compressor 732 until the mouth section 808 of the inner conductor engager 734 fully seats within the compression chamber 790 of the compressor 732. The full seating is reached when the bottom wall 826 of the mouth section 808 abuts the floor 828 of the compression chamber 790, illustrated in FIG. 40.

Figure 25:
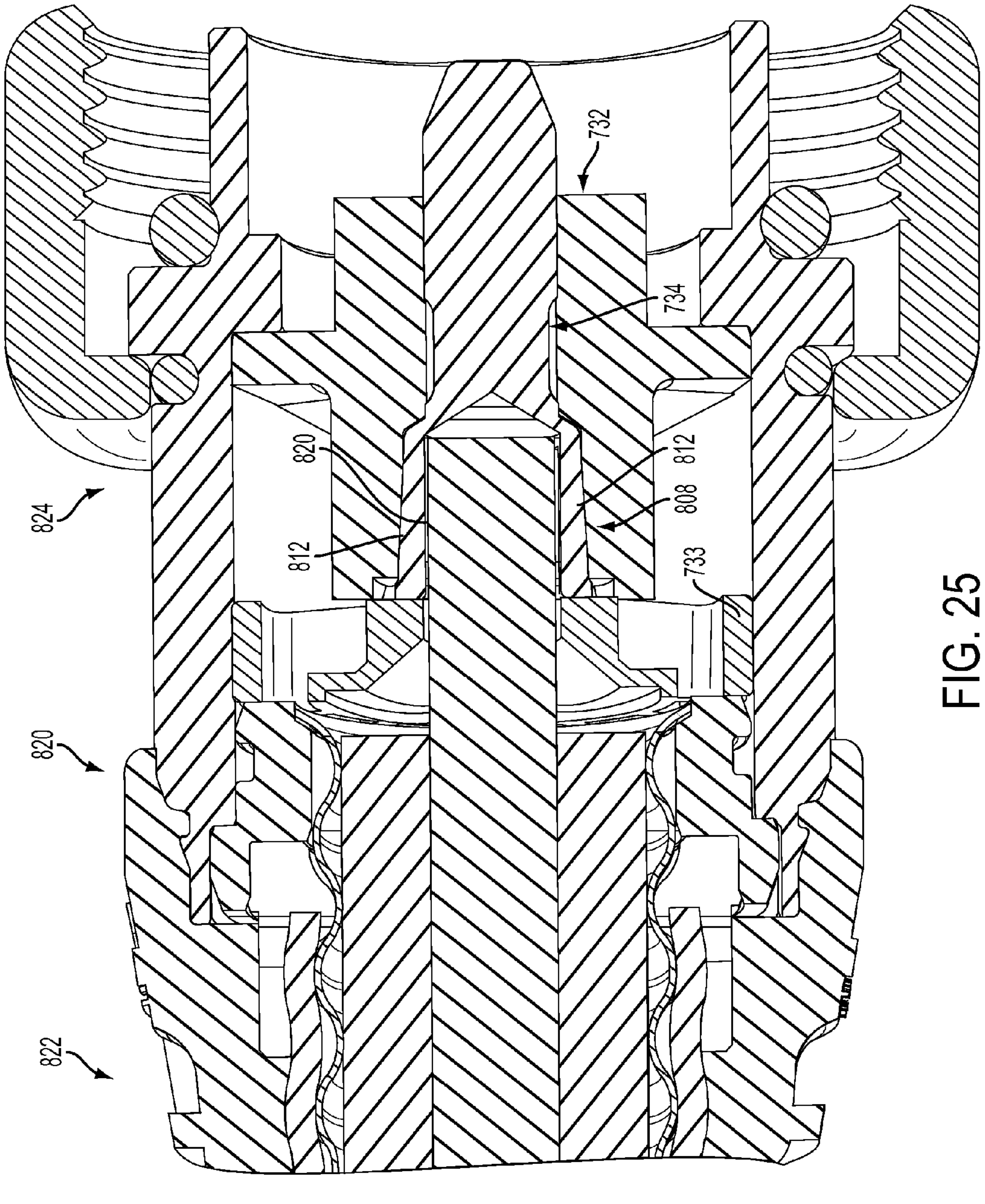
FIG. 25 is an enlarged, side cross-sectional view of one embodiment of the coaxial cable device, illustrating the arrangement after compression of the inner conductor.
Figure 40:
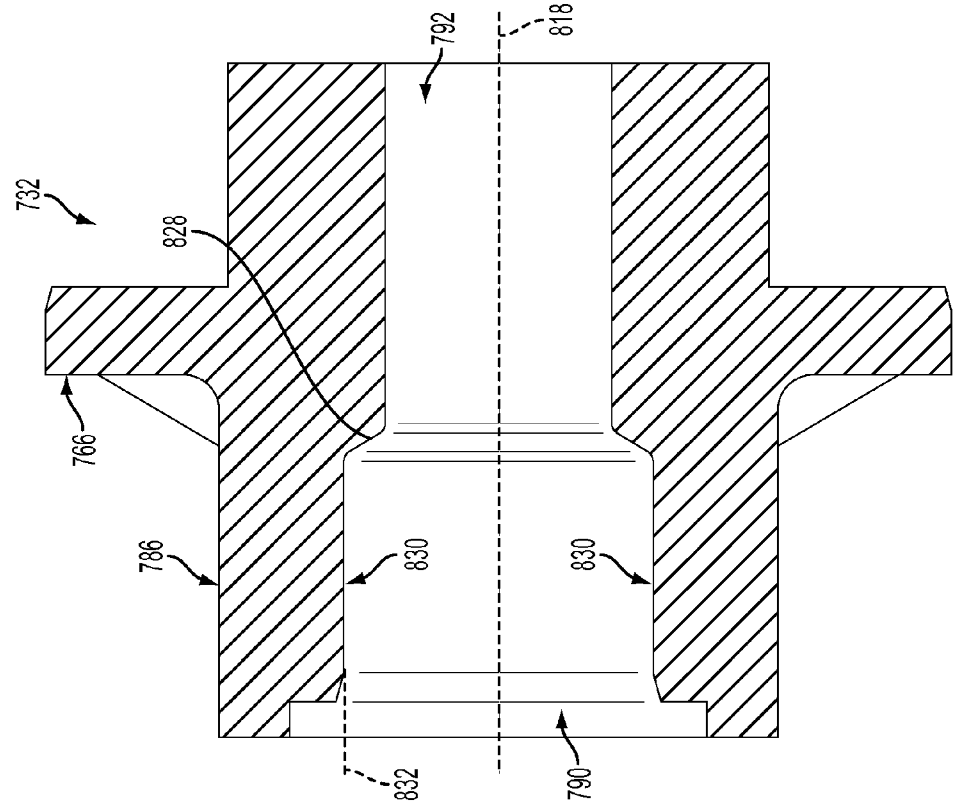
FIG. 40 is a side, cross-sectional view of the compressor of FIG. 38.
Figure 41:
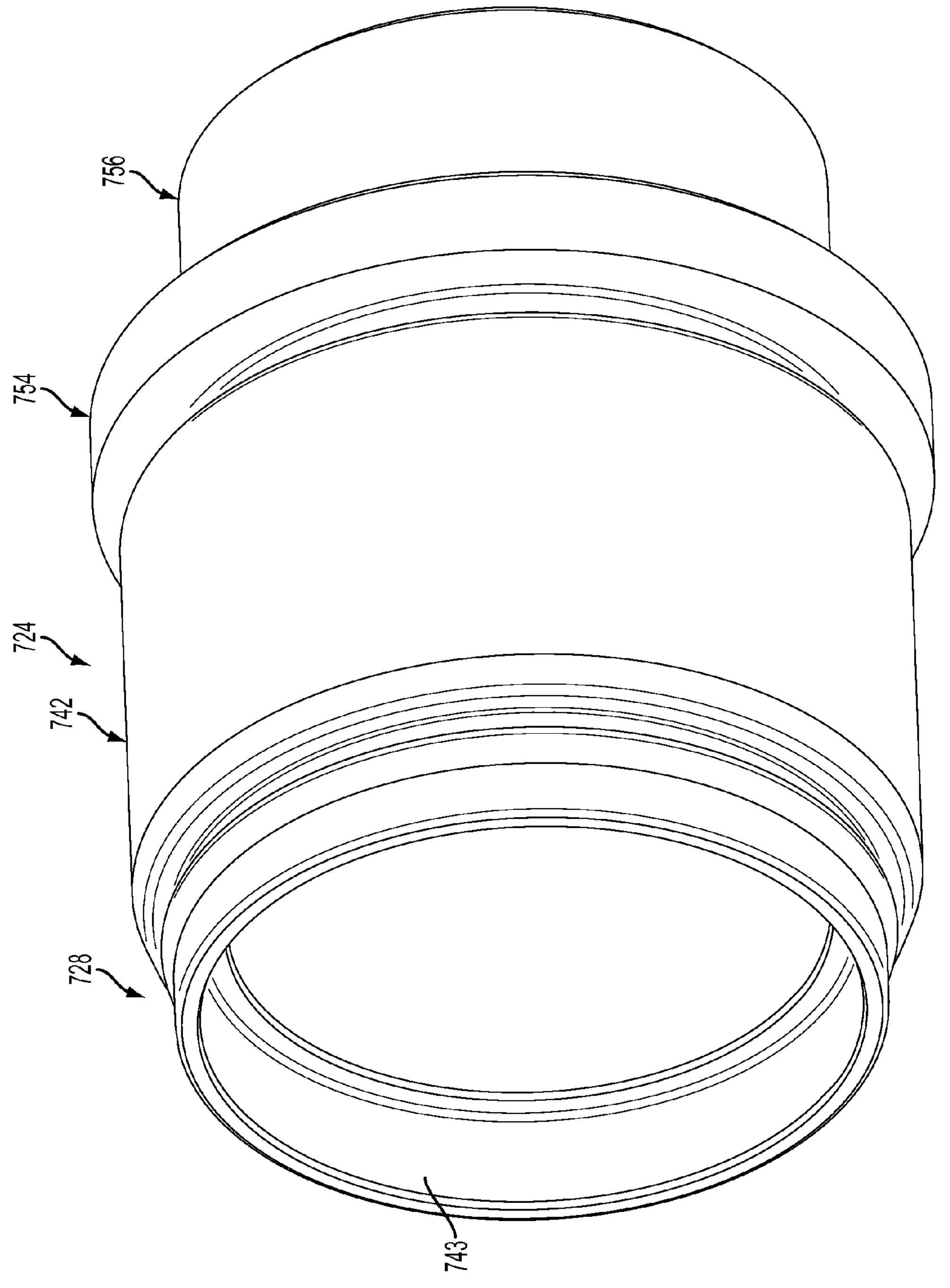
FIG. 41 is a rear, isometric view of one embodiment of the connector body of the coaxial cable device.
Figure 42:
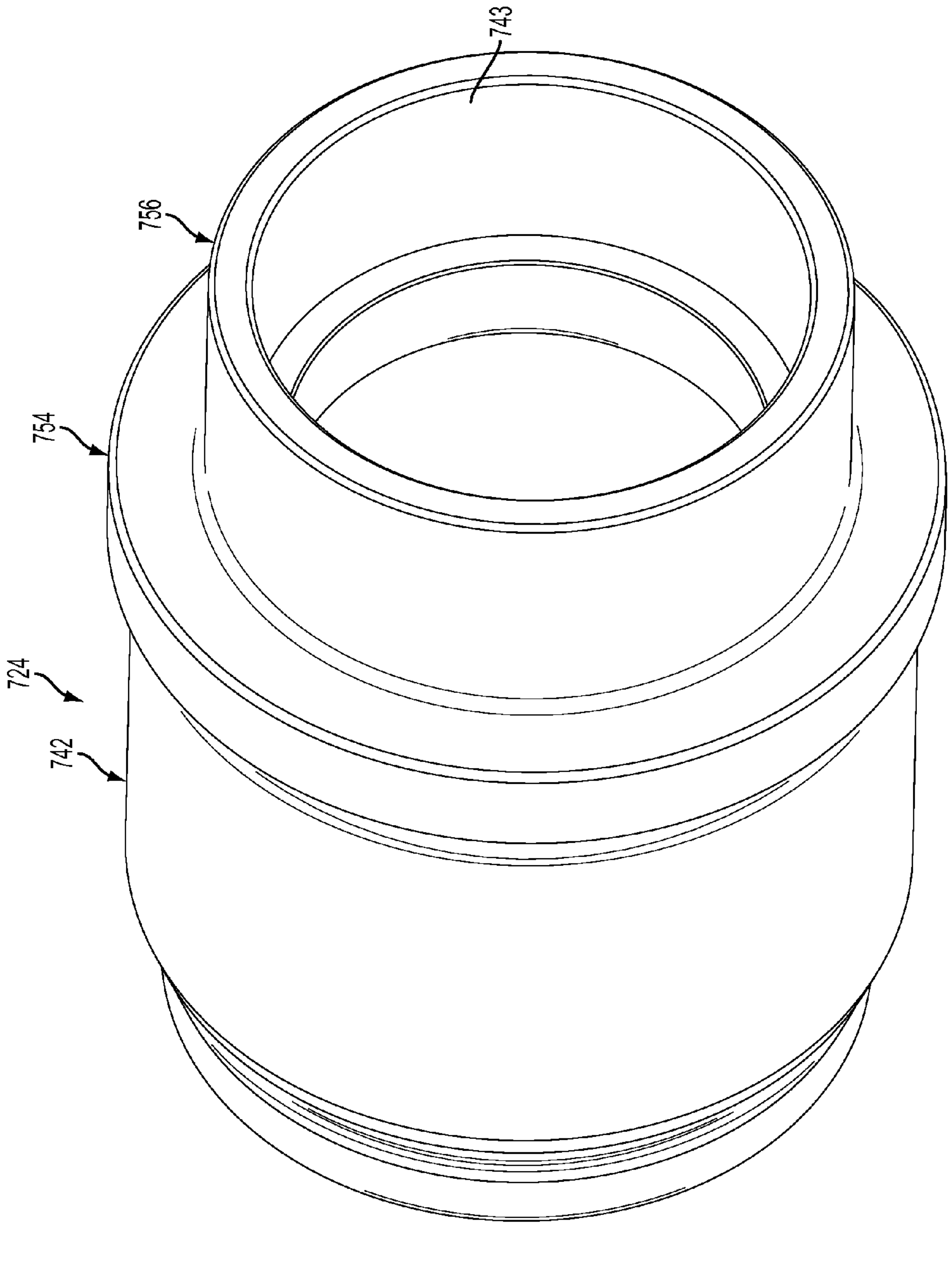
FIG. 42 is a front, isometric view of the connector body of FIG. 41.
Figure 43:
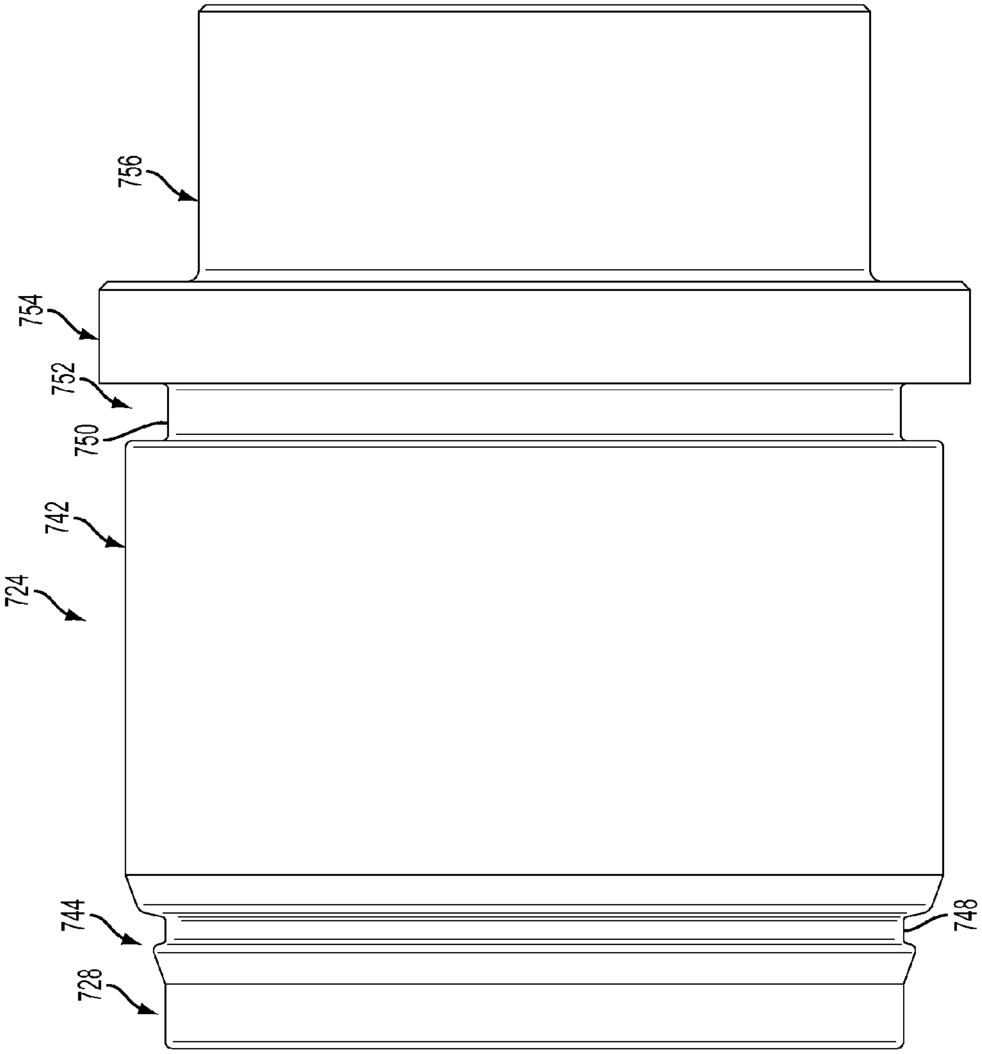
FIG. 43 is a side elevation view of the connector body of FIG. 41.
Figure 44:
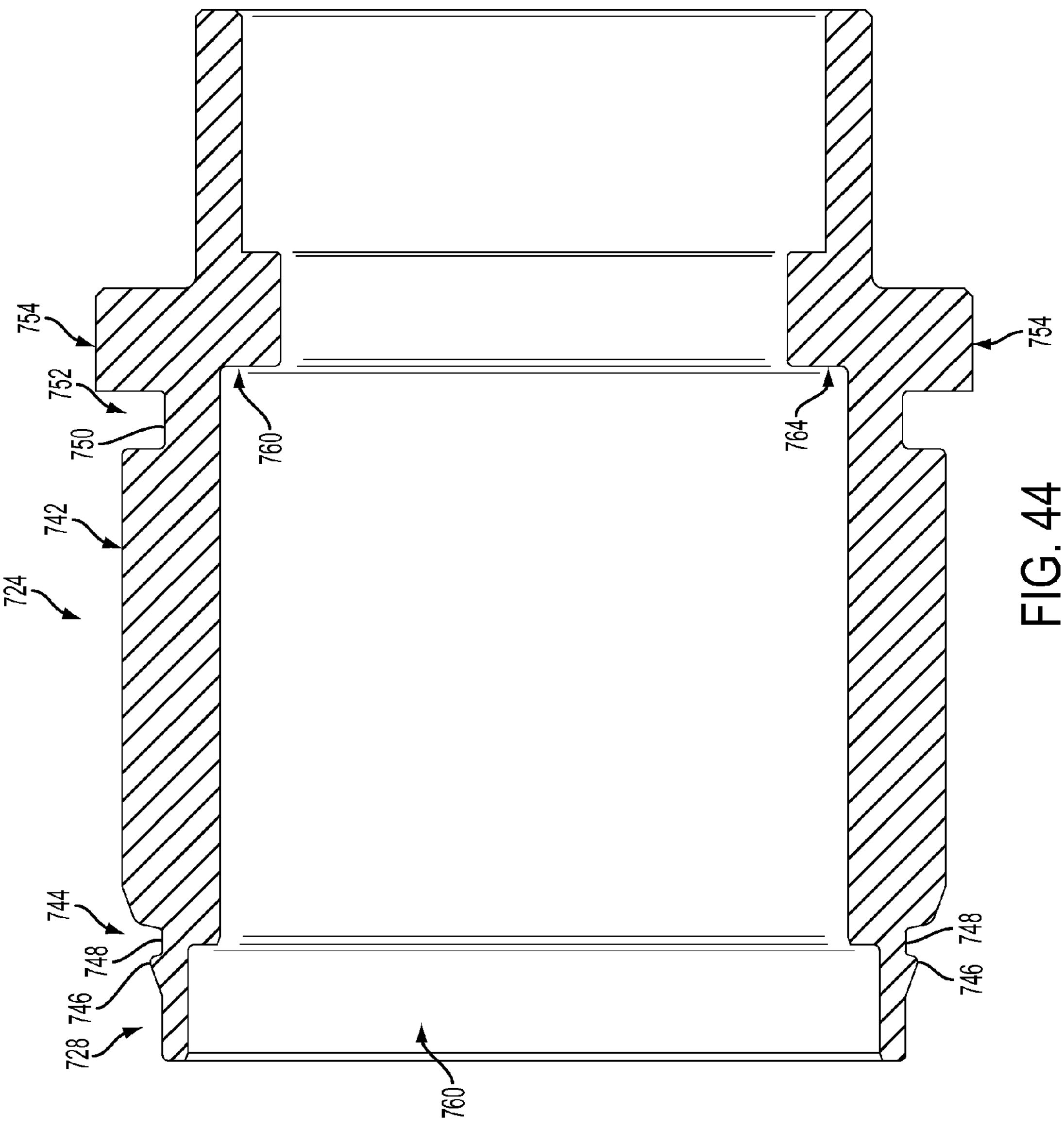
FIG. 44 is a side cross-sectional view of the connector body of FIG. 41.

Referring to FIG. 40, the compression chamber wall 830 extends along a chamber wall axis 832. In the illustrated embodiment, the chamber wall axis is parallel, or substantially parallel, with the longitudinal axis 818. In another embodiment, the chamber wall axis 832 intersects with the longitudinal axis 818. In such embodiment, the vertex angle of the intersecting axes 832 and 818 is less than the vertex angle 819 of the intersecting axes 814 and 818. As a result, when the mouth section 808 of the inner conductor engager 734 is driven into the compression chamber 790, the compression chamber wall 830 applies a radial force onto the jaws 812. In response, the jaws 812 press down upon, grasp and engage the inner conductor 714, as illustrated in FIG. 25.

Figure 19:
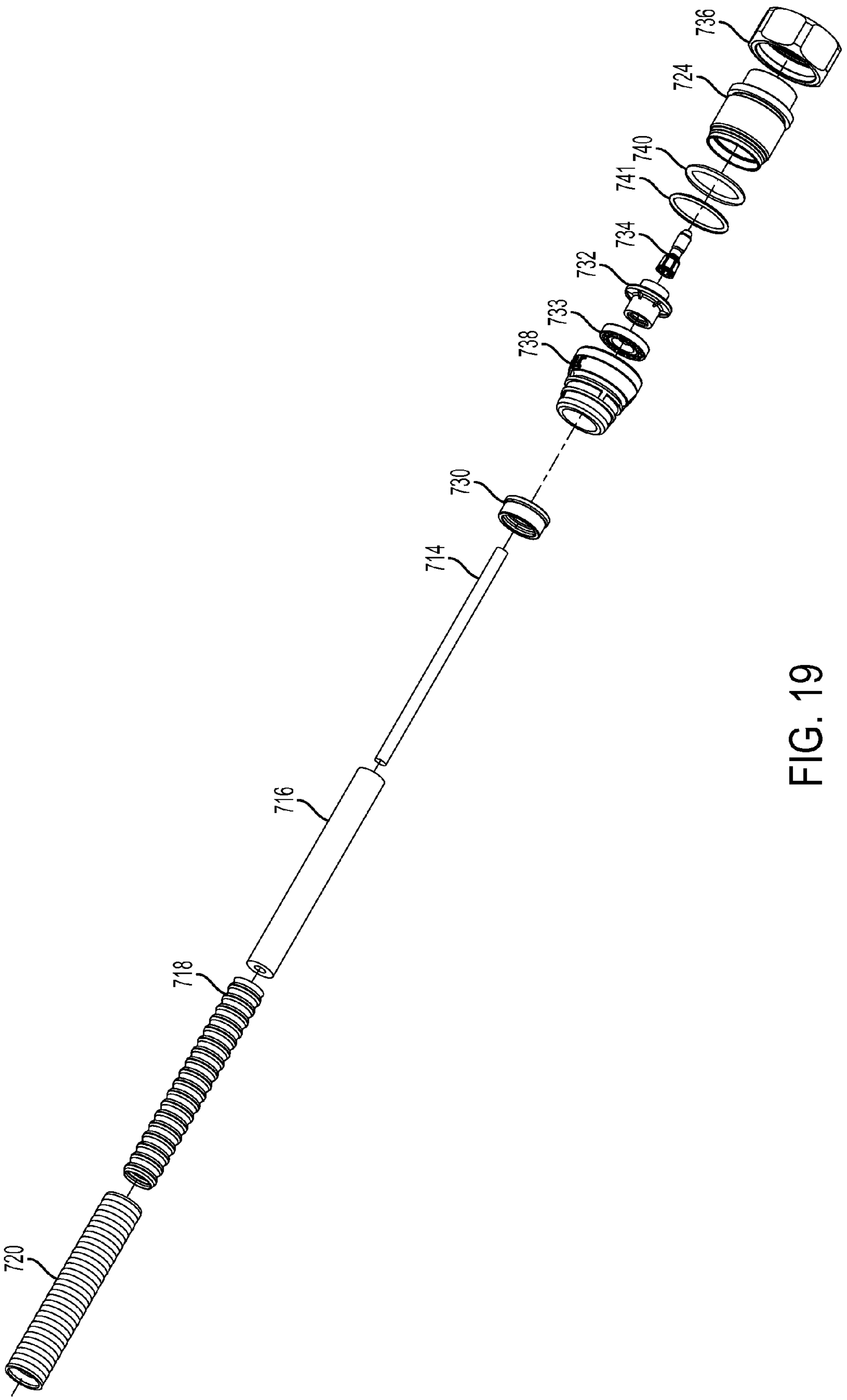
FIG. 19 is a top isometric, exploded view of the components of one embodiment of the coaxial cable device.
Figure 20:
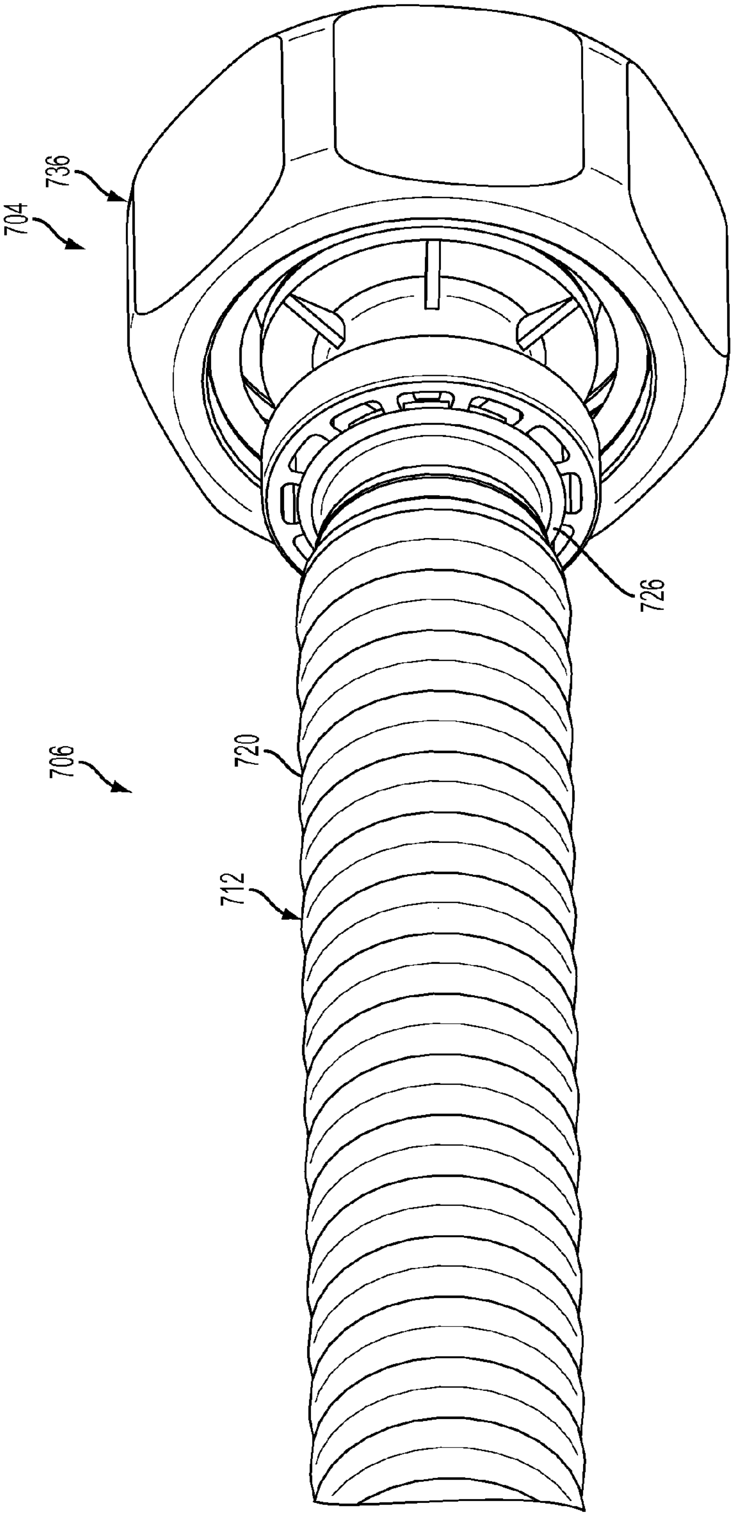
FIG. 20 is a side isometric view of one embodiment of the coaxial cable device, illustrating the visible parts with the boot and connector body removed.
Figure 21:
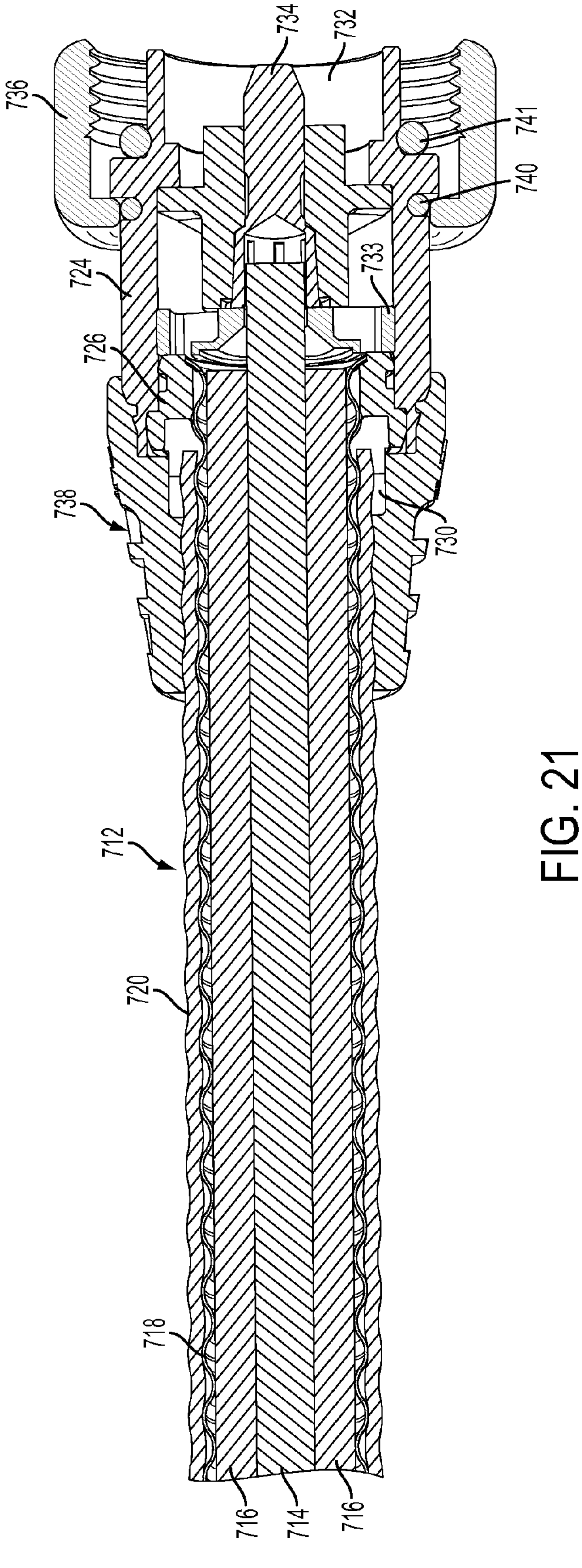
FIG. 21 is a side, cross-sectional view of one embodiment of the coaxial cable device.
Figure 22:
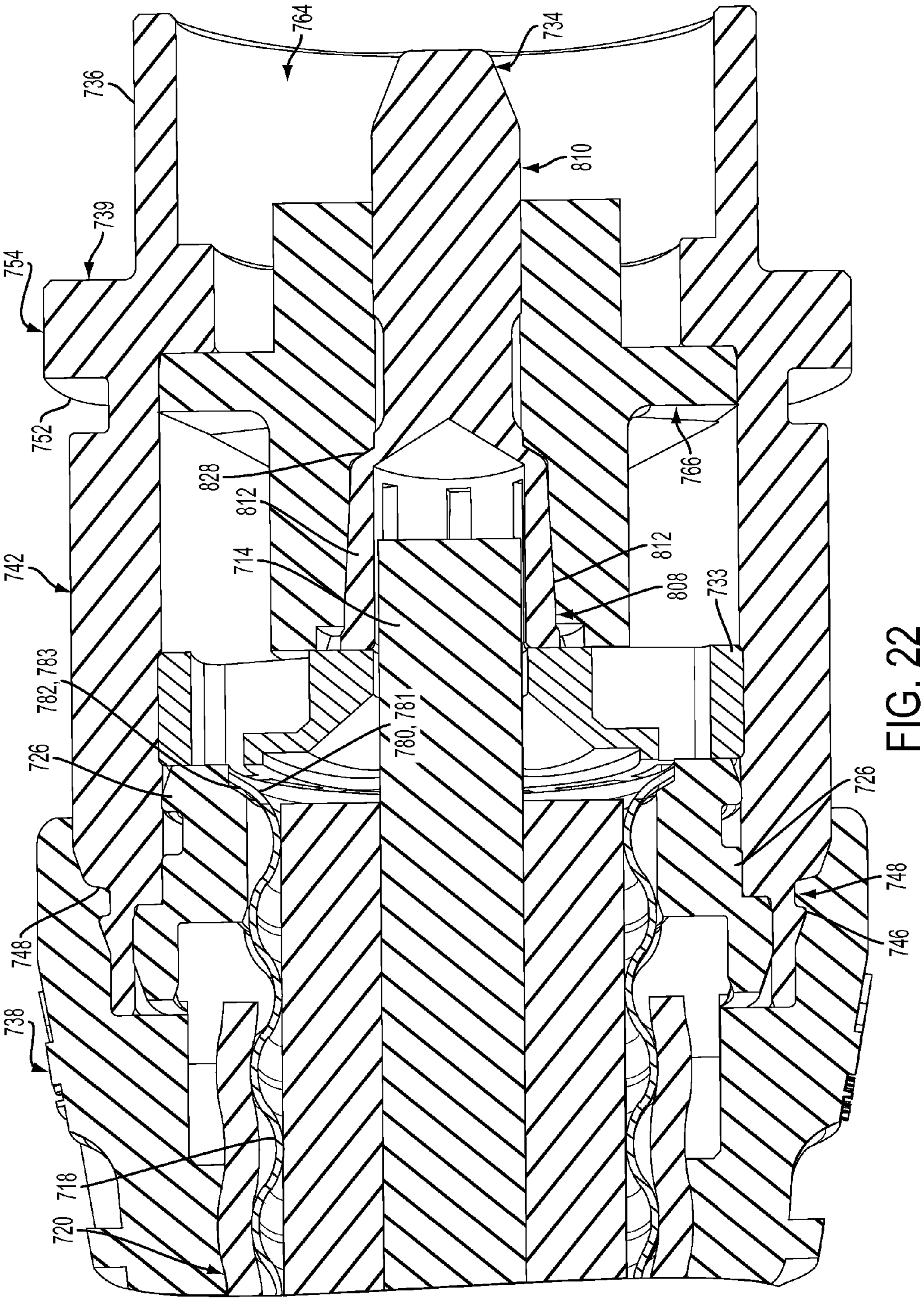
FIG. 22 is an enlarged, side cross-sectional view of one embodiment of the coaxial cable device.
Figure 23:
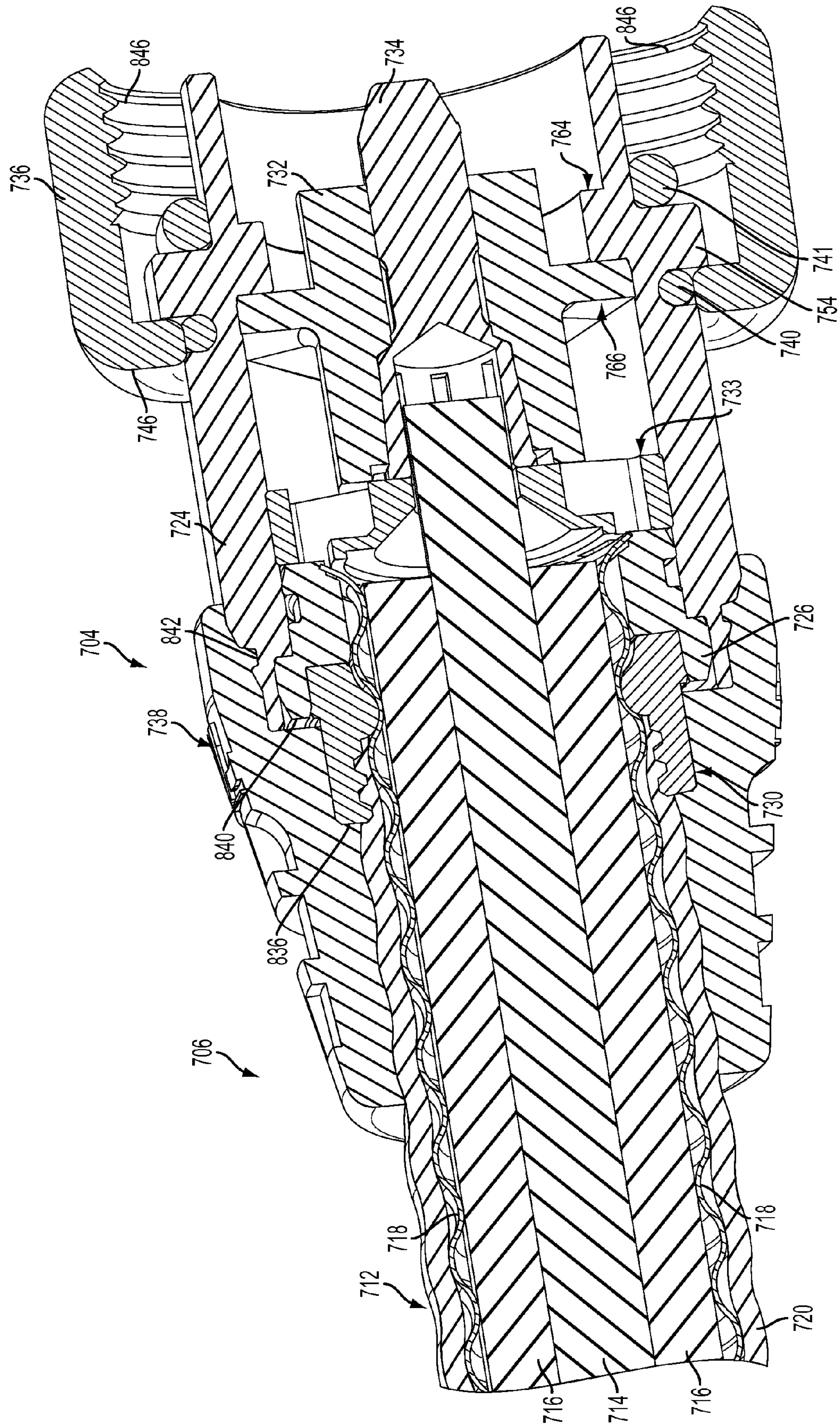
FIG. 23 is an enlarged, isometric cross-sectional view of one embodiment of the coaxial cable device.

Referring to FIGS. 19 and 23, in one embodiment, the seals 740 and 741 includes O-rings of a suitable size and shape to reduce or minimize the entry of fluid or liquid into the cable device 706. When the coupler 736 is securely screwed onto a threaded post of another component, the seal 741 forms a seal with the component.

Figure 27:
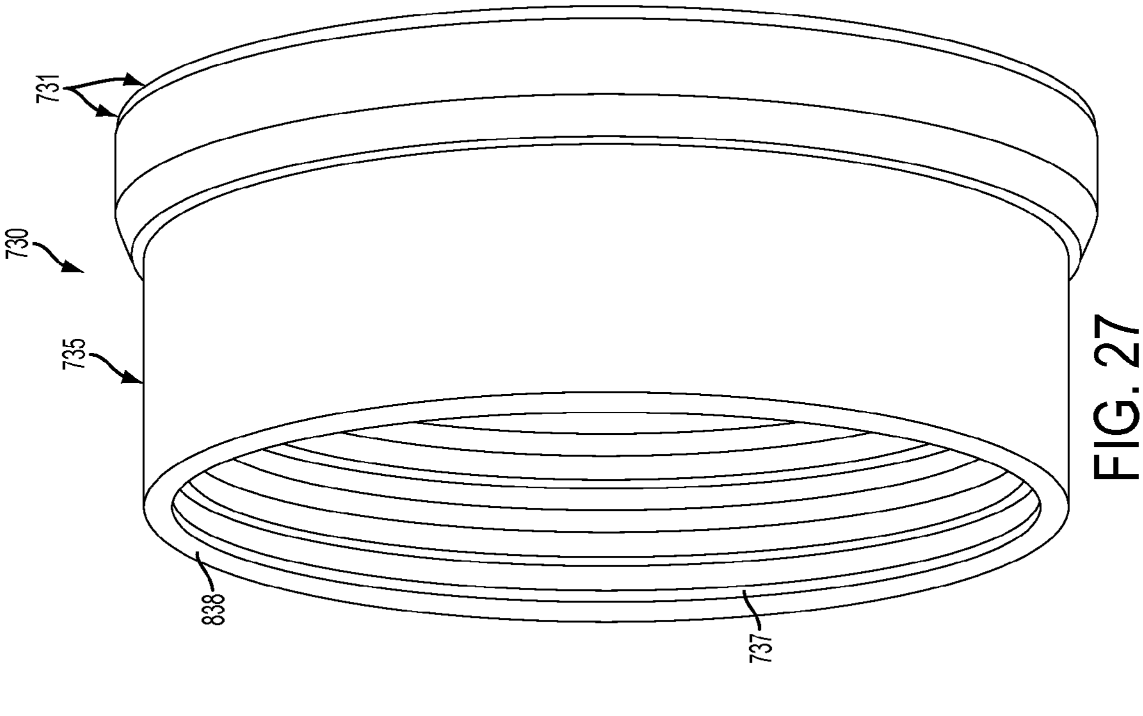
FIG. 27 is a side isometric view of one embodiment of the seal of the coaxial cable device.
Figure 28:
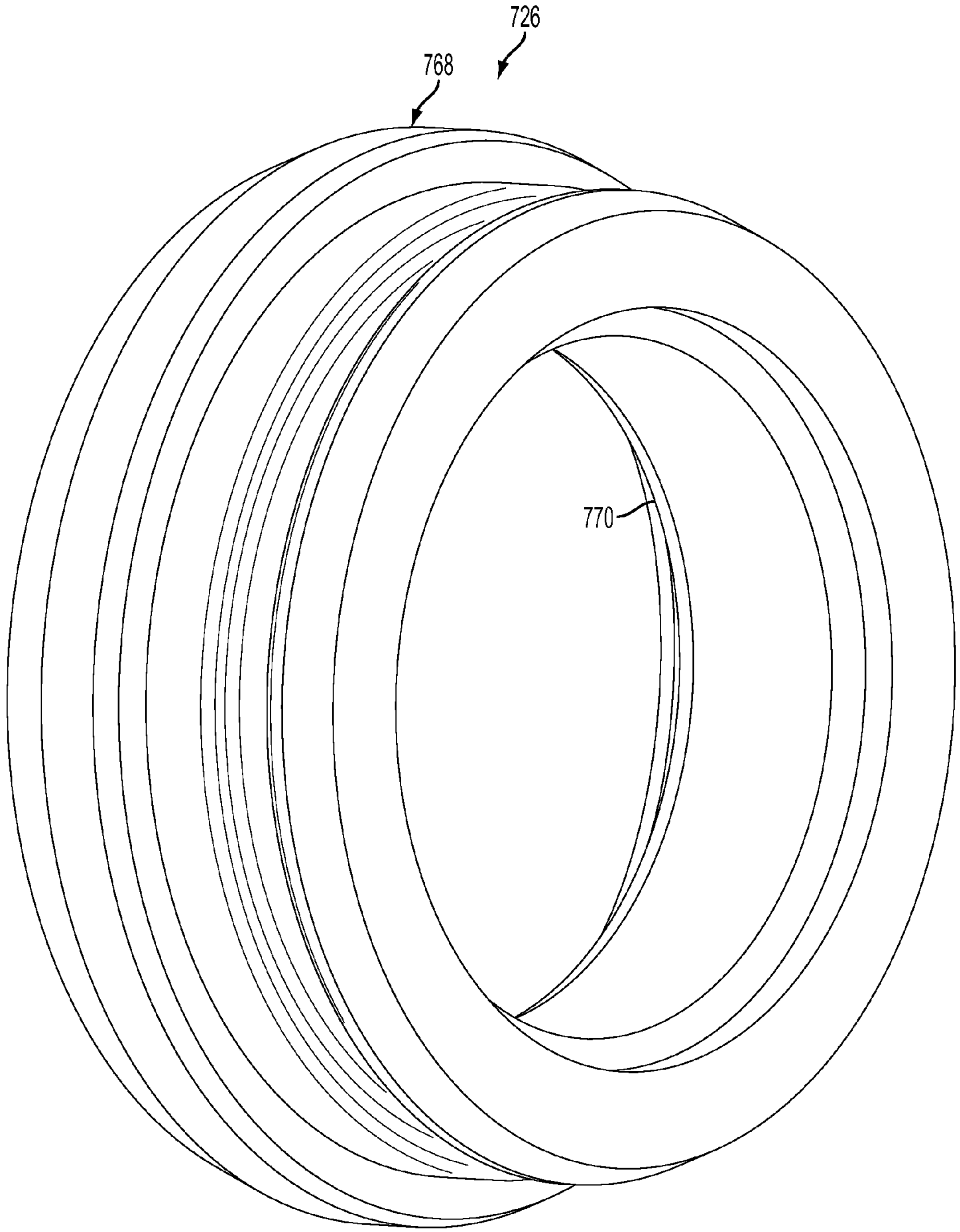
FIG. 28 is a front isometric view of one embodiment of the outer conductor engager of the coaxial cable device.
Figure 29:
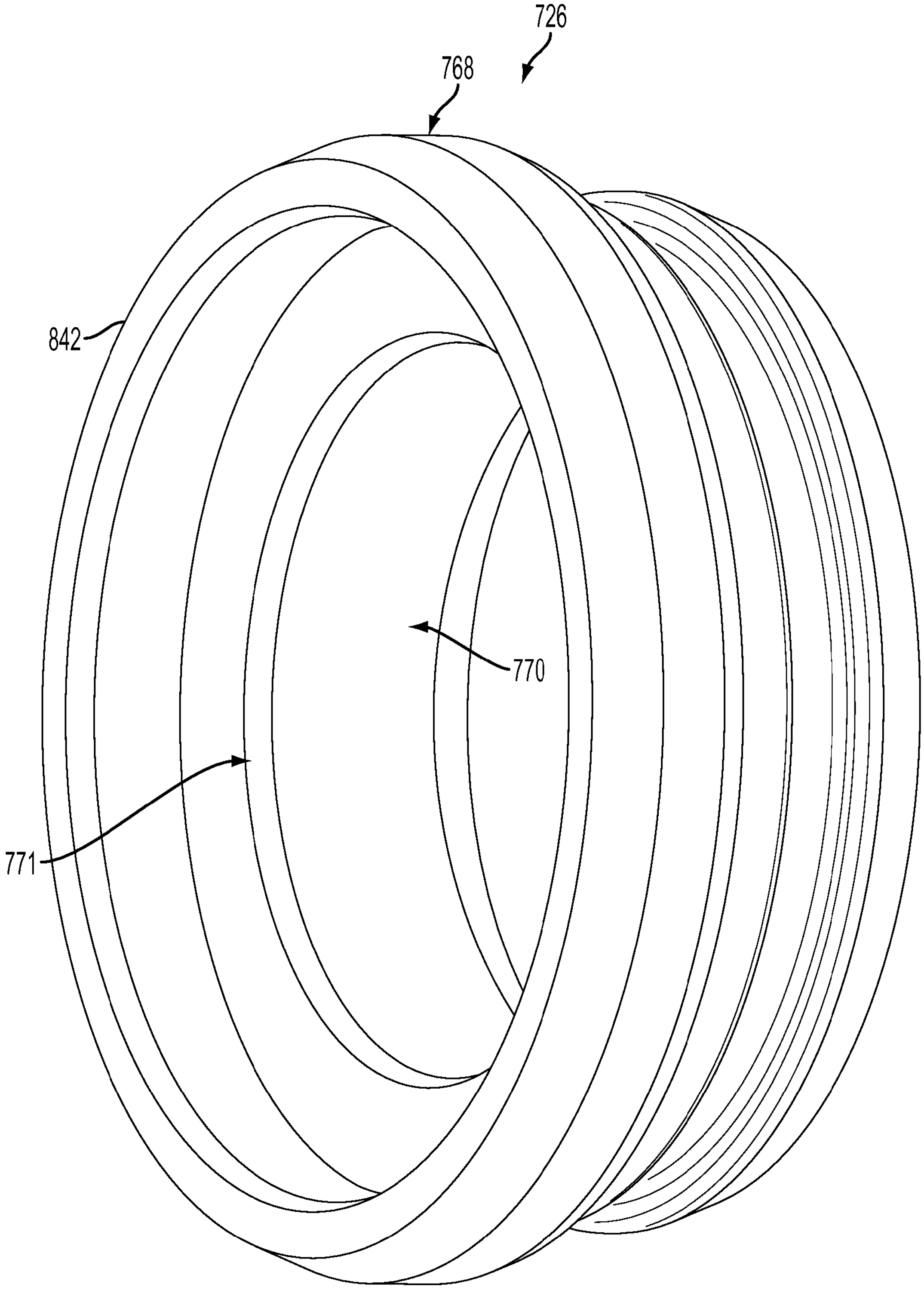
FIG. 29 is a rear isometric view of the outer conductor engager of FIG. 28.
Figure 31:
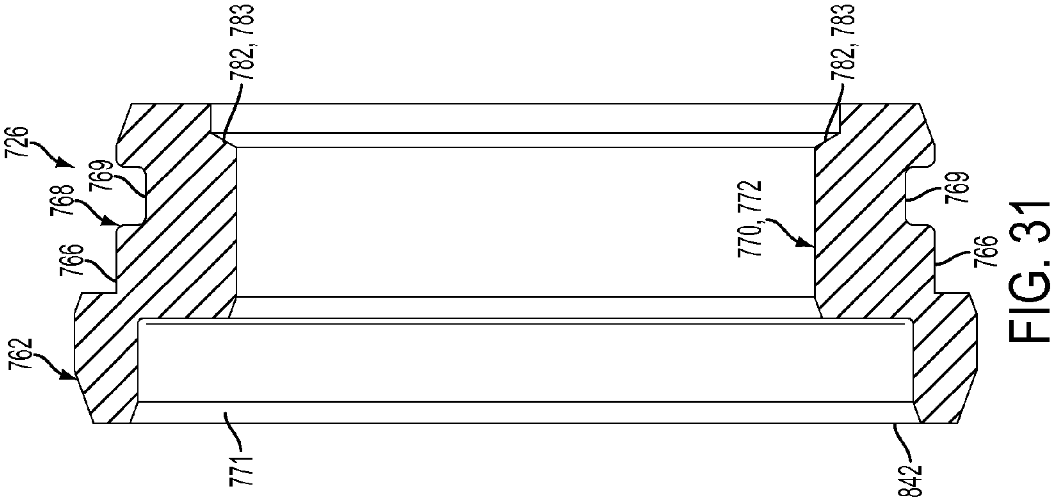
FIG. 31 is a side cross-sectional view of the outer conductor engager of FIG. 28.
Figure 30:
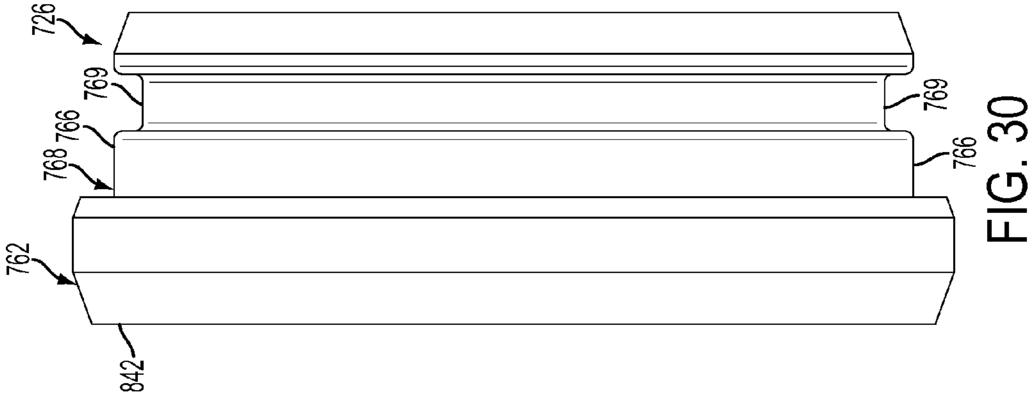
FIG. 30 is a side elevation view of the outer conductor engager of FIG. 28.
Figure 32:
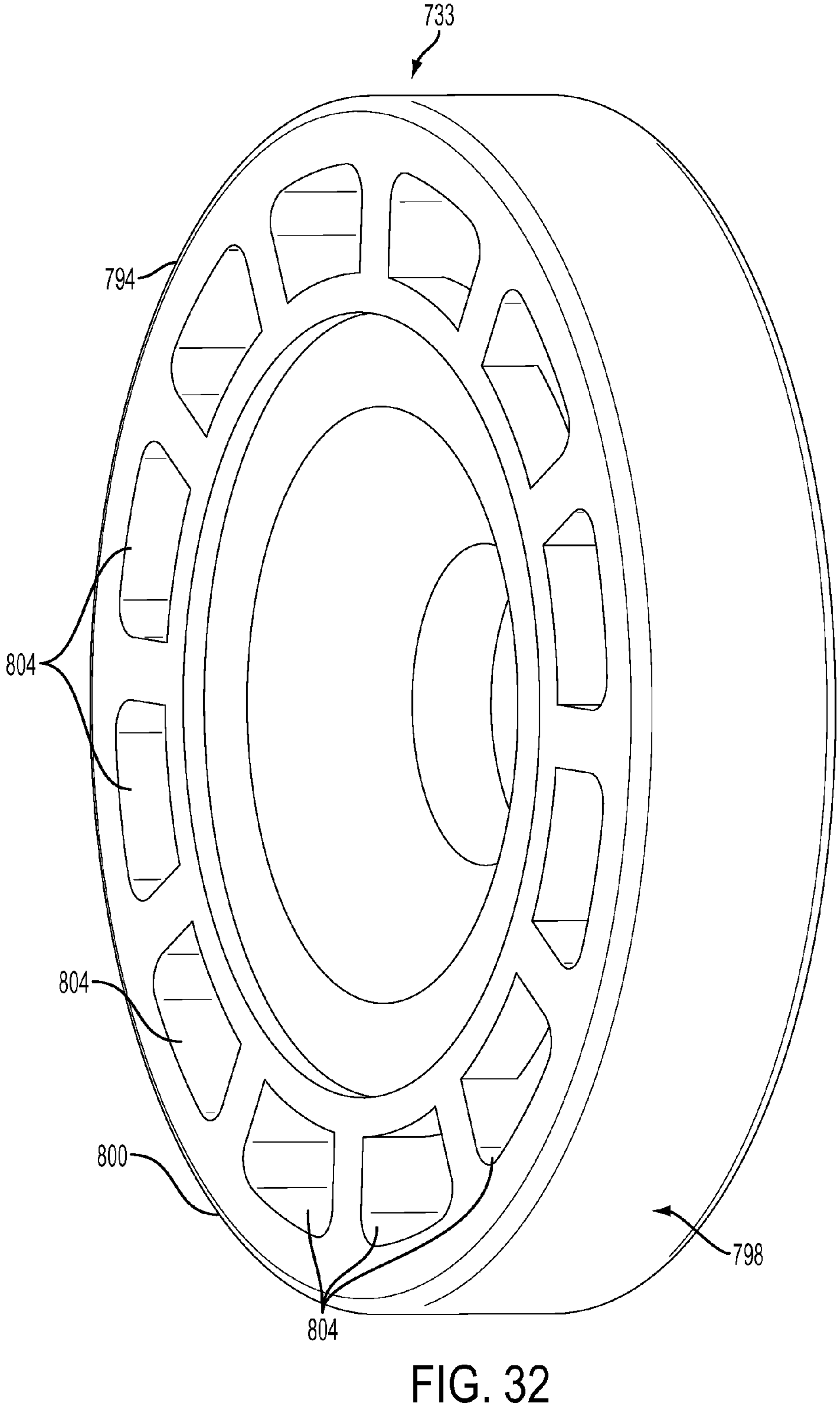
FIG. 32 is a rear isometric view of one embodiment of the compression driver of the coaxial cable device.

Referring to FIGS. 23 and 27, in one embodiment, the plug or seal 730 has a generally tubular shape and is constructed of a suitably compressible or deformable material. The seal 730 includes: (a) an outer conductor engager mating wall 731 configured to mate with the seal engager 771 of the outer conductor engager 726; (b) a boot mating wall 735 configured to mate with the seal mating wall 836 of the strain relief device or boot 738; and (c) a cable engagement wall 737 configured to compress and engage the cut end of the jacket 720 and the exposed part of the outer conductor 718. The seal 730 is operable to reduce the entry of fluids or liquid into the cable 712 or connector 704.

Figure 26:
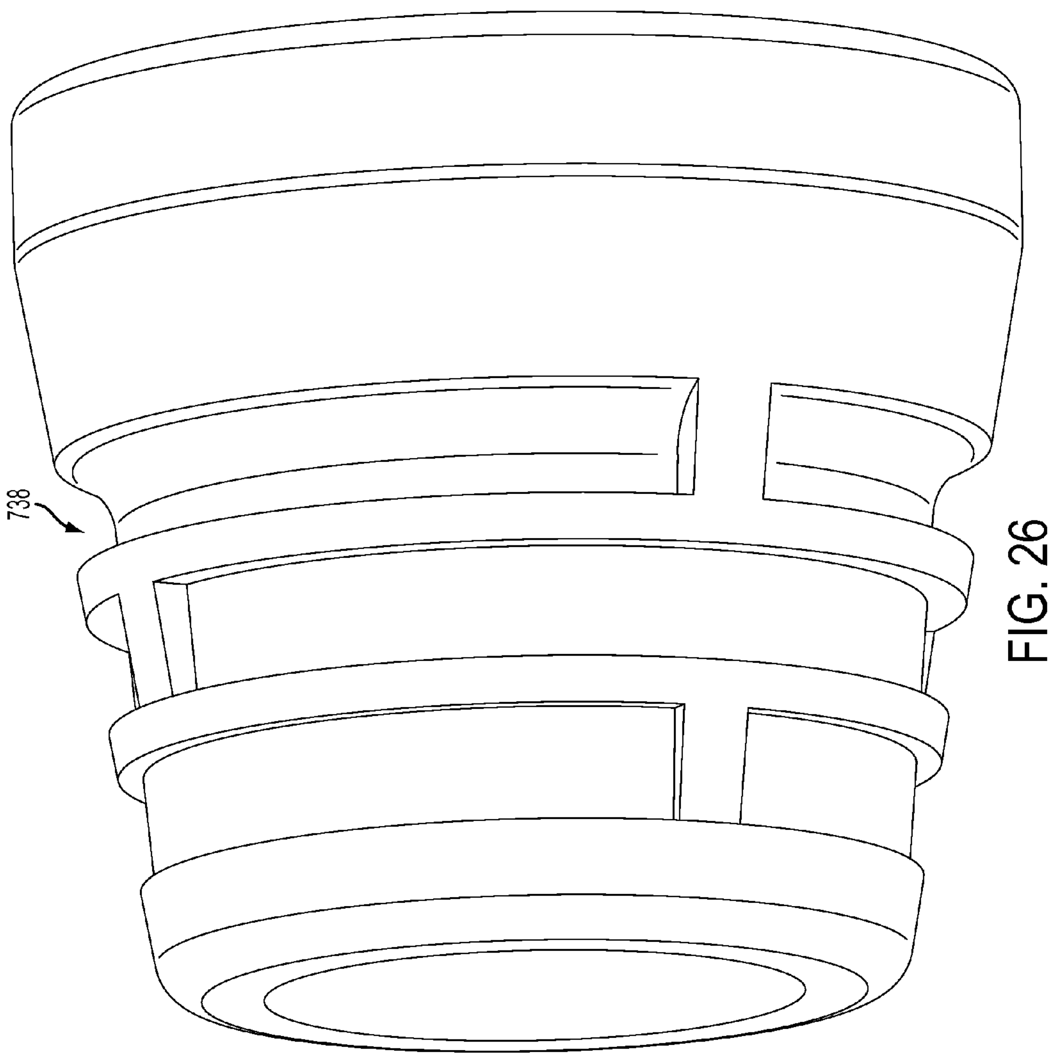
FIG. 26 is a side isometric view of one embodiment of the boot of the coaxial cable device.

Referring to FIGS. 23 and 26, in one embodiment, the strain relief device, cover or boot 738 has: (a) a circumferential seal mating wall 836 configured to mate with the rearward wall 838 of the seal 730; (b) a circumferential intermediate mating wall 840 configured to mate with the rearward wall 842 of the outer conductor engager 726; and (c) a circumferential notch 842 configured to snap-fit into groove 748 of the connector body 724. In one embodiment, the strain relief device or boot 738 has a relatively rigid structure formed of polyethylene or another suitable material. To install the boot 738, the assembler slides the boot 738 over the connector body 724 until the notch 842 fits into the groove 748. At this point, the coaxial cable device 706 is assembled.

In one embodiment, the fastener or coupler 736 has a plurality of internal threads 846. The threads 846 enable one to screwably connect the coaxial cable device 706 to a threaded post of a connector of another coaxial cable, to the threaded post of an electronic telecommunications device or to a threaded post of an interface port.

In another embodiment illustrated in FIGS. 54-58, the inner conductor engager is welded to the inner conductor 714 instead of being compressed onto the inner conductor 714. In such embodiment, the coaxial cable connector includes all of the components and elements of coaxial cable connector 704 except that: (a) the compression driver 733 is excluded; (b) the shape of the compressor 732 is modified as described below; and (c) the shape of the inner conductor engager 734 is modified as described below.

Figure 54:
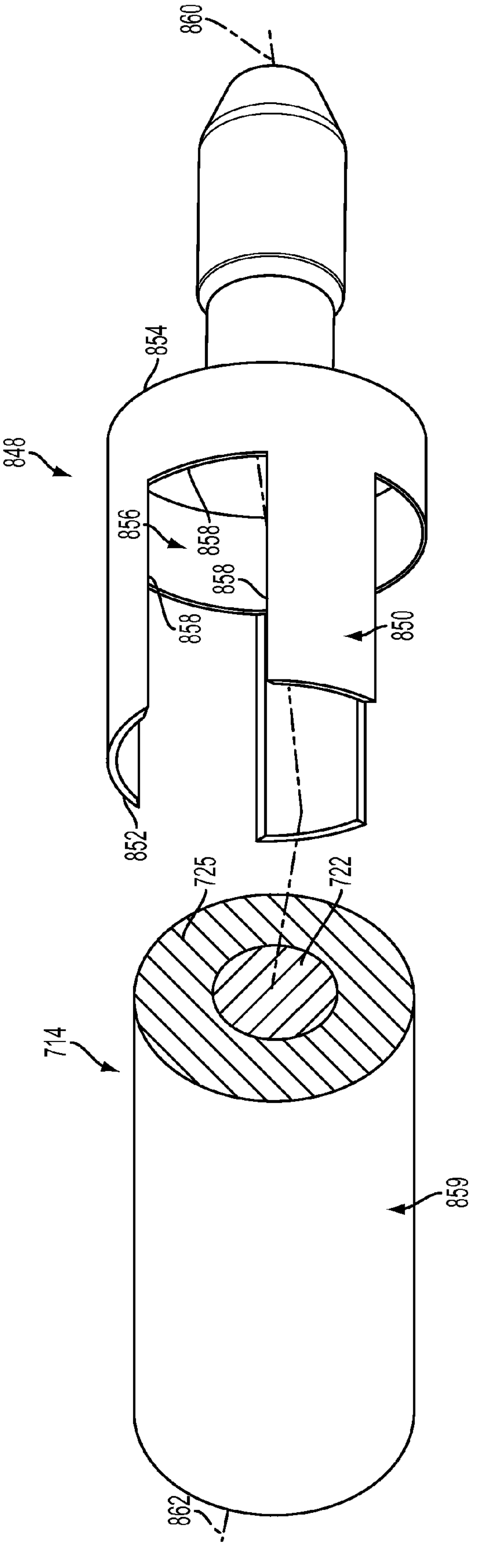
FIG. 54 is a side isometric view of one embodiment of the inner conductor and inner conductor engager of the coaxial cable device.

Referring to FIG. 54, in one such embodiment, the inner conductor engager 848 has a cup-shape including: (a) a side wall 850 having an entry edge or rearward edge 852 configured to receive the inner conductor 714; and (b) a closed end or floor 854. The side wall 850 has a plurality of spaced-apart, longitudinal slots 856. Each slot 856 is defined by a plurality of weldable edges 858. Each slot 856 extends along an axis 860 which is parallel with the longitudinal axis 862 extending through the inner conductor engager 848.

The compressor 732, in this embodiment, is modified to become a support or holder for the inner conductor engager 848. The exterior of the holder is the same as that of compressor 732. The interior of the mouth section 808, however, is modified to have a slightly larger diameter than the diameter of the side wall 850. This enables the modified mouth section to receive the side wall 850 without compressing the side wall 850.

After the outer conductor engager 726 is welded to the outer conductor 718, as described above, the assembler inserts the inner conductor 714 into the inner conductor engager 848. Next, using the welding device 784, the assembler directs the welding energy at the weldable edges 858 and the underlying and adjacent portions of the inner conductor 714. After cooling, the inner conductor engager 848 is welded to, or with, the side wall 859 of the inner conductor 714. In the illustrated embodiment, the inner conductor engager 848 has three slots 856 which are equally spaced apart around the circumference of the side wall 850. It should be appreciated, however, that the inner conductor engager 848 can have any suitable number of slots 856.

In one embodiment, the arrangement of the slots 856 (including the quantity, size, shape and location of the slots 856) is associated with a designated, weldable surface area of the inner conductor 714. The designated weldable surface area corresponds to a suitable welding strength. The strength is achieved by full or partial melting of the outer copper layer 725 without involving a liquid intermixing between the copper layer 725 and aluminum core 722. In one embodiment, the strength is achieved based on the melting of the weldable edges 858 and the melting of the copper layer 725 without the inclusion of any liquefied aluminum from the aluminum core 722.

In one embodiment, the outer layer 725 includes a suitable composition of copper and one or more other types of metals or non-metals. There is a suitable percentage of copper within the layer 725 for a suitable level of conductivity. In such embodiment, there is a ratio between (a) and (b), where (a) is the total welded or weld-treated surface area on the side wall 859 of the inner conductor, and (b) is the percentage of copper that remains within the outer layer 725 after the welding process is complete. This ratio falls within a range which is associated with the following factors: (a) a suitable tensile strength within the weld connection between the inner conductor 714 and the inner conductor engager 848; and (b) a suitable level and uniformity of conductivity for the electrical performance of the coaxial connector assembly.

Figure 55:
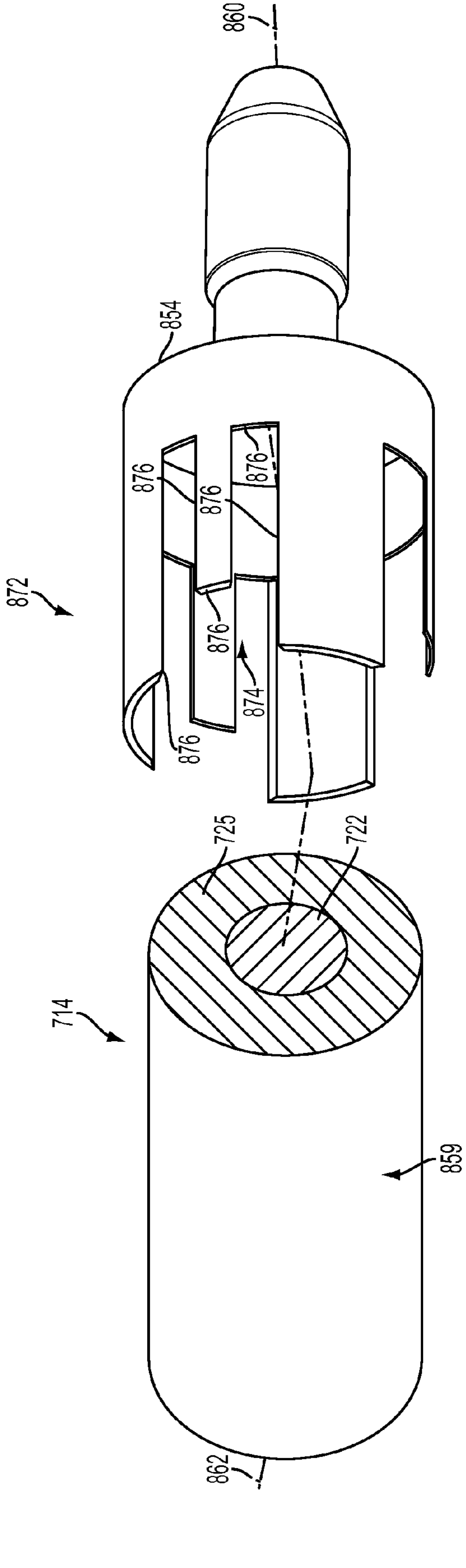
FIG. 55 is a side isometric view of yet another embodiment of the inner conductor and inner conductor engager of the coaxial cable device.

Referring to FIG. 55, in one such embodiment, the inner conductor engager 872 is the same as inner conductor engager 848 except that the slots 856 are replaced with the slots 874. Each slot 874 is defined by a plurality of weldable edges 876.

Figure 56:
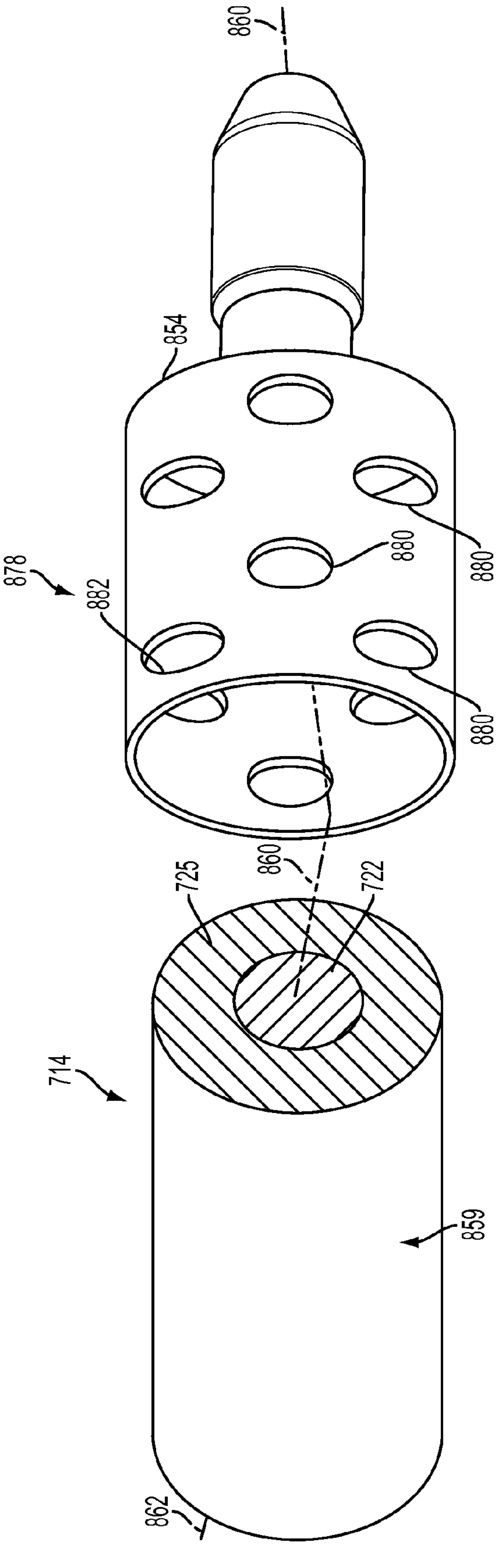
FIG. 56 is a side isometric view of still another embodiment of the inner conductor and inner conductor engager of the coaxial cable device.

Referring to FIG. 56, in one such embodiment, the inner conductor engager 878 is the same as inner conductor engager 848 except that the slots 856 are replaced with the array or grid pattern of openings or holes 880. Each hole 880 is defined by a continuous, weldable edge 882.

Figure 57:
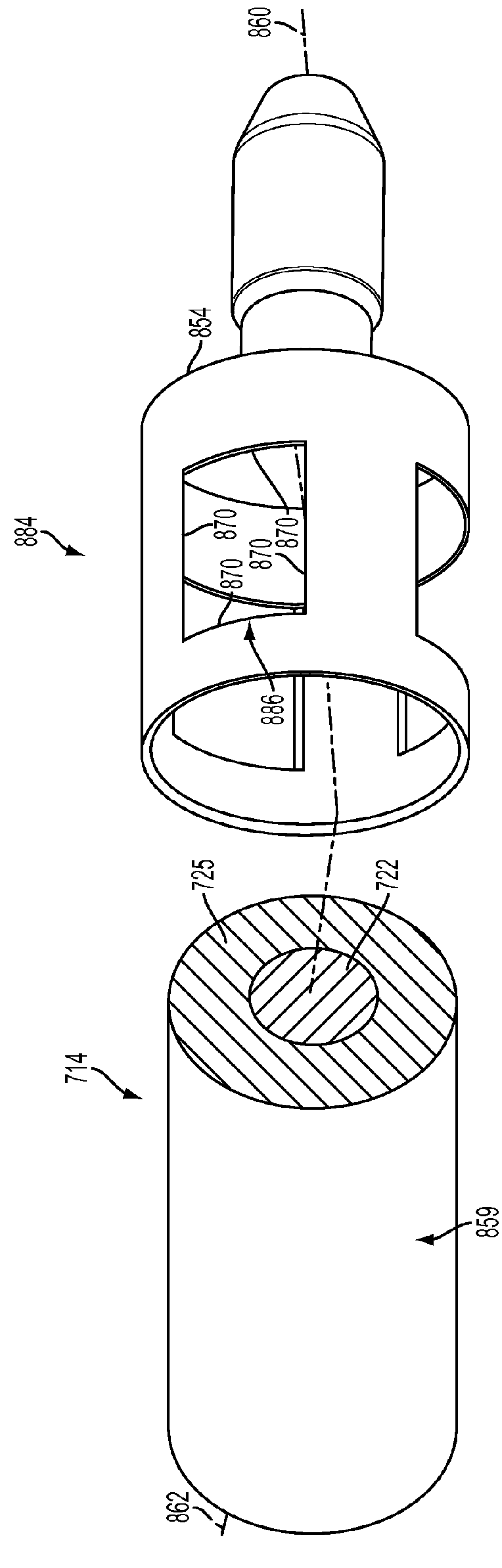
FIG. 57 is a side isometric view of a further embodiment of the inner conductor and inner conductor engager of the coaxial cable device.

Referring to FIG. 57, in one such embodiment, the inner conductor engager 884 is the same as inner conductor engager 848 except that the slots 856 are replaced with a plurality of windows 886. Each window 868 is defined and bound by a plurality of weldable edges 870 which form an opening through the window 868. Each window 868 extends along an axis 860 which is parallel with the longitudinal axis 862 extending through the inner conductor engager 848.

Figure 58:
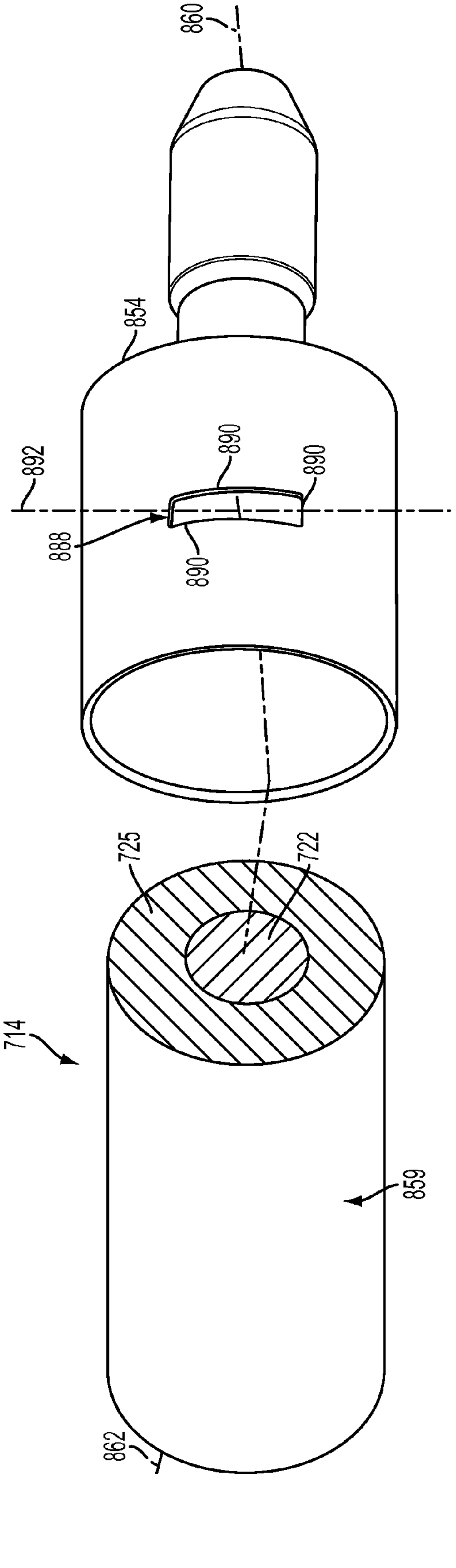
FIG. 58 is a side isometric view of an additional embodiment of the inner conductor and inner conductor engager of the coaxial cable device.

Referring to FIG. 58, in one such embodiment, the inner conductor engager 884 is the same as inner conductor 848 except that the slots 856 are replaced with a single vertical window 888. The single vertical window 888 is defined and bound by a plurality of weldable edges 890 which form an opening through the window 888. The vertical window 888 extends along a vertical axis 892 which is non-parallel with the longitudinal axis 862.

In one embodiment, the coaxial cable connector is detached from the coaxial cable 712, though the coaxial cable connector is configured to be welded to the cable 712 as described above. In such embodiment, an assembler can weld the coaxial cable connector to a cable 712 inside a manufacturing facility or in the field. For in-field installations, the welding device 784, in one embodiment, includes a battery-powered, mobile welder. The mobile welder includes a connector engagement device configured to hold the coaxial cable connector and align the connector with the beam or stream of welding energy.

Part III

Figure 59:
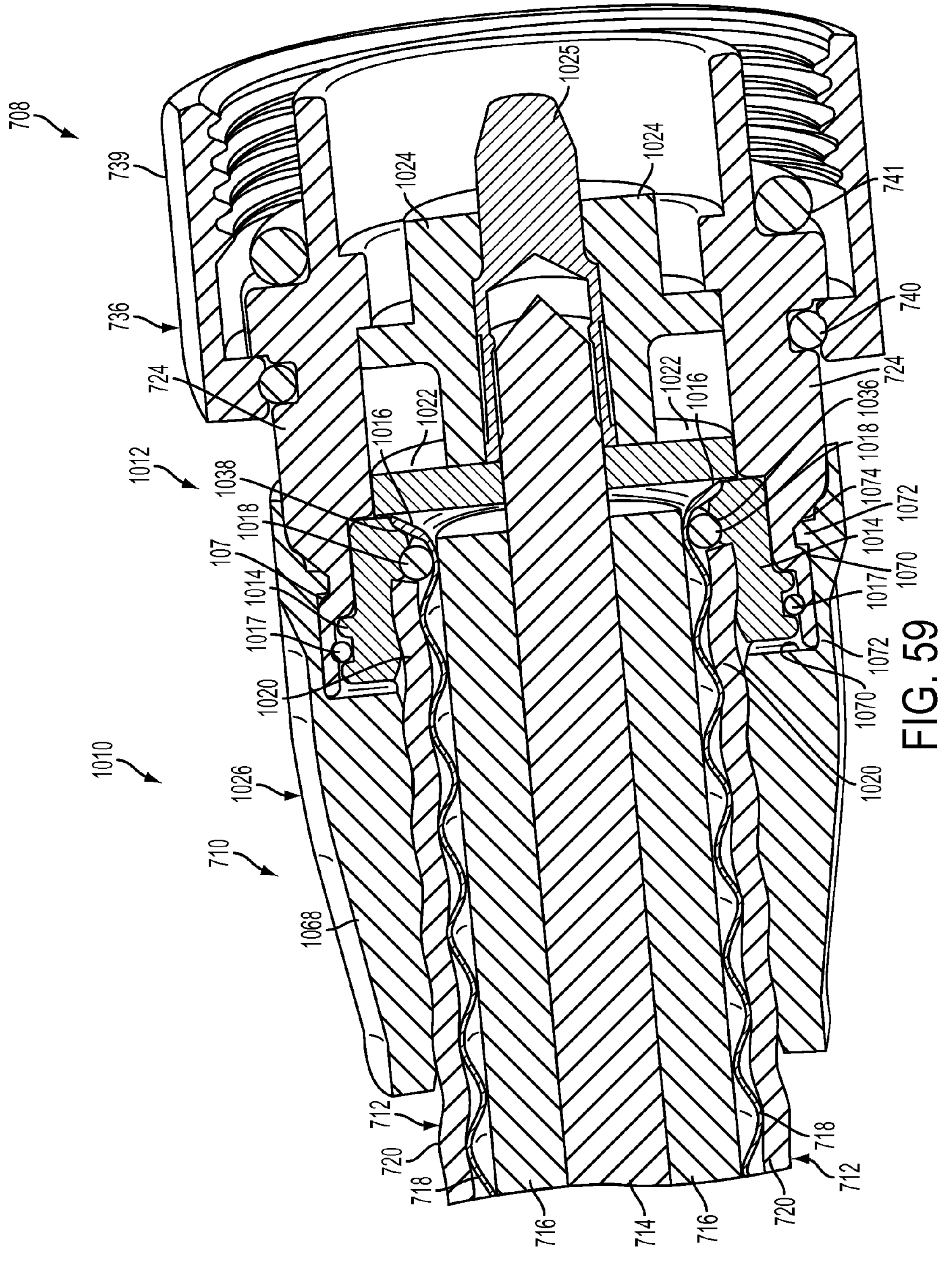
FIG. 59 is a side isometric, cross-sectional view of one embodiment of the coaxial cable device.
Figure 60:
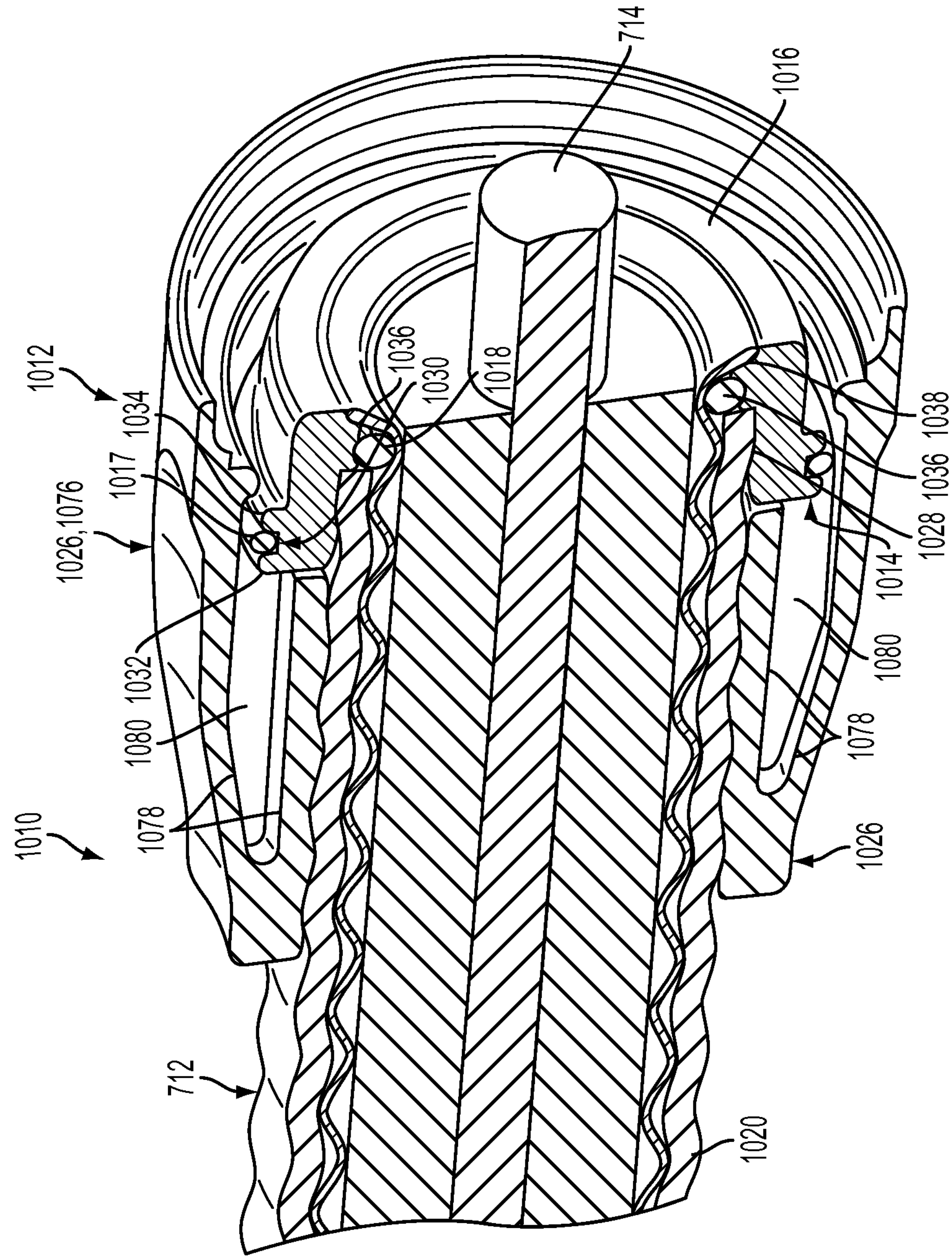
FIG. 60 is a side isometric, cross-sectional view of another embodiment of the coaxial cable device.

Referring to FIGS. 59-60, in one embodiment the coaxial cable device 1010 includes all of the components and functionality of coaxial cable device 706 except that cable connector 704 is replaced with cable connector 1012. Cable connector 1012 includes all of the structure and components of connector 704 as illustrated in FIG. 59 and described above. In addition, cable connector 1012 includes: (a) an outer conductor engager 1014 which receives, engages and holds the outer conductor portion 1016, strain relief device seal 1017, jacket seal 1018 and jacket portion 1020; (c) a spacer 1022 which supports the outer conductor portion 1016 and functions as a dielectric, safeguarding against a short circuit between the inner conductor 714 and outer conductor 718; (d) an inner conductor engager holder 1024 which holds the inner conductor engager 1025, aligns the inner conductor engager 1025 with the inner conductor 714 and also functions as a dielectric, safeguarding against a short circuit between the inner conductor 714 and outer conductor 718; and (e) a cable stabilizer, cable guide or strain relief device 1026 engaged with the jacket 720, outer conductor engager 1014 and connector body 724.

In one embodiment illustrated in FIG. 60, the outer conductor engager 1014 includes: (a) a jacket engagement portion 1028 which engages and compresses the jacket portion 1020; (b) a strain relief device seal holder 1030 having walls 1032 and 1034 which retain and hold the strain relief device seal 1017; (c) a jacket seal holder 1036 configured to retain and hold the jacket seal 1018; and (d) a weld interface portion 1038 which is welded to the outer conductor portion 1016. By securing and engaging the jacket portion 1020 while being welded to the outer conductor portion 1016, the outer conductor engager 1014 is operable to strengthen the connection of the connector 1012 to the cable 712.

In this way, the outer conductor engager 1014 serves multiple functions at the same time. One function is to mechanically secure and couple the connector body 724 to the cable 712 by compressing and engaging the jacket 720. Another function is to hold the seals 1017 and 1018 for inhibiting the entrance of liquid or fluid into the connector 1012. Yet another function is to electrically ground the outer conductor 718 by being welded to the outer conductor 718. Still another function is to further the mechanical connection of the connector 1012 to the cable 712 through the weld joint.

Figure 61:
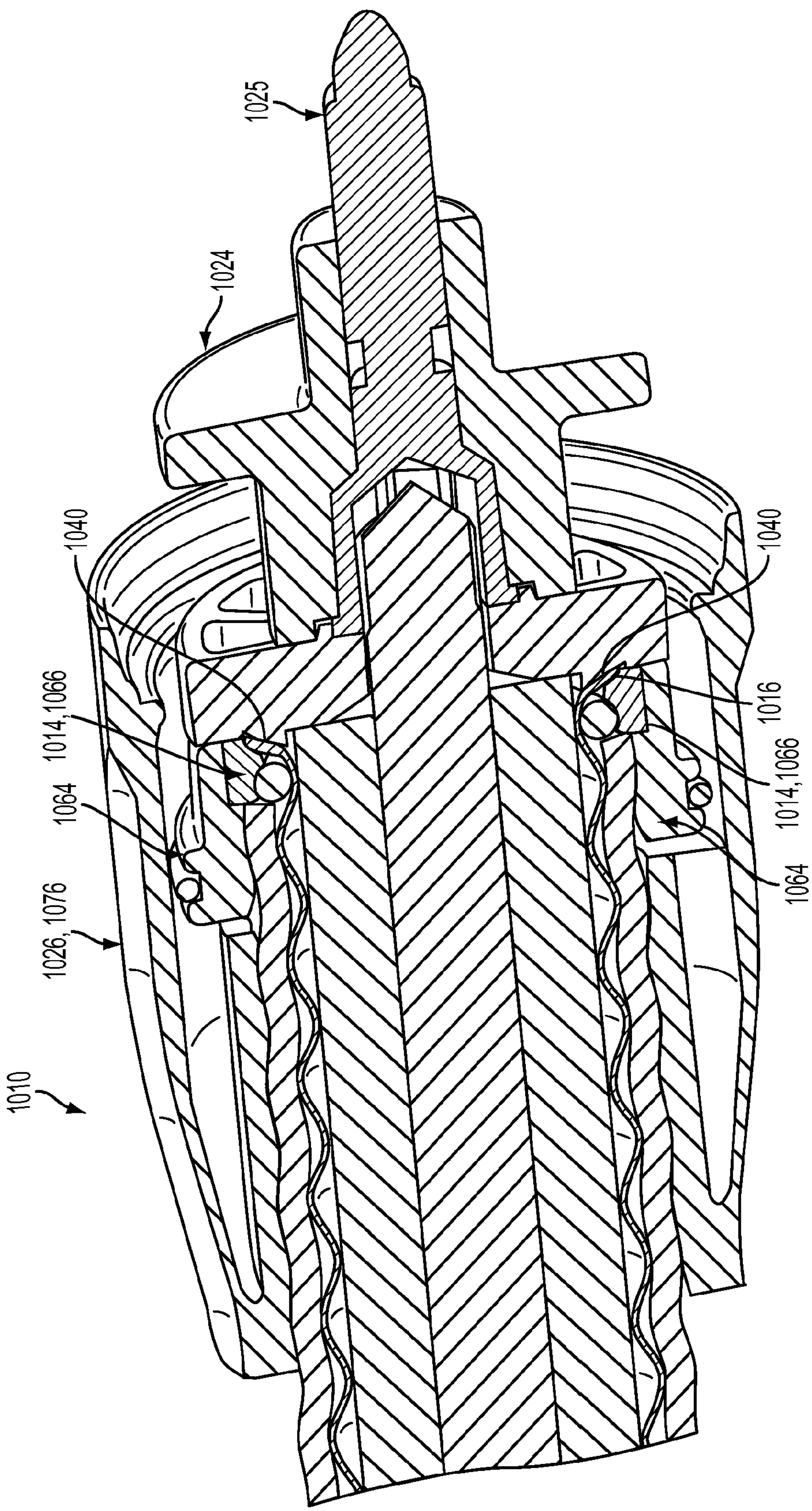
FIG. 61 is a side isometric, cross-sectional view of one embodiment of the coaxial cable device.
Figure 62:
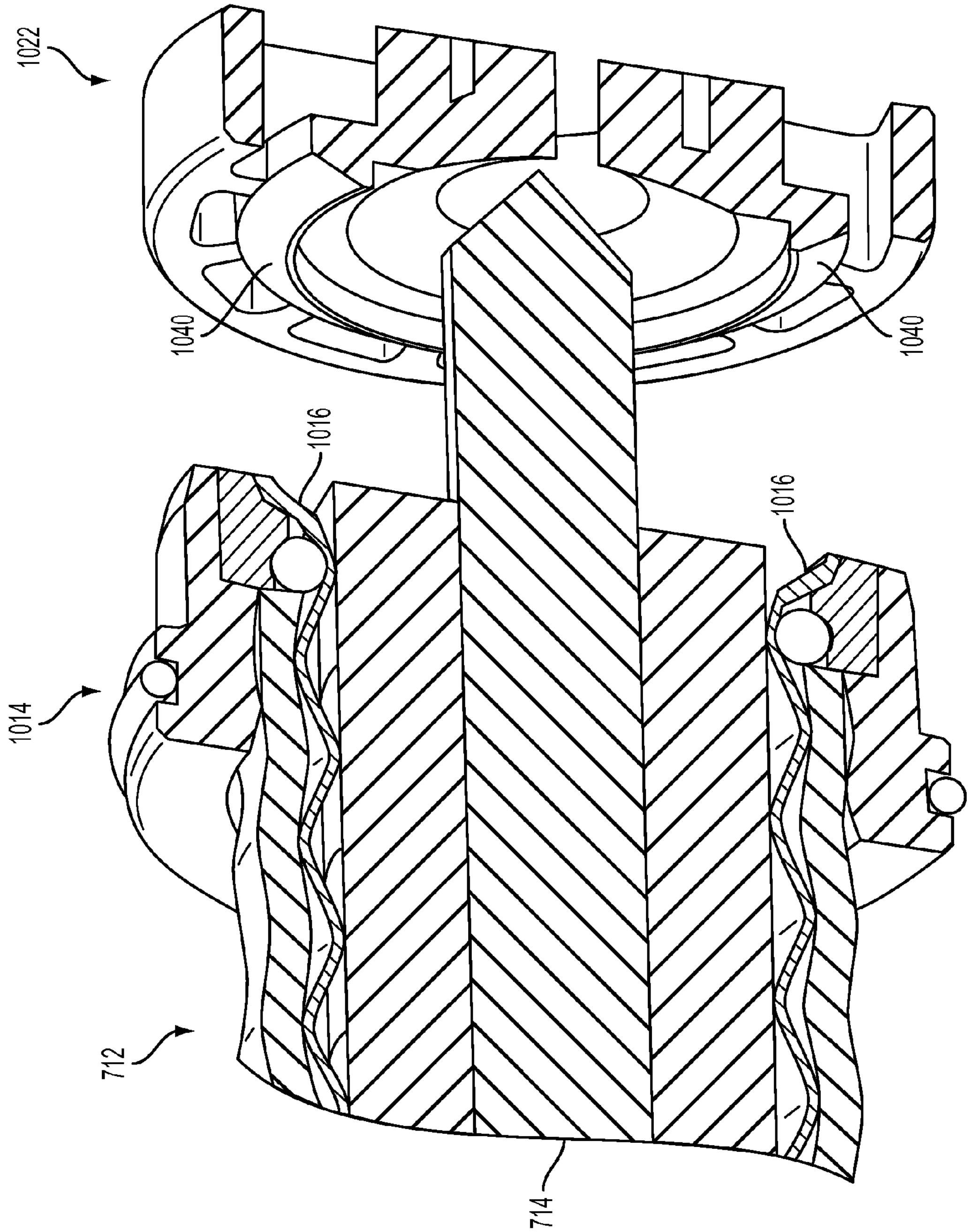
FIG. 62 is an exploded, isometric, cross-sectional view of one embodiment of the coaxial cable device.

In one embodiment illustrated in FIGS. 61-62, the spacer 1022 has the configuration of driver 733 except that spacer 1022 has an outer conductor support 1040. The outer conductor support 104 includes a raised, circular wall which engages, abuts and supports the outer conductor portion 1016. When the weld interface portion 1038 is welded to the outer conductor portion 1016, the outer conductor support 1040 provides additional support to the weld joint.

Figure 63:
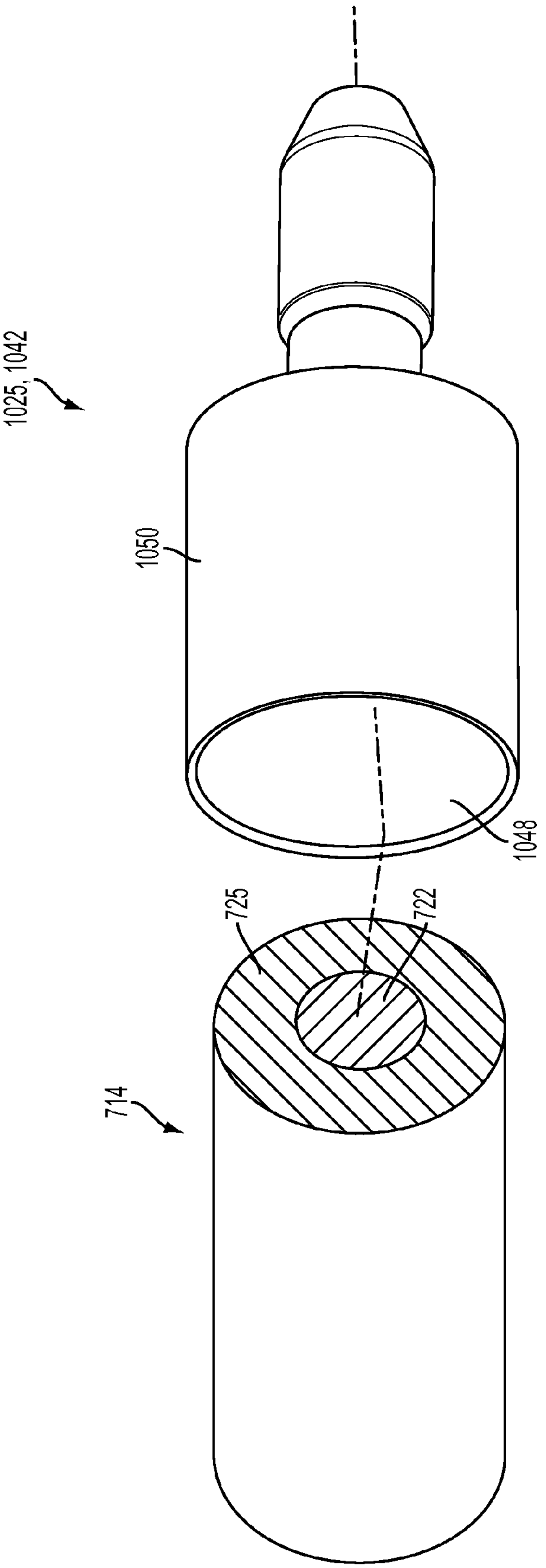
FIG. 63 is an isometric view of one embodiment of the inner conductor and inner conductor engager illustrated in an initial form.
Figure 64:
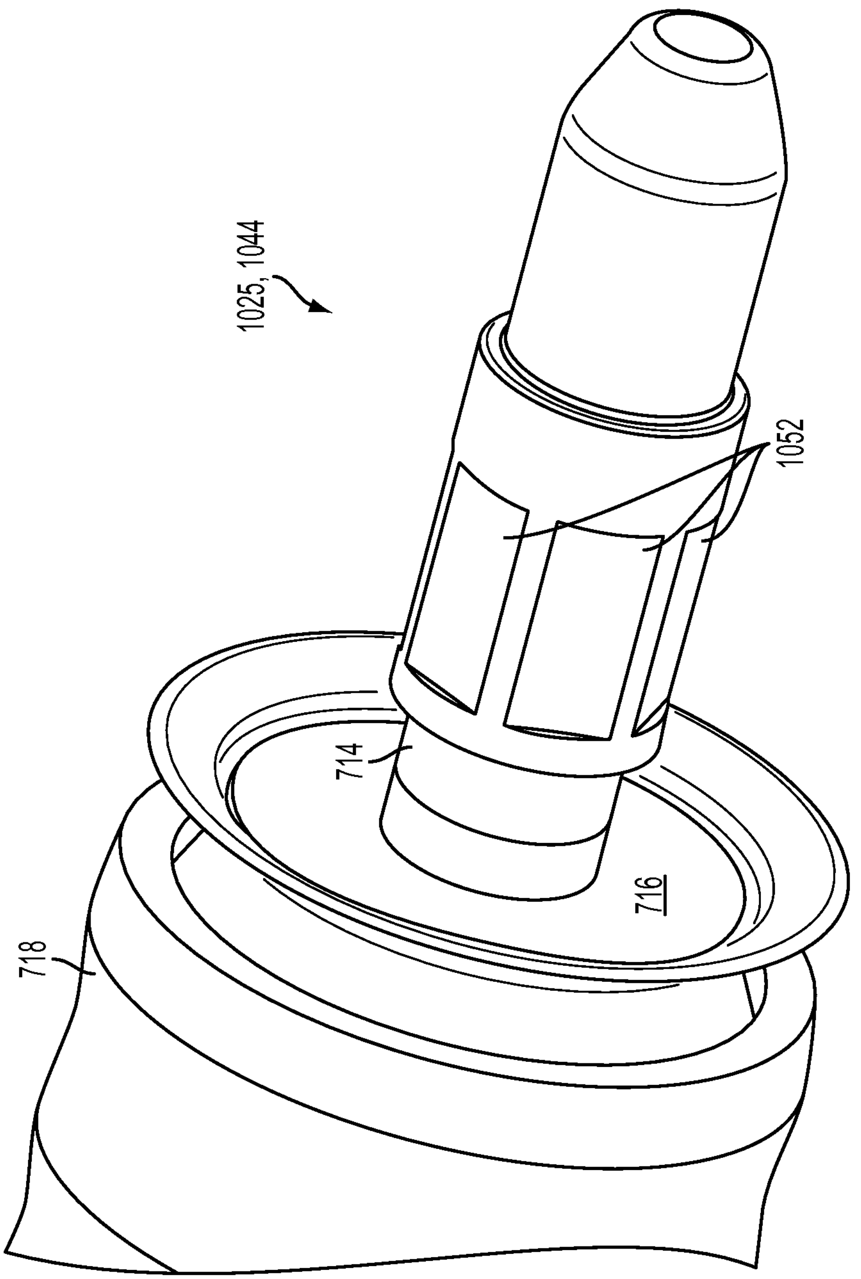
FIG. 64 is an isometric view of one embodiment of the inner conductor and inner conductor engager illustrated in a second or final form.
Figure 65:
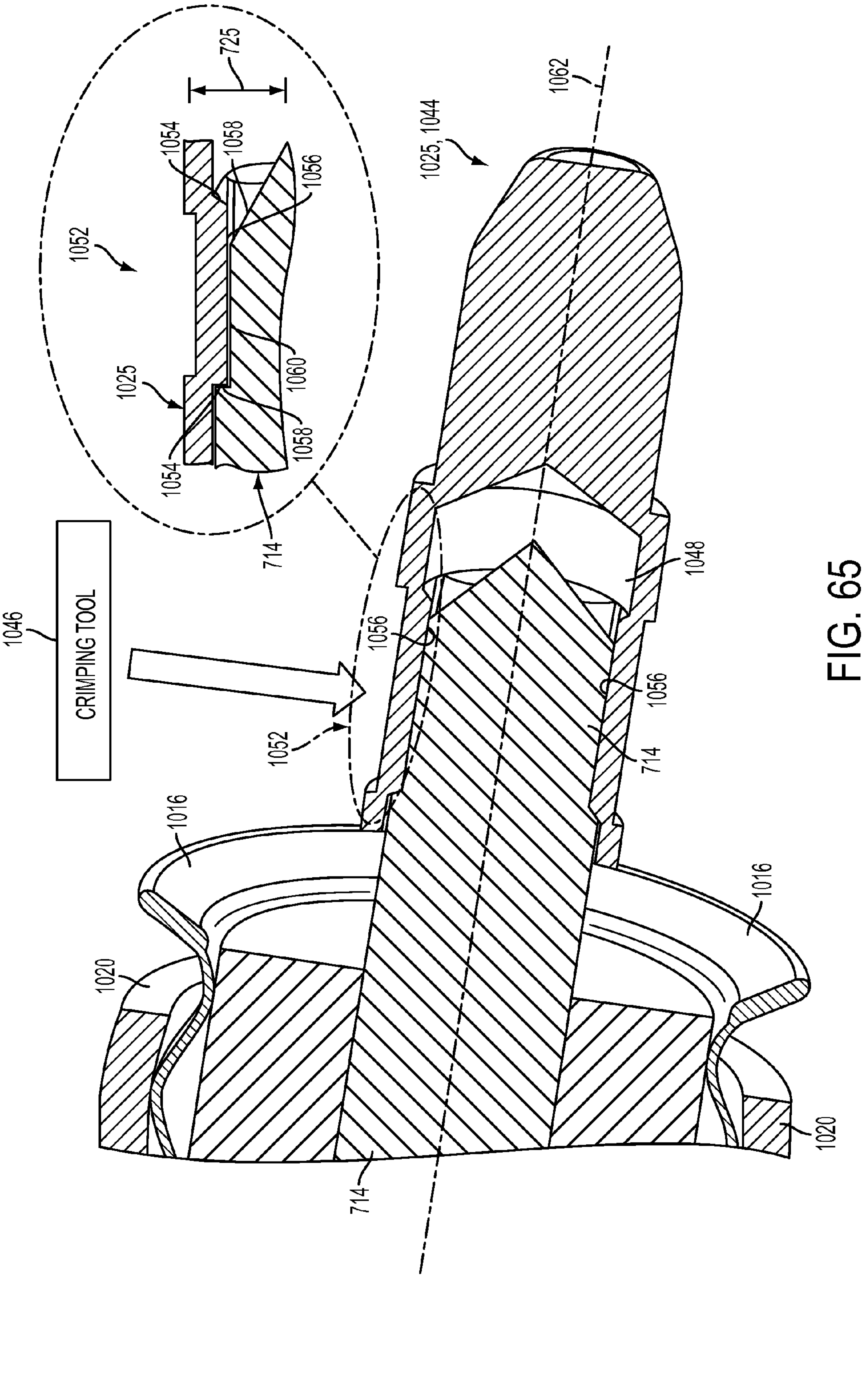
FIG. 65 is a side isometric, cross-sectional view of one embodiment of the coaxial cable device, illustrating one embodiment of the crimping process and effect.
Figure 66:
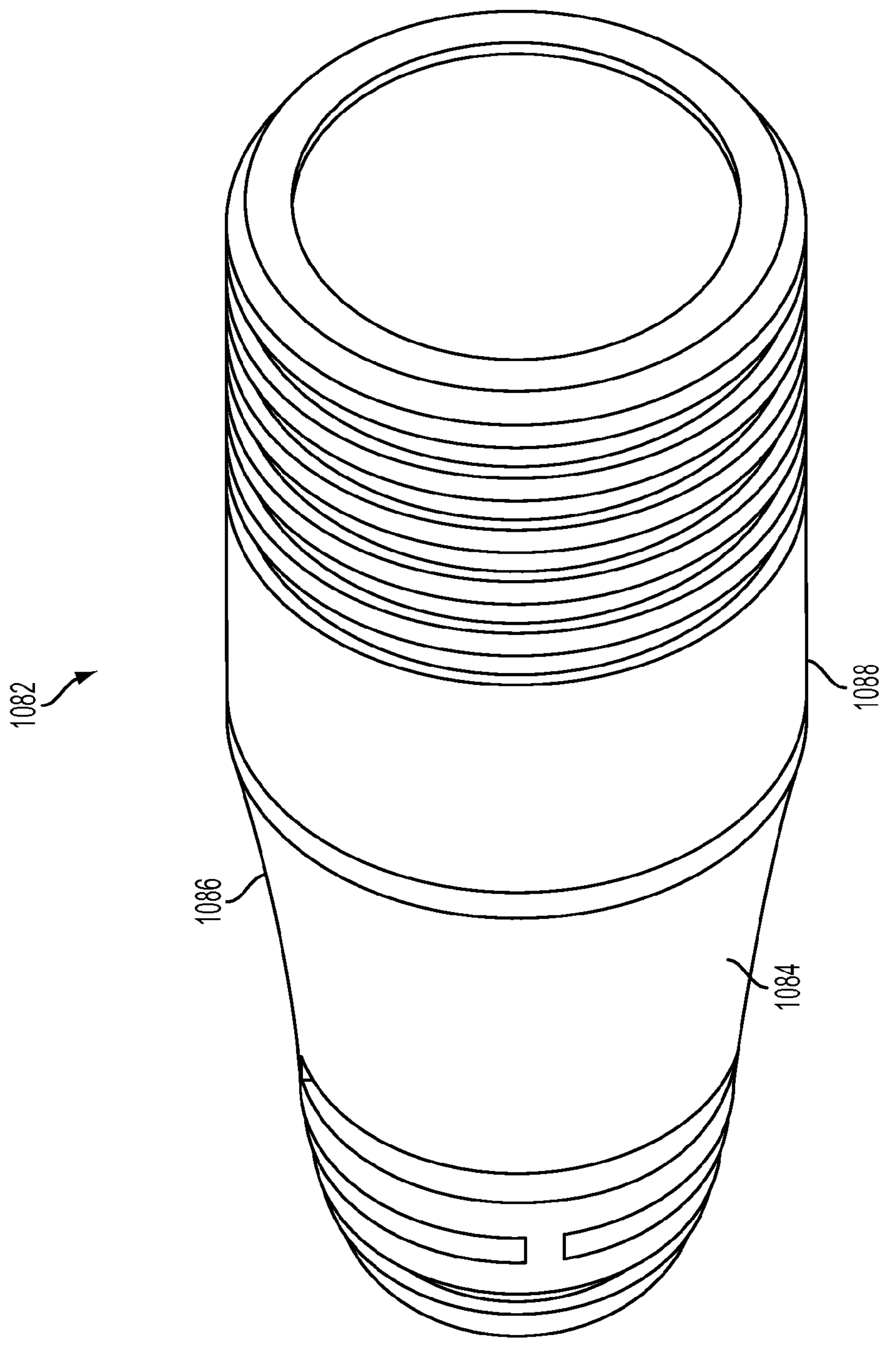
FIG. 66 is a side isometric view of one embodiment of the strain relief device.
Figure 67:
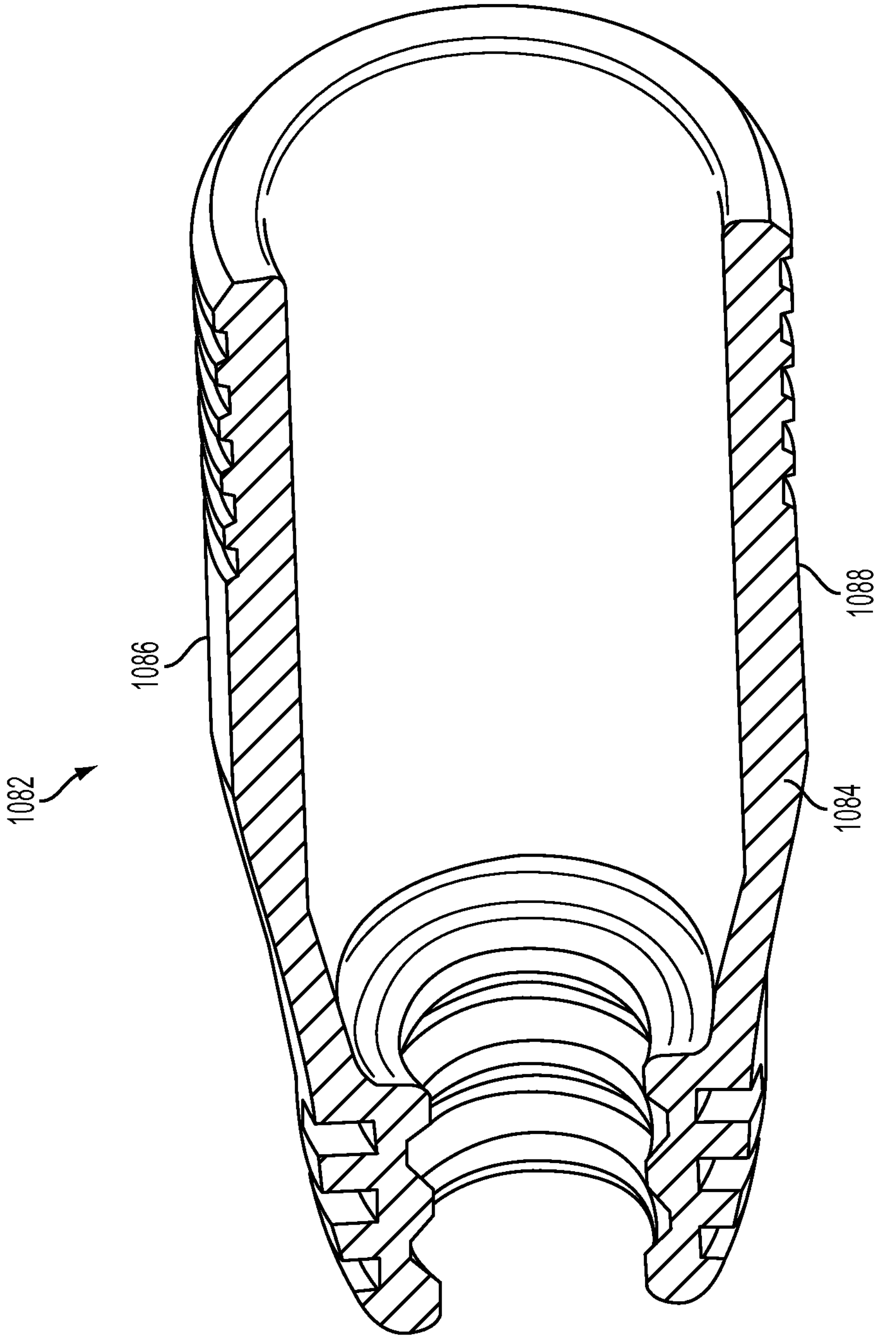
FIG. 67 is an isometric, cross-sectional view of the strain relief device of FIG. 66.
Figure 68:
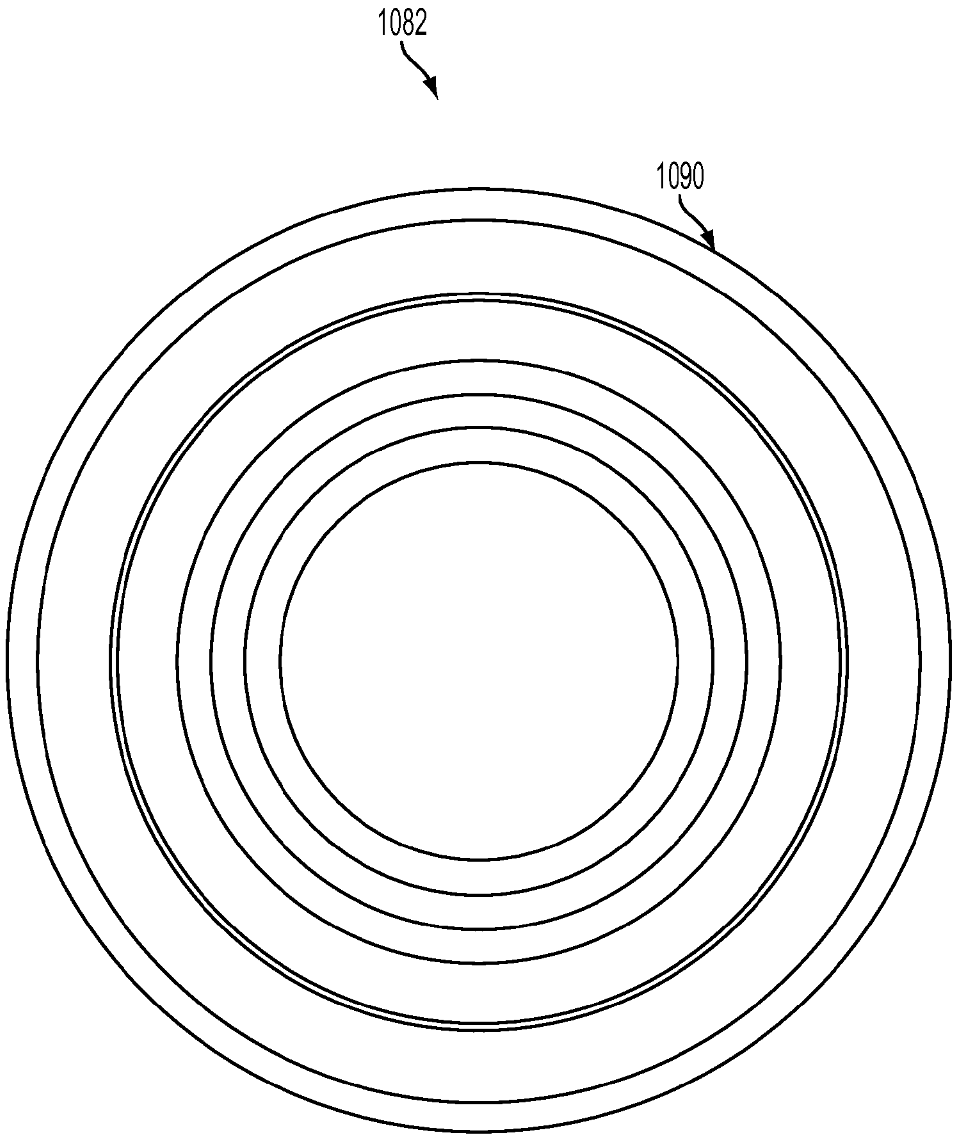
FIG. 68 is a front view of the strain relief device of FIG. 66.
Figure 69:
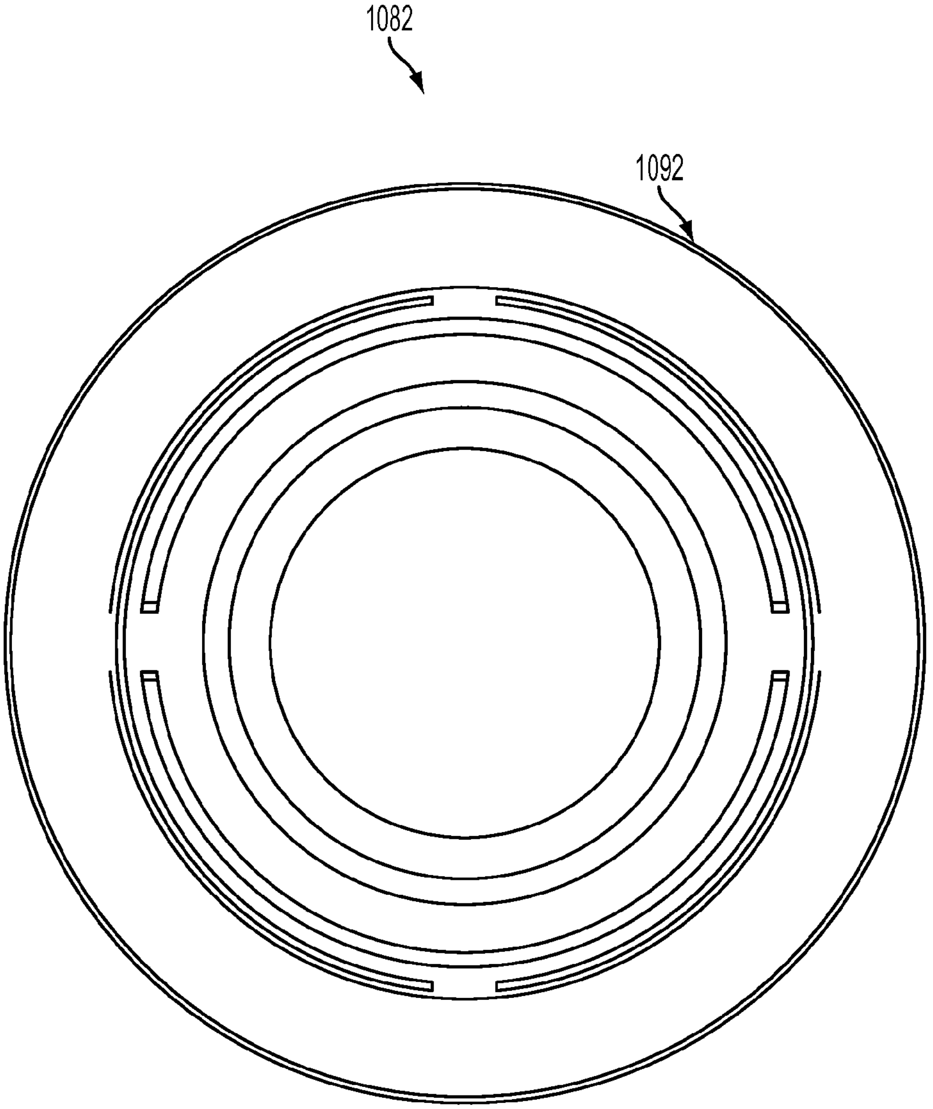
FIG. 69 is a back view of the strain relief device of FIG. 66.
Figure 70:
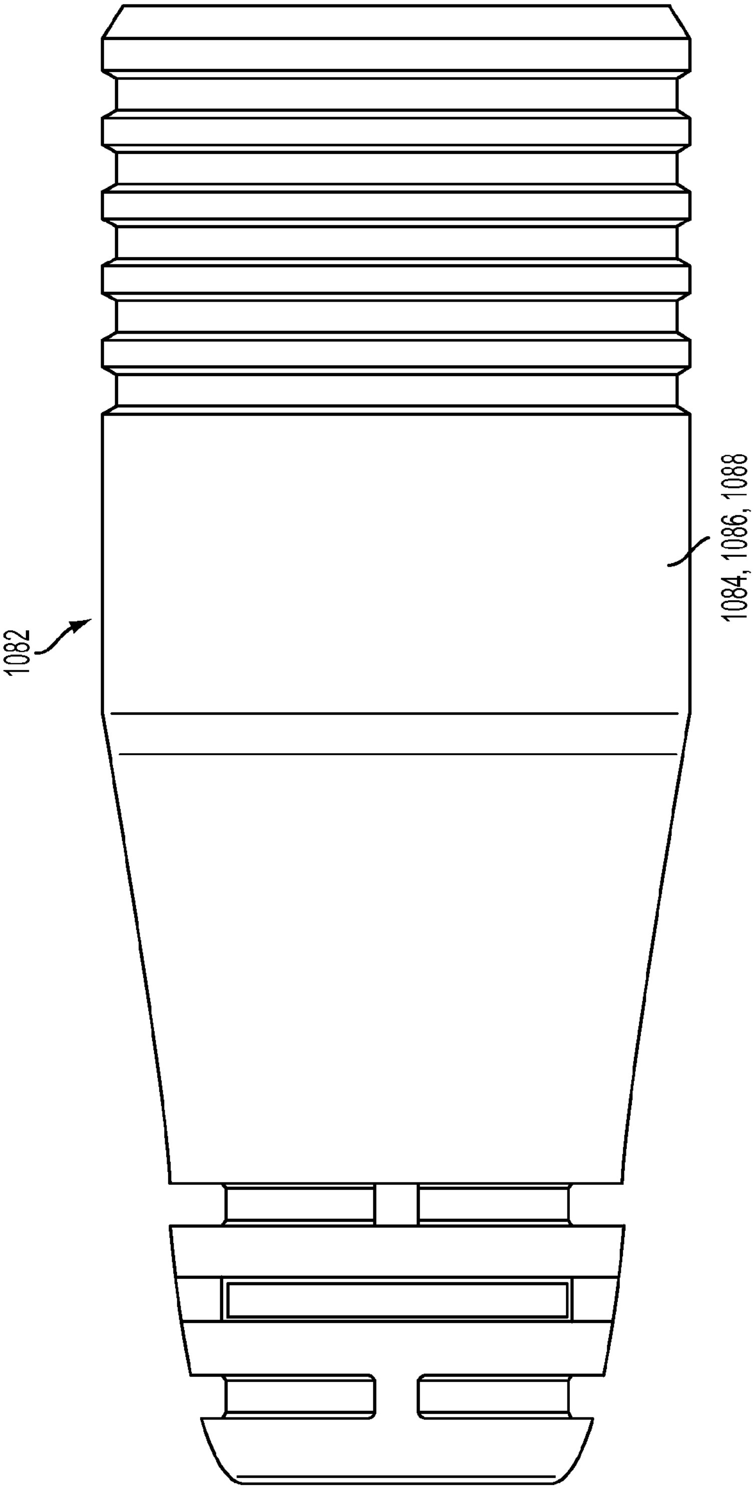
FIG. 70 is a side view of the strain relief device of FIG. 66.
Figure 71:
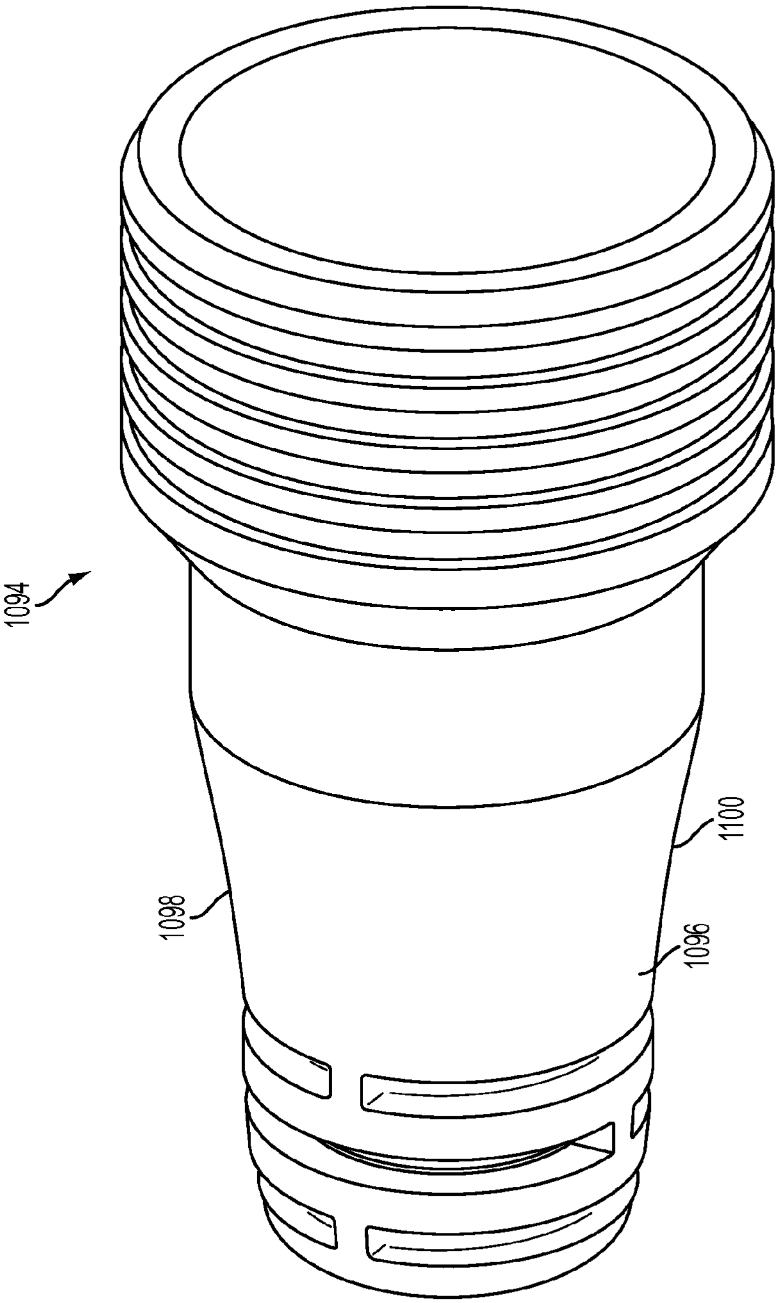
FIG. 71 is a side isometric view of another embodiment of the strain relief device.
Figure 72:
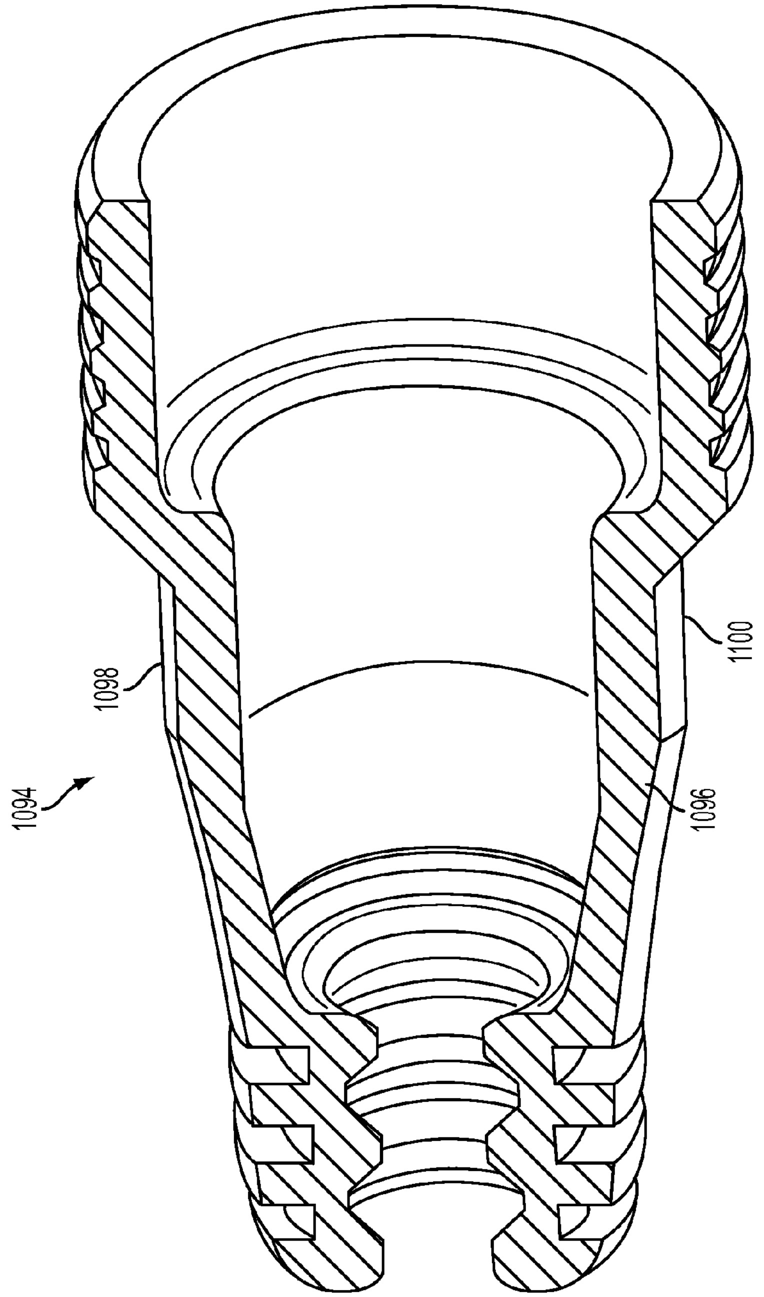
FIG. 72 is an isometric, cross-sectional view of the strain relief device of FIG. 71.
Figure 73:
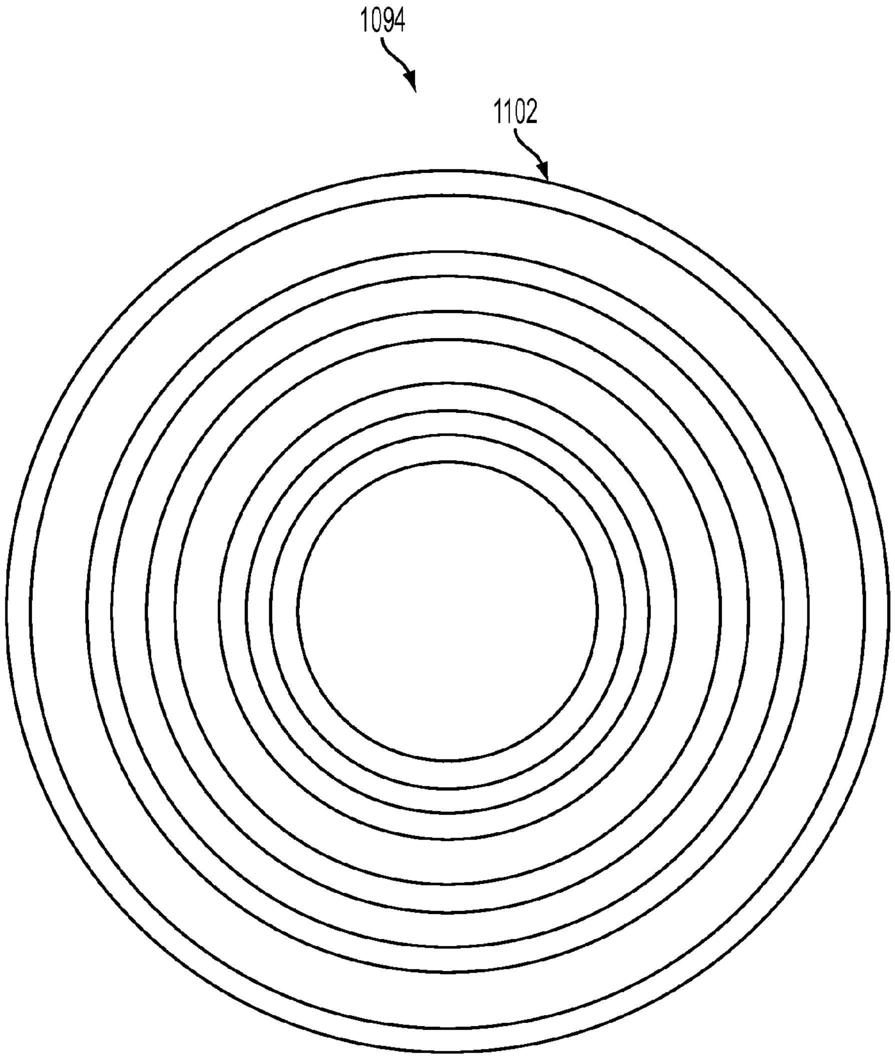
FIG. 73 is a front view of the strain relief device of FIG. 71.
Figure 74:
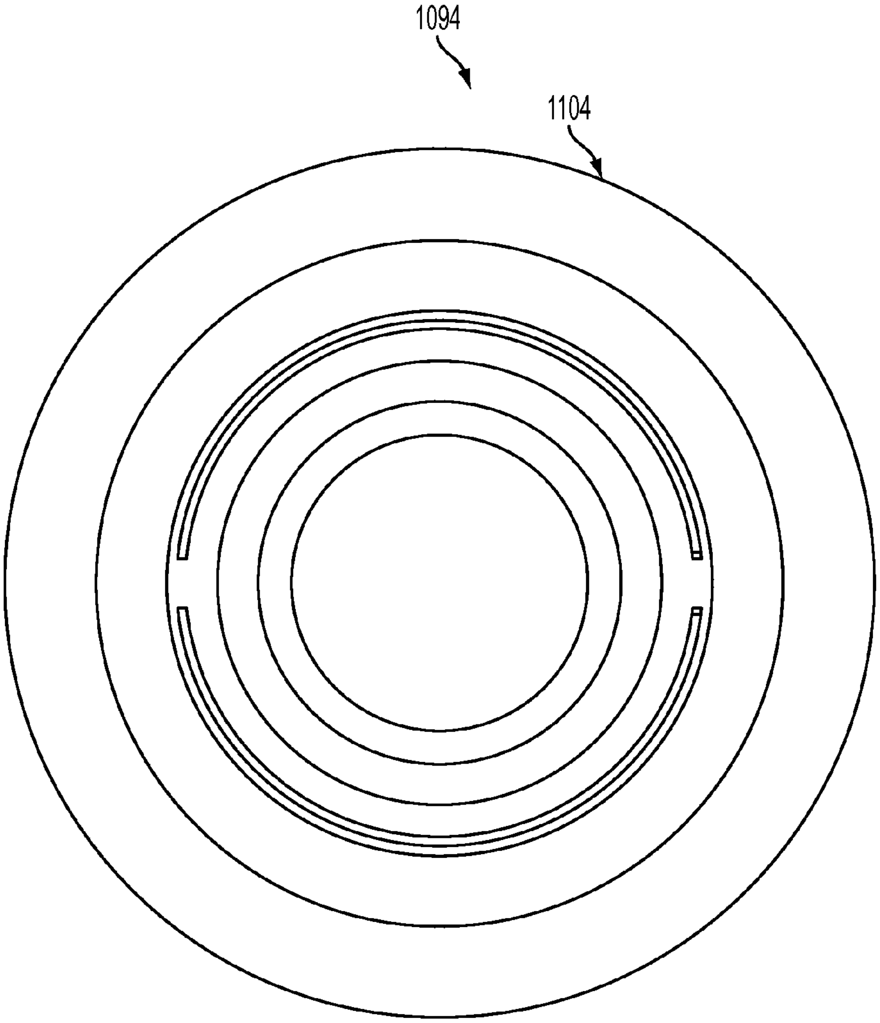
FIG. 74 is a back view of the strain relief device of FIG. 71.
Figure 75:
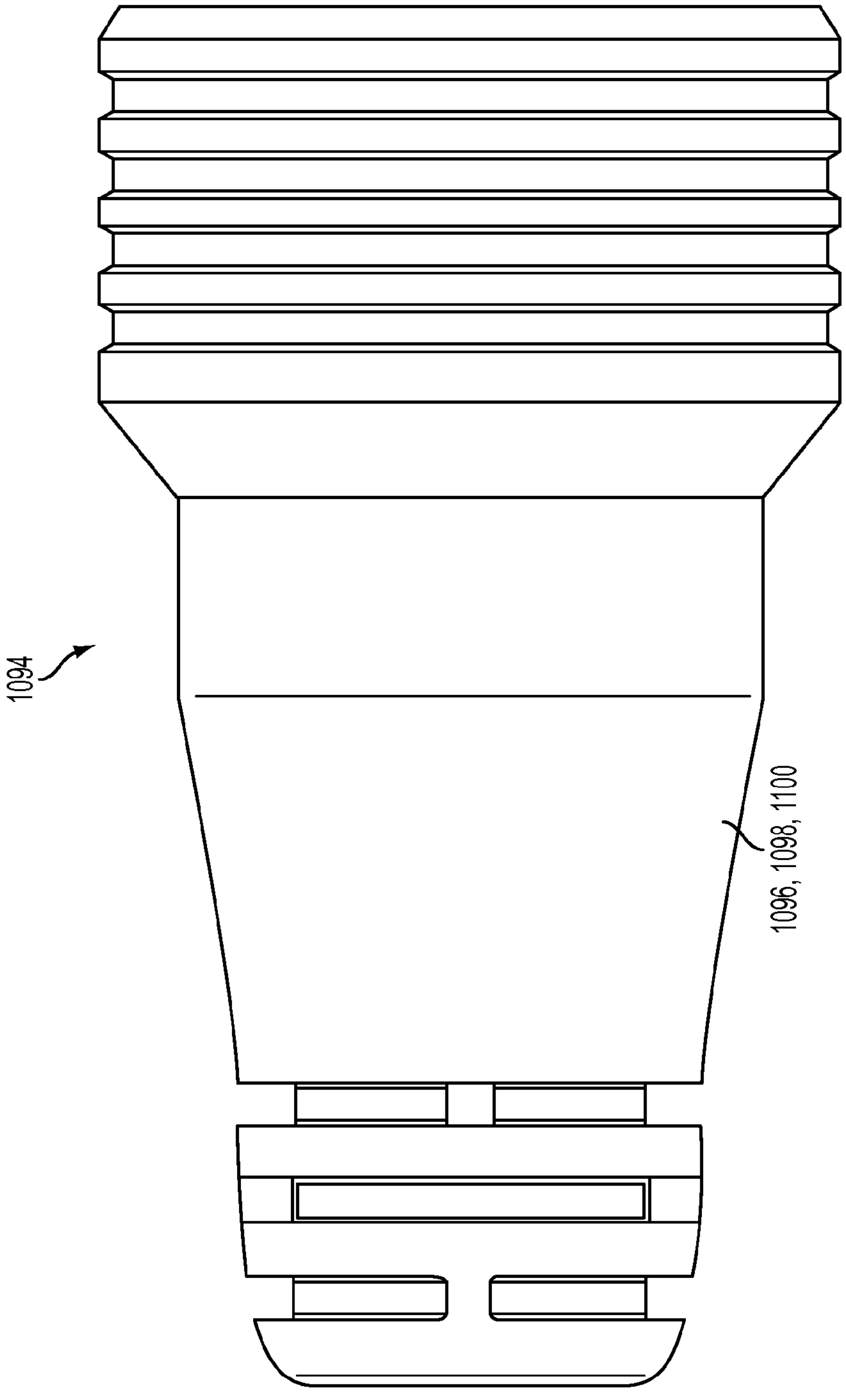
FIG. 75 is a side view of the strain relief device of FIG. 71.

Referring to FIGS. 63-65, in one embodiment, an assembler transforms inner conductor engager 1025 from the initial form 1042 illustrated in FIG. 63 to the final or deformed form 1044 illustrated in FIGS. 64-65. The assembler inserts the inner conductor 714 into the cavity 1048 defined by the inner conductor engager 1025. Next, the assembler uses a die or tool, such as crimping tool 1046, to force a deformer against the outer, cylindrical surface 1050. In the illustrated example, the deformer has a flat, rectangular shape forming the rectangular, recessed spaces, crimp zones or depressions 1052. After the depressions 1052 are formed, the inner conductor engager 1025 is mated with, crimpled with, interlocked with or otherwise frictionally engaged with the inner conductor 714.

In one embodiment illustrated in FIG. 65, the depression 1052 causes the inner conductor engager 1025 to have a plurality of depression walls 1054 and 1056. Also, the depression 1052 causes the inner conductor 714 to have a plurality of depression walls 1058 and 1060. In one embodiment, there is a frictional force and mating between the walls 1054 and 1058. Also, there is a mating between walls 1056 and 1060. The mating of the walls 1054 with 1058 and walls 1056 with 1060, secures the engagement of the inner conductor engager 1025 with the deformed inner conductor 714. During use of the coaxial cable device 1010, the engager 1025 and conductor 714 can be pulled apart or subject to tensile loads, where the pulling force acts along axis 1062. In such event, the wall 1054 would interfere with wall 1058 establishing an interlock to keep the engager 1025 and conductor 714 together. Depending upon the embodiment, the walls 1054, 1058, 1056 and 1060 can be knurled or otherwise configured to have surface ridges, grooves or bumps to increase the frictional fit between the engager 1025 and conductor 714. Also, differently shaped crimping tools can be used to form differently shaped depressions within the engager 1025 and conductor 714. For example, the inner conductor 714 can have a depression with a particular angled slot, and a tool can push the engager 1025 into such depression, causing its metal to flow into the angled slot, forming an interlock.

Referring to FIGS. 63 and 65, in one embodiment, the depression 1052 remains within the outer copper layer 725 without reaching the aluminum core 722. As a result, the conduction occurs substantially between the copper of the conductor 714 and the copper of the engager 1042.

Referring to FIG. 61, in one embodiment, the outer conductor engager 1014 is separated into: (a) a jacket-relief engager 1064 which receives, engages and holds the strain relief device seal 1017, jacket seal 1018 and jacket portion 1020; and (b) an outer conductor engager 1066 which receives, engages, holds, and is welded to the outer conductor portion 1016. The jacket-relief engager 1064 mates with the outer conductor engager 1066, and when compressed together, they function as a single unit. In this embodiment, the outer conductor engager 1066 is formed of a copper material for conducive purposes, and the jacket-relief engager 1064 is formed of a different, lower cost material, such as a suitable metal or rigid plastic. One embodiment includes a set of different outer conductor engagers 1066, where each such engager is configured to engage a different type of outer conductor. For example, outer conductor engager A can be formed of aluminum for being welded to an aluminum outer conductor. In another example, outer conductor engager B can have a particular shape for being welded to a smooth-walled outer conductor. The interchangeability of such outer conductor engagers can facilitate the use of the connector 1012 with different types of cables 712.

Referring to FIG. 59, in one embodiment, the strain relief device 1026 has: (a) a body 1068 which engages and presses against the jacket 720; (b) strain relief device walls 1070 which define a space configured to receive part of the connector body 724; and (c) a coupling wall 1072 which snap fits into a recess 1074 defined by the connector body 724. In one embodiment, strain relief device 1026 is formed of a rigid or semi-rigid material. In another embodiment, strain relief device 1026 is formed of an elastic or resilient material. In operation, the strain relief device 1026 relieves stress on the cable 720 when the cable 720 is bent relative to the axis 1062 illustrated in FIG. 65.

In another embodiment illustrated in FIGS. 60-61, the strain relief device 1076 has the same elements and components as strain relief device 1026 except that the strain relief device 1076 also has spaced-apart, inner walls 1078 which define space 1080. In one embodiment, the inner walls 1078 are partially elastic and flexible. As such, the inner walls 1078 are operable to produce a spring force onto the jacket 712 and connector body 724.

Referring to FIGS. 66-70, in one embodiment, the strain relief device 1082 has the same components and function as strain relief device 1026 except for the geometrical differences illustrated in FIGS. 66-70. It should be appreciated that the strain relief device 1082 is symmetrical in a radial direction. Put another way, the sides 1084, top 1086 and bottom 1088 of strain relief device 1082 are identical in geometry while the front end 1090 is different from the back end 1092.

Referring to FIGS. 71-75, in one embodiment, the strain relief device 1094 has the same components and function as strain relief device 1026 except for the geometrical differences illustrated in FIGS. 71-75. It should be appreciated that the strain relief device 1094 is symmetrical in a radial direction. Put another way, the sides 1096, top 1098 and bottom 1100 of strain relief device 1094 are identical in geometry while the front end 1102 is different from the back end 1104.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The following is claimed:

1. A coaxial cable device comprising:

a connector body;

a coupler rotatably coupled to the connector body;

a coaxial cable supported by the connector body, the coaxial cable being received by the connector body, the coaxial cable comprising an inner conductor, an outer conductor and a jacket surrounding the outer conductor, the inner conductor comprising a surface which is deformable to define a recessed space, the outer conductor defining an edge deformed radially out an inner conductor engager holder supported by the connector body;

an inner conductor engager supported by the inner conductor engager holder, the inner conductor engager being crimped to the inner conductor, part of the inner conductor engager being deformed to fit within the recessed space;

an outer conductor engager circumscribing the outer conductor and including a ramped section abutting a deformed hem section of the outer conductor to define an outer conductor weld interface, the outer conductor weld interface being penetration welded along a perimeter disposed along a plane normal to the elongate axis of the coaxial cable, the outer conductor engager further comprising a first jacket engagement portion engaged with the jacket; and a strain relief device supported by the connector body, the strain relief device receiving the coaxial cable, the strain relief device comprising:

(a) a second jacket engagement portion engaged with the jacket; and (b) a body engagement portion engaged with the connector body.

2. The coaxial cable device of claim 1, wherein the outer conductor engager is configured to receive a portion of the outer conductor, the outer conductor engager being welded to the received portion of the outer conductor.

3. The coaxial cable device of claim 1, wherein the inner conductor engager holder comprises a dielectric characteristic.

4. The coaxial cable device of claim 1, wherein a portion of the outer conductor comprises an inner surface and an outer surface opposite of the inner surface, the coaxial cable device comprising an outer conductor support configured to engage the inner surface while the outer conductor engager is engaged with the outer surface.

5. The coaxial cable device of claim 4, wherein the outer conductor support comprises a dielectric characteristic.

6. The coaxial cable device of claim 1, wherein the inner conductor comprises an inner layer constructed of a material, and an outer layer constructed of a different, conductive material.

7. The coaxial cable device of claim 6, wherein the recessed space is entirely located outside of the inner layer.

8. The coaxial cable device of claim 1, wherein the inner conductor comprises a first wall which partially defines the recessed space, the part of the inner conductor engager comprising a second wall, the first and second walls being engaged with each other through an engagement selected from the group consisting of a crimped engagement, a frictional engagement, a mating engagement and an interlocked engagement.

9. The coaxial cable device of claim 1, wherein the outer conductor comprises a corrugated shape defining: (a) a plurality of peaks and valleys; and (b) an intermediate section extending from each valley to each peak, the outer conductor engager being welded to one of the intermediate sections.

10. The coaxial cable device of claim 1, wherein: (a) the intermediate section of the outer conductor extends in a first plane; and (b) the outer conductor engager comprises a conductor engagement surface extending in a second plane which is substantially parallel to the first plane.

11. The coaxial cable device of claim 10, which comprises a seal sandwiched between the outer conductor engager and the connector body.

12. A coaxial cable device comprising:

a coaxial cable comprising an inner conductor, an outer conductor and a jacket surrounding the outer conductor, the inner conductor comprising a surface which is deformable to define a recessed space;

an inner conductor engager engaged with the inner conductor, part of the inner conductor engager being deformed to fit within the recessed space; and an outer conductor engager circumscribing the outer conductor and including a ramped section abutting a deformed hem section of the outer conductor to define an outer conductor weld interface, the outer conductor weld interface being penetration welded along a perimeter disposed along a plane normal to the elongate axis of the coaxial cable, the outer conductor engager further comprising a first jacket engagement portion engaged with the jacket.

13. The coaxial cable device of claim 12, which comprises a connector body configured to receive the coaxial cable.

14. The coaxial cable device of claim 13, which comprises a coupler rotatably coupled to the connector body.

15. The coaxial cable device of claim 14, which comprises an inner conductor engager holder supported by the connector body.

16. The coaxial cable device of claim 15, which comprises a strain relief device supported by the connector body, the strain relief device receiving the coaxial cable, the strain relief device comprising an additional jacket engagement portion engaged with the jacket.

17. A coaxial cable connector produced by a process, comprising:

preparing an end of a cable such that an inner conductor extends outwardly beyond an edge of an outer conductor;

disposing the outer conductor through an aperture of an outer conductor engager such that an edge of the outer conductor extends beyond an interface surface of the outer conductor engager, the interface surface disposed normal to the elongate axis of the connector and defining a ramped section;

deforming a hem section of the outer conductor such that it contacts and compliments the shape of the ramped section, the hem and ramped sections defining an outer conductor engager weld interface; and directing a beam of energy parallel to the elongate axis to penetration weld the outer conductor engager weld interface;

wherein the penetration weld augments the electrical ground path from the outer conductor to a conductive outer body of the connector.

18. The coaxial cable of claim 17, wherein the process comprises inserting the cable within a second opening defined by a strain relief device, wherein the strain relief device engages a compliant outer jacket and the connector body.

19. A jumper cable comprising:

a coaxial cable including an inner conductor, an outer conductor surrounding the inner conductor and a low dielectric filler disposed therebetween, the coaxial cable defining an elongate axis;

an outer conductor engager disposed over a prepared end the coaxial cable, the outer conductor engager welded with a deformed edge of the outer conductor along an outer conductor weld interface, the outer conductor weld interface disposed in a plane normal to the elongate axis;

a connector having a conductive connector body disposed over, and electrically connected to the outer conductor engager;

wherein an electrical ground path is established from the outer conductor, through the weld interface, into the conductive connector body.

20. The jumper cable of claim 19, wherein the outer conductor engager is penetration welded with the deformed edge of the outer conductor.

21. The jumper cable of claim 19, further comprising a coupler rotatably coupled to the connector body.

22. The coaxial cable device of claim 21, further comprising an inner conductor engager holder supported by the connector body.

23. The coaxial cable device of claim 22, which comprises a strain relief device supported by the connector body, the strain relief device receiving the coaxial cable, the strain relief device comprising an additional jacket engagement portion engaged with the jacket.

* * * * *